United States Patent
Harima

[19]

[11] Patent Number: 6,092,004
[45] Date of Patent: *Jul. 18, 2000

[54] ROBOT SPEED COMPUTING APPARATUS AND METHOD

[75] Inventor: Taro Harima, Tokyo, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/788,138

[22] Filed: Jan. 24, 1997

[30] Foreign Application Priority Data

Jan. 24, 1996 [JP] Japan .................................. 8-010267
Nov. 21, 1996 [JP] Japan .................................. 8-310579

[51] Int. Cl.⁷ .................................................. G05B 19/19
[52] U.S. Cl. .......................... 700/252; 700/245; 700/250; 700/251; 318/568.15; 318/568.18
[58] Field of Search ................................. 901/12–15, 16, 901/17, 20; 318/568.15, 568.18; 395/87, 80, 85; 700/252, 245, 250, 251

[56] References Cited

U.S. PATENT DOCUMENTS

| | | | |
|---|---|---|---|
| 4,338,672 | 7/1982 | Prezley et al. | 700/249 |
| 4,504,771 | 3/1985 | Inaba et al. | 318/561 |
| 4,594,671 | 6/1986 | Sugimoto et al. | 700/263 |
| 4,623,971 | 11/1986 | Ailman et al. | 700/252 |
| 4,705,999 | 11/1987 | Soji et al. | 318/568.18 |
| 4,972,131 | 11/1990 | Kojyo et al. | 318/568.1 |
| 4,988,934 | 1/1991 | Toyada et al. | 318/568.15 |
| 5,508,596 | 4/1996 | Olsen | 318/569 |
| 5,708,342 | 1/1998 | Nihei et al. | 318/558.18 |
| 5,804,940 | 9/1998 | Erkens et al. | 318/560 |

FOREIGN PATENT DOCUMENTS

| | | | |
|---|---|---|---|
| 58-114888 | 7/1983 | Japan | B25J 13/00 |
| 60-57408 | 4/1984 | Japan | G05B 19/407 |
| 59-163609 | 9/1984 | Japan | G05B 19/415 |
| 62-189504 | 8/1987 | Japan | G05B 19/18 |
| 2-47702 | 2/1990 | Japan | G05B 19/407 |
| 2-308311 | 12/1990 | Japan | G05B 19/407 |
| 3-66576 | 3/1991 | Japan | B25J 9/16 |
| 3-170282 | 7/1991 | Japan | B25J 9/10 |
| 6-170765 | 6/1994 | Japan | B25J 9/22 |
| 6-324730 | 11/1994 | Japan | G05B 19/407 |
| 7-72910 | 3/1995 | Japan | G05B 19/18 |

OTHER PUBLICATIONS

Nenchev, D.N. and Uchiyama, M. "Singularity–Consistent Path Tracking: A Null Space Based Approach," Proceedings of the 1995 IEEE Int'l Conference on Robotics and Automation, vol. 3, May 1995.

Chan, T. F. and Dubey, R. V. "A Weighted Least–Norm Solution Based Scheme for Avoiding Joint Limits for Redundant Joint Manipulators," IEEE Journal on Robotics and Automation, vol. 11, No. 2 Apr. 1995.

*Primary Examiner*—Tariq R. Hafiz
*Assistant Examiner*—Jason W. Rhodes
*Attorney, Agent, or Firm*—Sughrue, Mion, Zinn, Macpeak & Seas, PLLC

[57] ABSTRACT

An improved method and apparatus for computing the speed of a robot. Specifically, the method and apparatus relate to calculating the speed of a robot based on the rated maximum speed of a joint of the robot and one of the current position and joint information. There are further aspects of the invention to calculate the speed of a scalar robot, a scalar robot with two degrees of freedom within a horizontal plane, a scalar robot with two degrees of freedom within a horizontal plane plus a front end shaft, a cylindrical robot having two degrees of freedom within a horizontal plane, and other configurations.

36 Claims, 23 Drawing Sheets

ARM LENGTH L1 = L2 = 320mm
CONTOUR LINE IN UNITS OF 50mm/s

ROBOT SPEED COMPUTING APPARATUS AND METHOD

BACKGROUND OF THE INVENTION

1. Field of the Invention

The present invention relates to a robot speed computing apparatus and a robot speed computing method for use in a robot locus control apparatus or a robot locus simulation apparatus. More particularly, the present invention relates to a robot speed computing apparatus and a robot speed computing method which permit a robot to pass through the singular area of speed without excessively increasing the speed when linear interpolation is effected in rectangular coordinates.

2. Description of the Related Art

Linear-interpolation-based locus control in the field of robot control is a method of controlling the speed of a robot such that the locus of the front end of the robot becomes linear, and that the speed of the robot follows a trapezoidal speed pattern, or the like.

With reference to FIGS. 19 and 20, a conventional linear-interpolation-based locus control method for a robot will be described.

FIG. 19 is a flowchart of a conventional linear interpolation algorithm, and FIG. 20 is a plot showing the state of the speed of the front end of the robot obtained when the robot is subjected to conventional linear-interpolation-based locus control.

In FIG. 19, linear interpolation is started from step 101. The linear interpolation procedure is started when it is invoked by the procedure of a higher-level work program. When the linear interpolation procedure is invoked, the current position and a final target position are determined by the procedure of a higher-level work program. Then, the linear interpolation procedure is given the thus-determined positions.

When the linear interpolation is started, a travel distance is initially calculated from a starting position and the final target position of the robot in step 102. In step 103, a remaining travel distance over which the robot must travel is calculated from the current position and final target position of the robot.

A designated speed v1 is calculated by multiplying together a designated speed included in a program, a speed multiplying factor designated in the program, and a multiplying factor designated from a control panel in step 104. The increment of speed obtained by multiplying a designated acceleration α1 by a sampling time Δt is added to a current speed v0, whereby a speed v2 associated with an acceleration pattern operation is calculated from the following equation 1:

$$v2 = v0 + \alpha 1 \times \Delta t \tag{1}$$

A speed at which the robot travels over the remaining distance is calculated in step 103 according to a deceleration pattern so as to decelerate at a constant rate by the deceleration designated in the program. More specifically, a speed v3, at which the robot continues decelerating at a designated deceleration α2 and decelerates to a speed of zero at the end of the travel over only the remaining distance L, is calculated from the following equation 2.

$$v3 = \sqrt{2 \times \alpha 2 \times L} \tag{2}$$

Of the three speeds calculated in steps 104, 105, and 106, the minimum speed is adopted as an instruction speed in step 130.

For example, the instruction speed is more specifically described with reference to FIG. 20 which shows the state of the speed of the front end of the robot. At time t=t1, the speed v2 associated with the acceleration pattern operation calculated in step 105 is the minimum speed, and hence this speed is adopted as the instruction speed. In contrast, at time t=t2, the designated speed v1 which is calculated in step 104 and is a constant velocity is the minimum speed. Therefore, this speed is adopted. Further, at time t=t3, the speed v3 associated with the deceleration pattern operation calculated in step 106 is the minimum. Therefore, this speed is adopted.

Turning again to FIG. 19, interpolation positions over which the robot travels at the instruction speed determined in step 130 are calculated from the current position thereof in step 109. Subsequently, the interpolation positions represented in the form of rectangular coordinates are converted into joint coordinates in step 110. A joint of the robot is moved to the target interpolation position in step 111. The current position is updated to the interpolation positions in step 112.

The current position is compared with the final target position in step 113, whereby it is decided whether or not the robot has reached the target position. If the robot has not reached the final target position, processing will proceed to step 103. In contrast, if the robot has reached the final target position, the procedure of linear interpolation is completed.

However, according to the conventional linear-interpolation-based locus control of a robot, linear interpolation is effected by considering only the speed of the front end of the robot, as previously described. For example, in the case of a scalar robot, the speed of a first shaft becomes a considerably large value regardless of whether the speed of the front end of the robot is high or low. Therefore, it is very difficult for the robot to pass the vicinity of the point of origin during the course of its linear interpolation operations.

The aforementioned problem will be described in more detail with reference to a diagram showing operations of a robot in the prior art when it passes through a singular area shown in FIG. 21.

FIG. 21 shows a scalar robot which linearly interpolates positions (1) to (4) by passing through the point of origin along the X axis. In the drawing, the scalar robot has a first arm A1 which is 5 cm long and a second arm A2 which is also 5 cm long. The front end of the second arm A2 travels leftwards along the X axis at a rate of 5 cm per unit time, passing sequentially the positions (1), (2), (3), and (4).

In the case shown in FIG. 20, the first arm A1 rotates counterclockwise through 58° when it travels from the position (1) to the position (2). It rotates counterclockwise through 117° when traveling from the position (2) to (3). Further, it rotates clockwise through 16° when traveling from the position (3) to the position (4).

In the linear interpolation operations, the speed of the front end of the robot; namely, the speed of the front end of the second arm A2 shown in FIG. 21, is constant. Therefore, the first arm A1 must move through a considerably large angle when it passes through the vicinity of the point of origin during the course of the travel from the position (2) to the position (3). In the case shown in FIG. 21, the first arm A1 must move from the position (2) to the position (3) at about twice the angular velocity as when it travels from the position (1) to the position (2) and at about seven times the angular velocity as when it travels from the position (3) to the position (4).

For these reasons, it becomes necessary for a first axis to rotate at a fast rotating speed in excess of the capability of the first axis, depending on conditions, thereby leading to an excessive speed error. As a result, the operation of the robot is interrupted.

This excessive speed error will be described with reference to FIG. 22. FIG. 22 shows the state of speed, in which the vertical axis is the speed of the front end of the robot and the rotational angular velocity of a first joint shaft, whereas the horizontal axis is time. In FIG. 22, a trapezoidal diagram B1 represents the speed of the front end of the robot obtained in the manner as shown in FIG. 20, and a concave function curve B2 represents the rotational angular velocity of the first joint. As the front end of the robot travels, the first joint moves. The rotational angular velocity becomes gradually increased. If the robot moves through such a large angle as in the case of the movement from the position (2) to the position (3) shown in FIG. 21, the rotational angular velocity of the first joint will exceed the maximum rated angular velocity J1max of the first joint (this maximum rated angular velocity was exceeded at t=t0 in FIG. 22). An excessive speed error arises in the robot, which makes it impossible for the robot to continue the subsequent operations.

The above-described problem will be mathematically proven.

In the case of a scalar robot, provided that the position of the front end of the robot is (X, Y), and that a joint angle ($\theta 1$, $\theta 2$), the relationship between the speed of the front end and the angular speed of the joint can be expressed as the following equation (3) by use of a Jacobian matrix J.

$$\frac{d}{dt}\begin{vmatrix} x \\ y \end{vmatrix} = J\frac{d}{dt}\begin{vmatrix} \theta 1 \\ \theta 2 \end{vmatrix} \quad (3)$$

In this expression, J represents a Jacobian matrix as defined in the form of the following expression (4).

$$J = \begin{vmatrix} -L1\sin(\theta 1) - L2\sin(\theta 1 + \theta 2) & -L2\sin(\theta 1 + \theta 2) \\ -L1\cos(\theta 1) - L2\cos(\theta 1 + \theta 2) & -L2\cos(\theta 1 + \theta 2) \end{vmatrix} \quad (4)$$

From the speed of the front end, the following expression (5) is established with regard to the angular velocity of the joint by means of an inverse Jacobian matrix Jr.

$$\frac{d}{dt}\begin{vmatrix} \theta 1 \\ \theta 2 \end{vmatrix} = Jr\frac{d}{dt}\begin{vmatrix} x \\ y \end{vmatrix} \quad (5)$$

In this expression, Jr is an inverse Jacobian matrix as defined in the form of the following matrix 6.

$$Jr = \frac{1}{L2\sin(\theta 2)}\begin{vmatrix} \cos(\theta 1 + \theta 2) & \sin(\theta 1 + \theta 2) \\ -\cos(\theta 1) - \cos(\theta 1 + \theta 2) & -\sin(\theta 1) - \sin(\theta 1 + \theta 2) \end{vmatrix} \quad (6)$$

The above expression (6) is a simultaneous equation with two unknowns. The first expression of the simultaneous equation represents the relationship between the angular velocity of the joint of the first shaft and the speed of the front end. In the case of a two-degree-of-freedom scalar robot shown in FIG. 21, the robot has only a component of velocity in the X direction, and a component of velocity in the Y direction of the robot becomes zero. Therefore, the angular velocity J1 of a joint of the first axis is expressed as the following expression (7).

$$J1 = \frac{\cos(\theta 1 + \theta 2)}{\sin(\theta 2) \times L1}\frac{dx}{dt} \quad (7)$$

According to the above-described expression (7), the front end of the second arm A2 approaches the point of origin, and the first arm A1 and the second arm A2 overlap each other; namely, as $\theta 2 = \pi$ approaches, the denominator of J1 approaches zero. Therefore, the angular velocity of a joint of the first shaft approaches infinity irrespective of the value of the speed dX/dt of the front end of the robot.

Therefore, it becomes necessary for the first shaft to rotate at a higher rotating speed in excess of the capability of the first shaft, thereby resulting in an excessive speed error. This error may lead to interruption of the operation of the robot.

Similarly, in the case of a cylindrical robot shown in FIG. 10 and a scalar robot shown in FIG. 4 which will be described later, the relationship between the speed of the front end of the robot and the speed of the joint can be expressed as the following expression (8) by means of the Jacobian matrix J.

$$\frac{d}{dt}\begin{vmatrix} x \\ y \end{vmatrix} = J\frac{d}{dt}\begin{vmatrix} L \\ \theta \end{vmatrix} \quad (8)$$

Here, J is a Jacobian matrix defined as the following expression (9).

$$J = \begin{vmatrix} \cos(\theta) & -L\sin(\theta) \\ \sin(\theta) & L\cos(\theta) \end{vmatrix} \quad (9)$$

Therefore, from the speed of the front end of the robot, the following expression (10) will be established with regard to the speed of the joint by means of an inverse Jacobian matrix Jr.

$$\frac{d}{dt}\begin{vmatrix} L \\ \theta \end{vmatrix} = Jr\frac{d}{dt}\begin{vmatrix} x \\ y \end{vmatrix} \quad (10)$$

Here, Jr designates an inverse Jacobian matrix which is defined as the following expression (11).

$$Jr = \begin{vmatrix} \cos(\theta) & \sin(\theta) \\ \dfrac{-\sin(\theta)}{L} & \dfrac{-\cos(\theta)}{L} \end{vmatrix} \quad (11)$$

If the robot moves along the X axis as in the case shown in FIG. 21, the relationship between the speeds of the front end of the robot dx/dt and d$\theta$/dt is defined as the following expression (12) from the second expression of the previously-described expression (6) which is a simultaneous equation.

$$\frac{d\theta}{dt} = \frac{\sin(\theta)}{L} \times \frac{dx}{dt} \quad (12)$$

If the number of rotations of a pivot reaches the maximum number at a predetermined speed of the front end dx/dt in the vicinity of $\theta = 45$, the pivot must rotate at about 1.41 times its maximum number of rotations as obtained by sin (90°)/sin (45°)=21/2≠1.41. In other words, the pivot rotation must increase by 40% over its maximum number rotational speed. As a result, the speed of the pivot becomes excessive.

Conversely, if the robot is set so as to prevent its speed becoming excessive, the robot will have redundant capability while being positioned during the remaining course of operation. An effective value of a sine curve in the overall working area becomes $2/\pi=0.63$, and therefore about 37% of the capability of the robot is not utilized.

To solve the aforementioned problem, it has been proposed to apply a feedback technique to the linear interpolation based on a conventional locus control method for a robot, as disclosed in, e.g., Unexamined Japanese Patent Application No. Sho-58-114888.

FIG. 23 shows a flowchart which represents a control method disclosed in Unexamined Japanese Patent Application No. Sho-58-114888. With reference to FIG. 23, a proposed locus control method of the above-described patent application by which an excessive speed error is prevented from arising in a singular area, will be described.

Processing carried out in steps 101 to 110 of the flowchart is the same as the processing carried out in steps of the flowchart of the basic control method shown in FIG. 19.

It is decided in step 131 whether or not the speed of the joint has become excessive in coordinates of a joint. If the speed of any one of joints has not become excessive, the processing following step 111 is carried out as in the case of the basic control method shown in FIG. 19. In contrast, if the speed of any one of the joints has become excessive, processing will then proceed to step 132, and an instruction of speed will be controlled. More specifically, a rate of excess between the angular velocity of the shaft whose speed has come to exceed the maximum speed is obtained in step 131. Subsequently, the instruction speed is controlled so as to prevent the speed of the shaft from becoming excessive by multiplying together the instruction speed and the inverse of the rate of excess.

For instance, assume that the first joint having a maximum angular velocity of 3.14 rad/s is given 4.72 rad/s as an instruction because of an instruction speed of 90 mm/s as a result of transformation of a coordinate system. The rate of excess of the first joint is 4.72 rad/s÷3.14 rad/s=1.5 times. Therefore, the instruction speed is controlled by multiplying it by the inverse of that result, i.e., 0.667, so that the instruction speed becomes 60 mm/s.

The processing carried out in steps 111 to 114 of the flowchart is the same as the processing carried out in the flowchart of the conventional basic control method shown in FIG. 19.

The proposed method disclosed in Unexamined Japanese Patent Application No. Sho-58-114888 uses the feedback technique as previously described. For this reason, an instruction for instructing the joint to exceed the maximum rated angular velocity should be generated by executing a sequence of operations in steps 104 to 110. The result of these operations should be discarded once, and the operations in steps 109 to 110 must be carried out at least one more time. In the two-degree-of-freedom robot, the transformation of a coordinate system carried out in step 110 involves execution of an inverse tangent function one time, calculation of a square root one time, squaring operations six times, calculation of a fourth power twice, and additions and subtractions six times. In a robot speed computing apparatus, a sampling interval is usually set to as short a period of time as possible in order to increase the accuracy of a locus. The sampling time is not set so as to allow execution of these complicated arithmetic operations more than twice.

For these reasons, an instruction is not assigned to the joint if the arithmetic operations are not completed within the period of the sampling time. As a result, the locus of the robot becomes jumbled, or alternatively the robot must be provided with a sophisticated CPU 11 capable of executing the operations in step 110 more than twice within a period of the sampling time.

Unexamined Japanese Patent Application No. Sho-59-163609, Unexamined Japanese Patent Application No. Sho-62-189504, Unexamined Japanese Patent Application No. Hei-2-47702, Unexamined Japanese Patent Application No. Hei-3-66576, Unexamined Japanese Patent Application No. Hei-6-324730, and Unexamined Japanese Patent Application No. Hei-7-72910 disclose methods that use the same feedback technique as used in the method disclosed in Unexamined Japanese Patent Application No. Sho-58-114888. Since these methods use the feedback technique, the locus of the robot becomes jumbled as does the robot disclosed in Unexamined Japanese Patent Application No. Sho-58-114888.

A robot control method is proposed in Unexamined Japanese Patent Application No. Hei-2-308311. According to this control method, all the interpolation points which exist between the starting point to the target point are previously calculated before the movement of the robot is started in order to prevent interruption of an operation of the robot due to excessive speed errors. However, according to this method, it is necessary to previously calculate all the interpolation points. Because of this, it is necessary to stop the operation of the robot in order to calculate the interpolation points before starting the operation, or alternatively a high-speed processor is required to avoid interruption of the operation of the robot. Further, according to this method, it is impossible to change the speed of an operation from an external control panel by use of a speed change instruction during the course of the linear operation.

Unexamined Japanese Patent Application No. Sho-60-57408 discloses a robot control method. According to this method, an instruction speed is invalidated only for the period of time during which the robot passes a singular area. The robot is operated at a predetermined slow speed while passing the singular area so as to prevent interruption of the operation of the robot due to an excessive speed error. According to this method, the robot is operated at such a slow speed as not to bring about an excessive speed while passing through all the positions within the singular area in spite of the fact that the robot is capable of actuating at a much higher speed. As a result, the speed of the robot becomes very slow.

A robot control method is disclosed in Unexamined Japanese Patent Application Nos. Hei-3-66576 and Hei-6-170765. According to this method, an instruction speed is reduced by multiplying it by a predetermined coefficient less than one so as to prevent interruption of an operation of the robot due to an excessive speed error, as required, when a robot enters a singular area. However, this robot control method, fails to disclose a method of determining a coefficient used in reducing the speed in order prevent an excessive speed. In practice, it is necessary for an operator to determine a coefficient of each robot for each path by trial and error.

SUMMARY OF THE INVENTION

The present invention has been conceived to solve the previously described drawbacks in the art, and therefore an object of the present invention is to provide a robot speed computing apparatus and a robot locus control method which permit computation of the maximum speed of the front end of a robot to such an extent as not to exceed the maximum rated angular velocity of a joint shaft when the robot passes through the vicinity of point of origin during the course of its linear interpolation operations.

To solve the previously-described problems, the present invention is aimed at providing a robot speed computing apparatus comprising means for acquiring information on the current position of the robot;

means for acquiring information on the maximum rated speed of a joint of the robot; and means for computing an allowable speed limit which is possible during the linear interpolation operations of the front end of the robot on the basis of the current robot position information and the maximum rated speed of the joint.

The present invention also provides a robot speed computing apparatus comprising:

means for acquiring information on the current state of a joint of the robot;

means for acquiring information on the maximum rated speed of the joint of the robot; and means for computing an allowable speed limit which is possible during the linear interpolation operations of the front end of the robot on the basis of the current robot position information and the maximum rated speed of the joint.

According to the present invention, the robot is a scalar robot. In this scalar robot, information on the current angle of a joint of the scalar robot is acquired as current joint angle information of the scalar robot. Information related to the maximum rated angular velocity of the joint of the scalar robot is acquired as rated maximum angular velocity information of the joint of the robot.

According to the present invention, the scalar robot is a scalar robot which has two degrees of freedom within a horizontal plane. In this scalar robot, information related to the current angle of a joint of the robot having two degrees of freedom within a horizontal plane, is acquired as current joint angle information of the scalar robot. Further, the maximum rated angular velocity of a first joint of the scalar robot having two degrees of freedom within a horizontal plane, is acquired as maximum rated angular velocity information of the joint of the scalar robot.

According to the present invention, the scalar robot having two degrees of freedom within a horizontal plane is a three-degree-of-freedom scalar robot having a front end attitude shaft. The three-degree-of-freedom scalar robot having the front end attitude shaft comprises:

means for acquiring information related to a remaining linear travel distance from the current position of the three-degree-of-freedom scalar robot;

means for acquiring information related to a remaining angle through which the front end attitude shaft of the three-degree-of-freedom scalar robot moves from the current position thereof;

means for computing a speed contribution correction coefficient for use with the front end attitude shaft by entering the information related to the remaining linear travel distance, the information related to the remaining angle through which the front end attitude shaft travels, and the information related to the current joint angle of the three-degree-of-freedom scalar robot having the front end attitude shaft; and means for multiplying together the speed contribution correction coefficient and an allowable speed limit that is possible during the linear interpolation operations of the front end of the three-degree-of-freedom scalar robot with the front end attitude shaft calculated on the basis of the current joint angle information of the scalar robot and the maximum rated angular velocity of a first joint of the scalar robot.

According to the present invention, the robot is a cylindrical robot having two degrees of freedom within a horizontal plane. In the cylindrical robot, information related to the current joint of the cylindrical robot having two degrees of freedom within a horizontal plane, is acquired as current joint information of the robot. A rated maximum angular velocity of the pivot of the cylindrical robot having two degrees of freedom within a horizontal plane, is acquired as maximum rated speed information of the robot. An allowable speed limit is calculated which is possible during the linear interpolation operations of the front end of the cylindrical robot on the basis of the current joint information and the maximum rated angular velocity of the pivot with regard to the cylindrical robot having two degrees of freedom within a horizontal plane.

According to the present invention, the cylindrical robot having two degrees of freedom within a horizontal plane is a three-degree-of-freedom cylindrical robot having a front end attitude shaft.

The three-degree-of-freedom cylindrical robot having the front end attitude shaft comprises:

means for acquiring information related to a remaining linear travel distance from the current position of the three-degree-of-freedom cylindrical robot;

means for acquiring information related to a remaining angle through which the front end attitude shaft of the three-degree-of-freedom cylindrical robot moves from the current position thereof;

means for computing a speed contribution correction coefficient for use with the front end attitude shaft on the basis of the information related to the remaining linear travel distance, the information related to the remaining angle through which the front end attitude shaft travels, and the information related to the current joint angle of the three-degree-of-freedom cylindrical robot having the front end attitude shaft; and means for multiplying together the speed contribution correction coefficient and an allowable speed limit that is possible during the linear interpolation operations of the front end of the three-degree-of-freedom cylindrical robot with the front end attitude shaft calculated on the basis of the current joint angle information of the cylindrical robot and the maximum rated angular velocity of a pivot.

According to the present invention, the cylindrical robot having two degrees of freedom within a horizontal plane is a vertically articulated robot. The vertically articulated robot is projected on a horizontal plane. The resultantly projected length of first and second arms of the vertically articulated robot is defined as the length of the arms of the vertically articulated robot. An allowable speed limit is calculated which is possible during the linear interpolation operations of the front end of the vertically articulated robot on the basis of information related to the current joint of the robot and the maximum rated angular velocity of a pivot.

According to the present invention, the robot further comprises:

means for storing a contour line of the allowable speed limit which is possible during the calculated linear interpolation operations of the front end of the robot;

means for acquiring information related to the current position of the robot; and means for retrieving an allowable speed limit which is possible during the linear interpolation operations at the current position of the robot, from the contour line of the previously-stored allowable speed limit on the basis of information related to the current position of the robot.

According to the present invention, the robot further comprises:

means for storing a contour line of the allowable speed limit which is possible during the calculated linear interpolation operations of the front end of the robot, in the form analogous to a polygon, a circle, or an ellipse;

means for acquiring information related to the current position of the robot; and means for retrieving an allowable speed limit which is possible during the linear interpolation operations at the current position of the robot, from the contour line of the previously-stored allowable speed limit on the basis of information related to the current position of the robot.

According to the present invention, the robot further comprises:

means for storing a contour line of the allowable speed limit which is possible during the calculated linear interpolation operations of the front end of the scalar robot, in the form of the length of a side of a square by approximating the contour line to a square;

means for acquiring information related to the current position of the scalar robot; and means for retrieving an allowable speed limit which is possible during the linear interpolation operations at the current position of the robot, from the previously-stored side length on the basis of information related to the current position of the scalar robot.

According to the present invention, the robot further comprises:

means for storing a contour line of the allowable speed limit which is possible during the calculated linear interpolation operations of the front end of the scalar robot, in the form the distance from the point of origin to each side of a rectangle by approximating the contour line to a rectangle;

means for acquiring information related to the current position of the scalar robot; and means for retrieving an allowable speed limit which is possible during the linear interpolation operations at the current position of the robot, from the previously-stored distances on the basis of information related to the current position of the scalar robot.

According to the present invention, the scalar robot is a three-degree-of-freedom scalar robot having the front end attitude shaft. The three-degree-of-freedom robot comprises:

means for acquiring information related to a remaining linear travel distance from the current position of the three-degree-of-freedom scalar robot;

means for acquiring information related to a remaining angle through which the front end attitude shaft of the three-degree-of-freedom scalar robot moves from the current position thereof;

means for computing a speed contribution correction coefficient for use with the front end attitude shaft on the basis of the information related to the remaining linear travel distance, the information related to the remaining angle through which the front end attitude shaft travels, and the information related to the current joint angle of the three-degree-of-freedom scalar robot having the front end attitude shaft; and means for multiplying a retrieved allowable speed limit by the speed contribution correction coefficient.

According to the present invention, the robot further comprises:

means for storing the radius of a contour line of speed that consists of a plurality of circles obtained by entering the contour line of the allowable speed limit which is possible during the calculated linear interpolation operations of the front end of the cylindrical robot having two degrees of freedom within a horizontal plane;

means for acquiring information related to the current position of the cylindrical robot; and means for retrieving an allowable speed limit which is possible during the linear interpolation operations at the current position of the robot, from the previously-stored radius on the basis of the information related to the current position of the cylindrical robot having two degrees of freedom within a horizontal plane.

According to the present invention, the cylindrical robot having two degrees of freedom within a horizontal plane is a three-degree-of-freedom scalar robot having the front end attitude shaft. The three-degree-of-freedom robot comprises:

means for acquiring information related to a remaining linear travel distance from the current position of the three-degree-of-freedom cylindrical robot;

means for acquiring information related to a remaining angle through which the front end attitude shaft of the three-degree-of-freedom cylindrical robot having the front end attitude shaft moves from the current position thereof;

means for computing a speed contribution correction coefficient for use with the front end attitude shaft on the basis of the information related to the remaining linear travel distance, the information related to the remaining angle through which the front end attitude shaft travels, and the information related to the current joint angle of the three-degree-of-freedom circular robot having the front end attitude shaft; and means for multiplying a retrieved allowable speed limit by the speed contribution correction coefficient.

According to the present invention, the cylindrical robot having two degrees of freedom within a horizontal plane is a vertically articulated robot. An allowable speed limit which is possible during the linear interpolation operations of the front end of the vertically articulated robot, is calculated by projecting the vertically articulated robot on a horizontal plane, and by defining the resultantly projected length of first and second arms of the vertically articulated robot as the length of the arms of the vertically articulated robot.

According to the present invention, the robot further comprises:

means for acquiring the direction of course of the robot from the current position thereof; and means for converting coordinates of the current position of the robot into coordinates of a position in the direction parallel to the direction of the course of the robot on the basis of the direction of the course of the robot from the current position thereof. The means for calculating an allowable speed limit which is possible during the linear interpolation operations of the front end of the robot, calculates the allowable speed limit on the basis of the thus-converted coordinates of the current position of the robot.

According to the present invention, the robot further comprises:

means for calculating a designated speed in a case where the robot travels at a speed designated when performing linear interpolation operations;

means for obtaining the speed of the robot in a case where the robot travels according to an acceleration pattern designated when performing linear interpolation operations;

means for obtaining the speed of the robot in a case where the robot travels according to a deceleration pattern designated when performing linear interpolation operations; and means for selecting the minimum speed from among the designated speed, the speed based on the acceleration pattern, the speed based on the deceleration pattern, and the allowable speed limit.

According to the present invention, the robot further comprises:

means for calculating a designated speed in a case where the robot travels at a speed designated when performing linear interpolation operations;

means for obtaining the speed of the robot in a case where the robot travels according to an acceleration pattern designated when performing linear interpolation operations;

means for obtaining the speed of the robot in a case where the robot travels according to a deceleration pattern designated when performing linear interpolation operations; and means for selecting the minimum speed from among the designated speed, the speed based on the acceleration pattern, the speed based on the deceleration pattern, and the allowable speed limit multiplied by the speed contribution correction coefficient.

Further, the present invention provides a robot speed computing method comprising the steps of:

acquiring information on the current position of the robot;

acquiring information on the maximum rated speed of a joint of the robot; and computing an allowable speed limit which is possible during the linear interpolation operations of the front end of the robot on the basis of the current robot position information and the maximum rated speed of the joint.

The present invention also provides a robot speed computing method comprising the steps of:

acquiring information on the current state of a joint of the robot;

acquiring information on the maximum rated speed of the joint of the robot; and computing an allowable speed limit which is possible during the linear interpolation operations of the front end of the robot on the basis of the current robot position information and the maximum rated speed of the joint.

According to the present invention, the robot is a scalar robot. In the present invention, information on the current angle of a joint of the scalar robot is acquired as current joint angle information of the scalar robot. Information related to the maximum rated angular velocity of the joint of the scalar robot is acquired as rated maximum angular velocity of the joint of the robot.

According to the present invention, the scalar robot is a scalar robot which has two degrees of freedom within a horizontal plane. In the present invention, information on the current angle of a joint of the robot having two degrees of freedom within a horizontal plane, is acquired as current joint angle information of the scalar robot. Further, the maximum rated angular velocity of a first joint of the scalar robot is acquired as maximum rated angular velocity information of the joint of the scalar robot.

According to the present invention, the scalar robot having two degrees of freedom within a horizontal plane is a three-degree-of-freedom scalar robot having a front end attitude shaft. The robot speed computing method comprises the steps of:

acquiring information related to a remaining linear travel distance from the current position of the three-degree-of-freedom scalar robot having the front end attitude shaft;

acquiring information related to a remaining angle through which the front end attitude shaft of the three-degree-of-freedom scalar robot moves from the current position thereof;

computing a speed contribution correction coefficient for use with the front end attitude shaft by entering the information related to the remaining linear travel distance, the information related to the remaining angle through which the front end attitude shaft travels, and the information related to the current joint angle of the three-degree-of-freedom scalar robot having the front end attitude shaft; and multiplying together the speed contribution correction coefficient and an allowable speed limit which is possible during the linear interpolation operations of the front end of the three-degree-of-freedom scalar robot with the front end attitude shaft calculated on the basis of the current joint angle information of the scalar robot and the maximum rated angular velocity of a first joint of the scalar robot.

According to the present invention, the robot is a cylindrical robot having two degrees of freedom within a horizontal plane. In the present invention, information related to the current joint of the cylindrical robot having two degrees of freedom within a horizontal plane is acquired as current joint information of the robot. A rated maximum angular velocity of the pivot of the cylindrical robot is acquired as maximum rated speed information of the robot. An allowable speed limit is calculated which is possible during the linear interpolation operations of the front end of the cylindrical robot on the basis of the current joint information and the maximum rated angular velocity of the pivot.

According to the present invention, the cylindrical robot having two degrees of freedom within a horizontal plane is a three-degree-of-freedom cylindrical robot having a front end attitude shaft.

The robot speed computing method comprises the steps of:

acquiring information related to a remaining linear travel distance from the current position of the three-degree-of-freedom cylindrical robot;

acquiring information related to a remaining angle through which the front end attitude shaft of the three-degree-of-freedom cylindrical robot moves from the current position thereof;

computing a speed contribution correction coefficient for use with the front end attitude shaft on the basis of the information related to the remaining linear travel distance, the information related to the remaining angle through which the front end attitude shaft travels, and the information related to the current joint angle of the three-degree-of-freedom cylindrical robot having the front end attitude shaft; and multiplying together the speed contribution correction coefficient and an allowable speed limit which is possible during the linear interpolation operations of the front end of the three-degree-of-freedom cylindrical robot with the front end attitude shaft calculated on the basis of the current joint angle information of the cylindrical robot and the maximum rated angular velocity of a pivot.

According to the present invention, the cylindrical robot having two degrees of freedom within a horizontal plane is a vertically articulated robot. The vertically articulated robot is projected on a horizontal plane. The resultantly projected length of first and second arms of the vertically articulated robot is defined as the length of the arms of the vertically articulated robot. An allowable speed limit is calculated which is possible during the linear interpolation operations of the front end of the vertically articulated robot on the basis of information related to the current joint of the robot and the maximum rated angular speed of a pivot.

According to the present invention, the speed computing method further comprises the steps of:

storing a contour line of the allowable speed limit which is possible during the calculated linear interpolation operations of the front end of the robot;

acquiring information related to the current position of the robot; and retrieving an allowable speed limit which is possible during the linear interpolation operations at the current position of the robot, from the contour line of the previously-stored allowable speed limit on the basis of information related to the current position of the robot.

According to the present invention, the robot speed computing method further comprises the steps of:

storing a contour line of the allowable speed limit which is possible during the calculated linear interpolation operations of the front end of the robot, in the form analogous to a polygon, a circle or an ellipse;

acquiring information related to the current position of the robot; and retrieving an allowable speed limit which is possible during the linear interpolation operations at the current position of the robot, from the contour line of the previously-stored allowable speed limit on the basis of information related to the current position of the robot.

According to the present invention, the robot speed computing method further comprises the steps of:

storing a contour line of the allowable speed limit which is possible during the calculated linear interpolation operations of the front end of the scalar robot, in the form the length of a side of a square by approximating the contour line to a square;

acquiring information related to the current position of the scalar robot; and retrieving an allowable speed limit which is possible during the linear interpolation operations at the current position of the robot, from the previously-stored side length on the basis of information related to the current position of the scalar robot.

According to the present invention, the robot speed computing method further comprises the steps of:

storing a contour line of the allowable speed limit which is possible during the calculated linear interpolation operations of the front end of the scalar robot, in the form the distance from the point of origin to each side of a rectangle by approximating the contour line to a rectangle;

acquiring information related to the current position of the scalar robot; and retrieving an allowable speed limit which is possible during the linear interpolation operations at the current position of the robot, from the previously-stored distances on the basis of information related to the current position of the scalar robot.

According to the present invention, the scalar robot is a three-degree-of-freedom scalar robot having the front end attitude shaft. The robot speed computing method further comprises the steps of:

acquiring information related to a remaining linear travel distance from the current position of the three-degree-of-freedom scalar robot;

acquiring information related to a remaining angle through which the front end attitude shaft of the three-degree-of-freedom scalar robot moves from the current position thereof;

computing a speed contribution correction coefficient for use with the front end attitude shaft on the basis of the information related to the remaining linear travel distance, the information related to the remaining angle through which the front end attitude shaft travels, and the information related to the current joint angle of the three-degree-of-freedom scalar robot having the front end attitude shaft; and multiplying a retrieved allowable speed limit by the speed contribution correction coefficient.

According to the present invention, the robot speed computing method further comprises the steps of:

storing the radius of a contour line of speed that consists of a plurality of circles obtained by entering the contour line of the allowable speed limit which is possible during the calculated linear interpolation operations of the front end of the cylindrical robot having two degrees of freedom within a horizontal plane;

acquiring information related to the current position of the cylindrical robot; and retrieving an allowable speed limit which is possible during the linear interpolation operations at the current position of the robot, from the previously-stored radius on the basis of the information related to the current position of the cylindrical robot having two degrees of freedom within a horizontal plane.

According to the present invention, the cylindrical robot having two degrees of freedom within a horizontal plane is a three-degree-of-freedom scalar robot having the front end attitude shaft. The robot speed computing method further comprises the steps of:

acquiring information related to a remaining linear travel distance from the current position of the three-degree-of-freedom cylindrical robot;

acquiring information related to a remaining angle through which the front end attitude shaft of the three-degree-of-freedom cylindrical robot having the front end attitude shaft moves from the current position thereof;

computing a speed contribution correction coefficient for use with the front end attitude shaft on the basis of the information related to the remaining linear travel distance, the information related to the remaining angle through which the front end attitude shaft travels, and the information related to the current joint angle of the three-degree-of-freedom circular robot having the front end attitude shaft; and multiplying a retrieved allowable speed limit by the speed contribution correction coefficient.

According to the present invention, the cylindrical robot having two degrees of freedom within a horizontal plane is a vertically articulated robot. An allowable speed limit which is possible during the linear interpolation operations of the front end of the vertically articulated robot, is calculated by projecting the vertically articulated robot on a horizontal plane, and by defining the resultantly projected length of first and second arms of the vertically articulated robot as the lengths of the arms of the vertically articulated robot.

According to the present invention, the robot speed computing method further comprises the steps of:

acquiring the direction of course of the robot from the current position thereof; and converting coordinates of the current position of the robot into coordinates of a position in the direction parallel to the direction of the course of the robot on the basis of the direction of the course of the robot from the current position thereof. In the step for calculating an allowable speed limit which is possible during the linear interpolation operations of the front end of the robot, the allowable speed limit is calculated on the basis of the thus-converted coordinates of the current position of the robot.

According to the present invention, the robot speed computing method further comprises the steps of:

calculating a designated speed in a case where the robot travels at a speed designated when performing linear interpolation operations;

obtaining the speed of the robot in a case where the robot travels according to an acceleration pattern designated when performing linear interpolation operations;

obtaining the speed of the robot in a case where the robot travels according to a deceleration pattern designated when performing linear interpolation operations; and selecting the minimum speed from among the designated speed, the speed based on the acceleration pattern, the speed based on the deceleration pattern, and the allowable speed limit.

According to the present invention, the robot speed computing method further comprises the steps of:

calculating a designated speed in a case where the robot travels at a speed designated when performing linear interpolation operations;

obtaining the speed of the robot in a case where the robot travels according to an acceleration pattern designated when performing linear interpolation operations;

obtaining the speed of the robot in a case where the robot travels according to a deceleration pattern designated when performing linear interpolation operations; and selecting the minimum speed from among the designated speed, the speed based on the acceleration pattern, the speed based on the deceleration pattern, and the allowable speed limit multiplied by the speed contribution correction coefficient.

BRIEF DESCRIPTION OF THE DRAWINGS

The above and other objects and features of the present invention will be more apparent from the following description taken in conjunction with the accompanying drawings.

DETAILED DESCRIPTION OF THE PREFERRED EMBODIMENTS

Now, a description will be given in more detail of preferred embodiments of the invention with reference to the accompanying drawings.

(FIRST EMBODIMENT)

Figure 1:
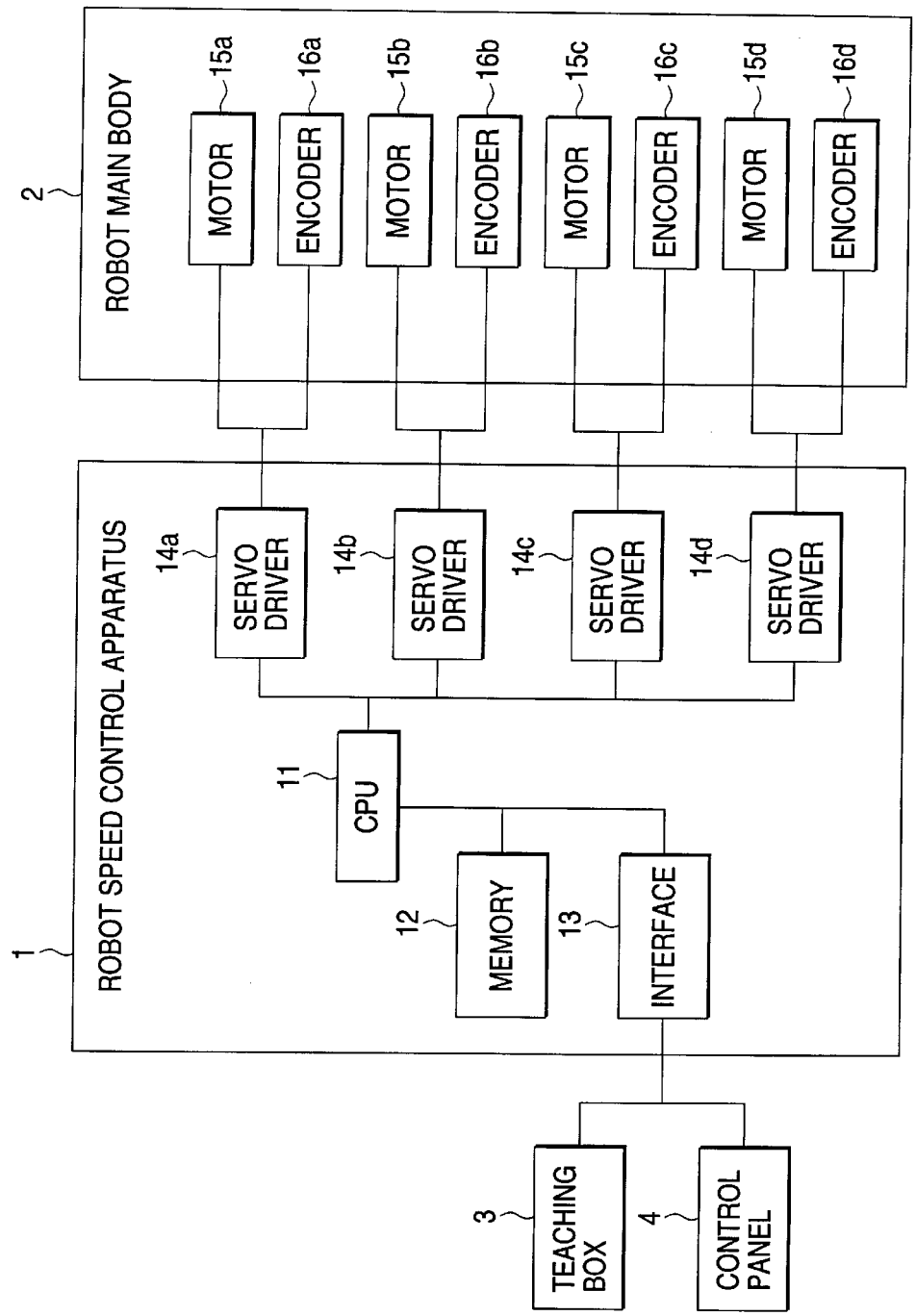
FIG. 1 is a schematic diagram showing electrical connections between a robot locus controller which employs a robot speed computing apparatus and a robot speed computing method of the present invention and a robot main body.

FIG. 1 shows electrical connections between a robot locus controller which adopts a robot speed computing apparatus and a robot speed computing method of the present invention and a robot main body.

In FIG. 1, reference numeral 1 designates a robot speed computing apparatus; 2 designates a robot main body; 3 designates a teaching box; 4 designates a control panel; 11 designates a built-in CPU housed in the robot speed computing apparatus 1; 12 designates memory which is connected to the CPU 11 and holds a control program executed in the way shown in FIG. 2 which will be described later; 13 designates an interface through which various signals are exchanged between the CPU 11, and the teaching box 3 and the control panel 4; 14a to 14d designate servo drivers for actuating motors 15a to 15d which will be described later and are incorporated into the robot main body 2, on the basis of an instruction received from the CPU 11; 15a to 15d designate the built-in motors of the robot main body 2 which actuate a robot arm; and 16a to 16d designate encoders which are incorporated into the joint of the robot arm 2 together with the motors 15a to 15d and detect the position and angle of the robot arm actuated by the motors 15a to 15d.

The operations of the robot locus controller and the robot main body of the first embodiment will be described with reference to a flowchart shown in FIG. 2.

Figure 2:
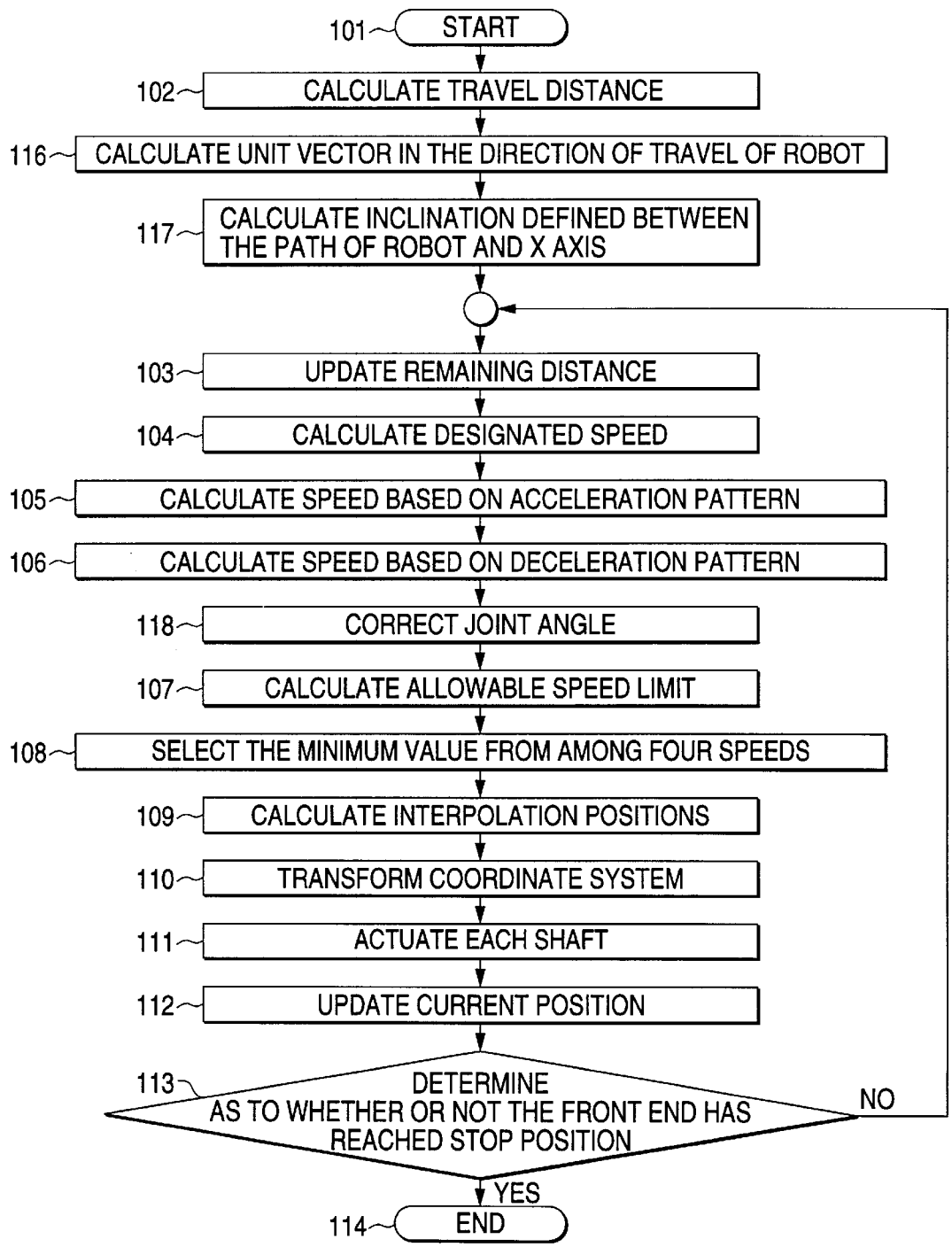
FIG. 2 is a flowchart showing the operation of the robot speed computing apparatus according to a first embodiment of the present invention.

FIG. 2 is a flowchart showing a robot speed computing method which is executed according to a control program stored in memory 12. The steps which are the same as those of the conventional basic control method shown in FIG. 19 are assigned the same step numbers, and their explanations will be omitted here.

Figure 19:
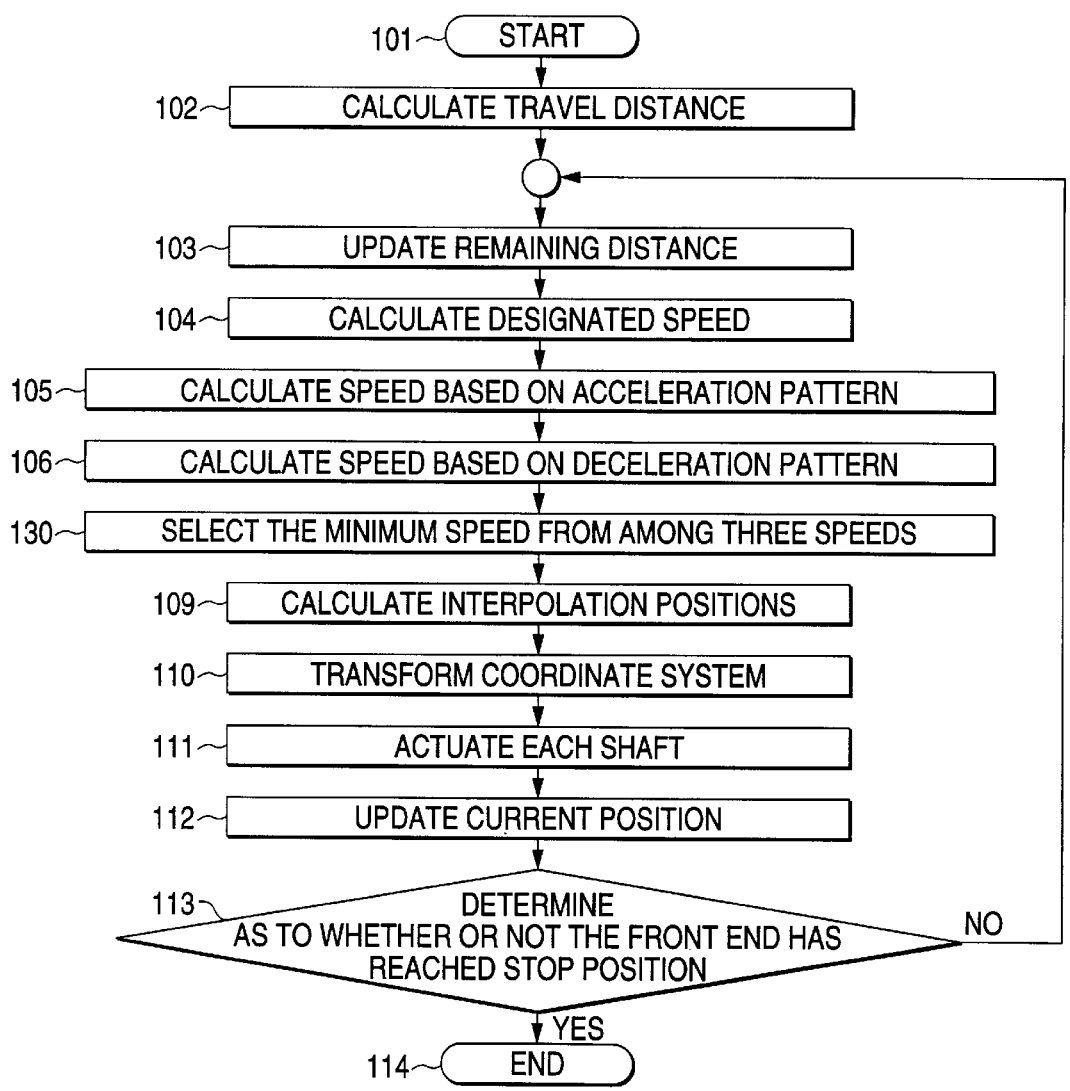
FIG. 19 is a flowchart showing a linear interpolation method for a robot speed computing apparatus in the prior art.
Figure 20:
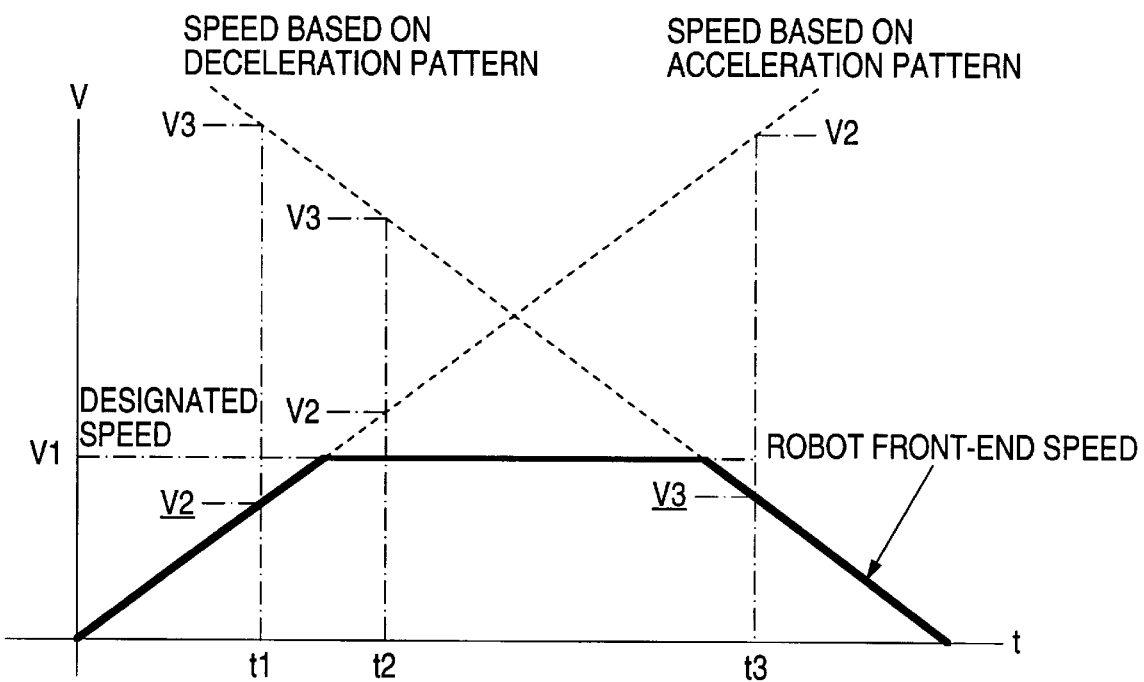
FIG. 20 is a plot showing the state of speed of the conventional robot.
Figure 21:
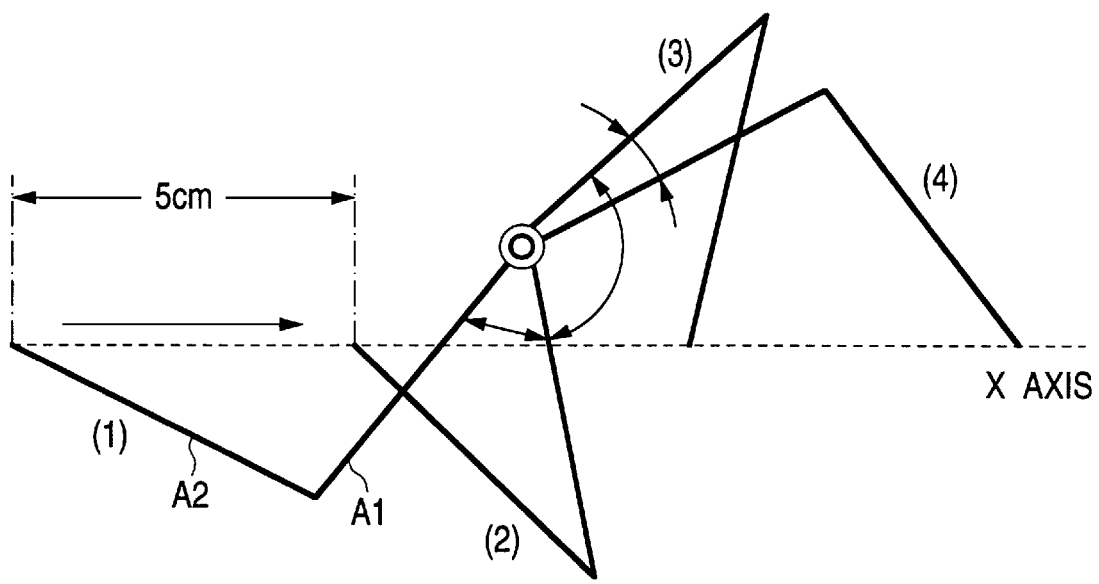
FIG. 21 is a plot showing the operation of the conventional robot which passes a singular area.
Figure 22:
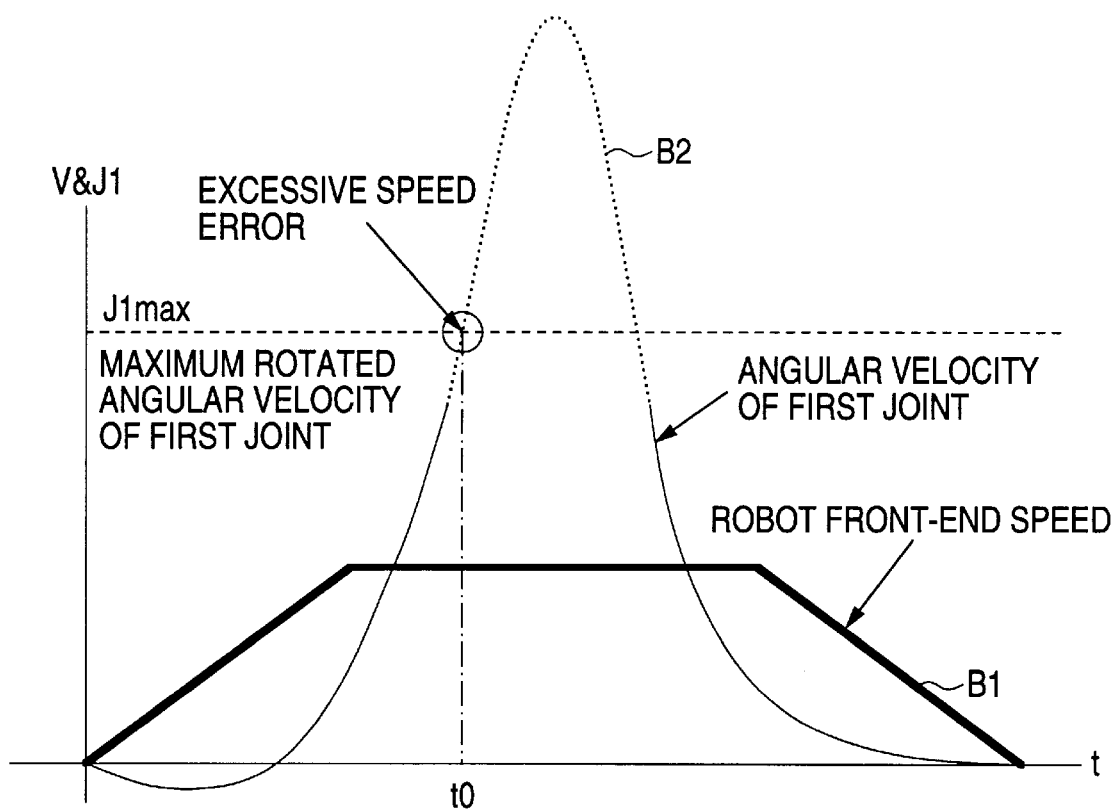
FIG. 22 is a plot showing the state of speed of the conventional robot, wherein the vertical axis is the speed of the front end of the robot and the rotational angular velocity of the first joint shaft, and the horizontal axis is time.
Figure 23:
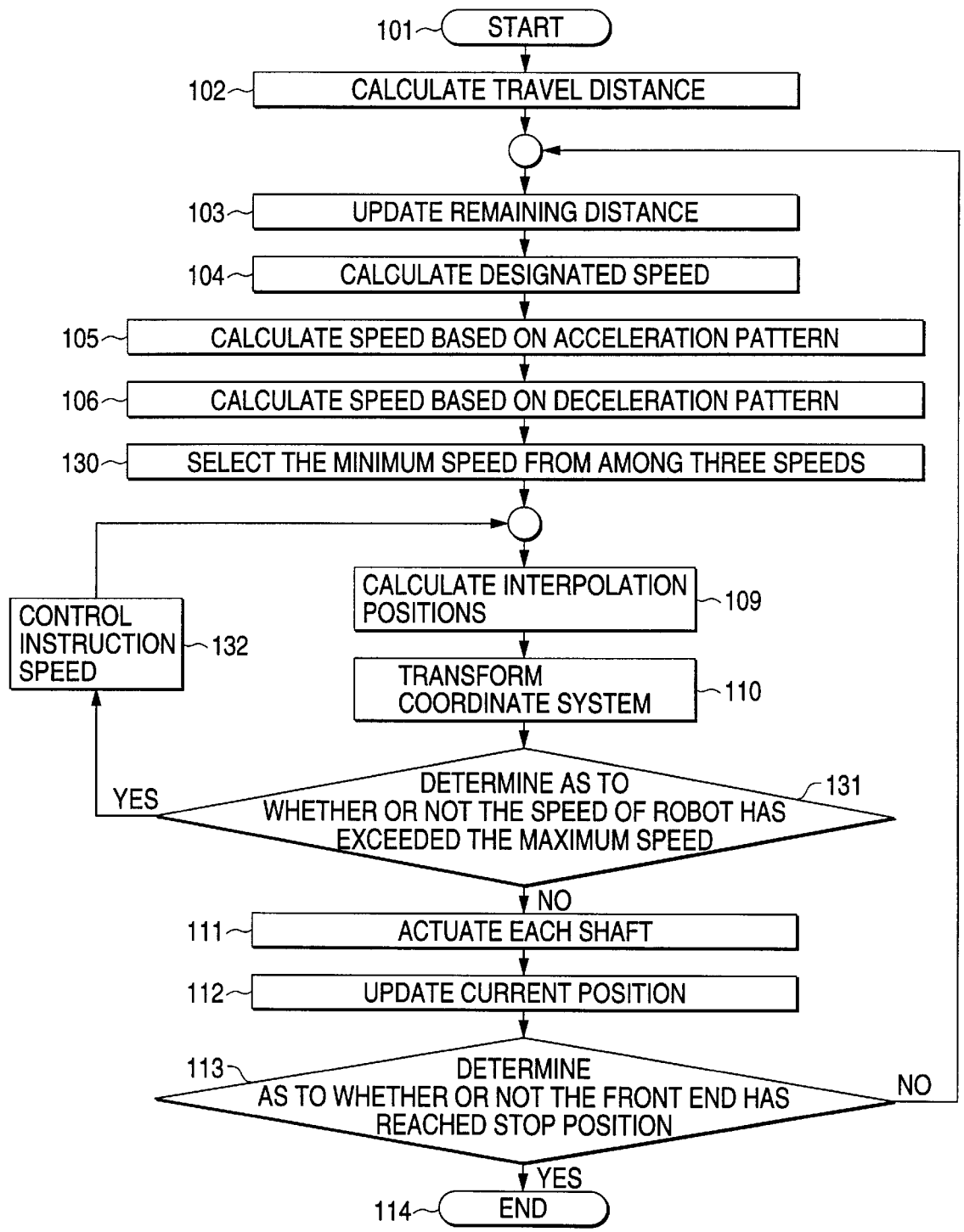
FIG. 23 is a flowchart showing a linear interpolation method computing apparatus which is based on another conventional technology using a feedback technique.

The processing carried out in steps 101 and 102 shown in FIG. 2 is the same as that of the conventional basic control method shown in FIG. 19.

In the first embodiment, a unit vector along the path between the starting point and the stop point of an linear interpolation operation is calculated in step 116.

Figure 5:
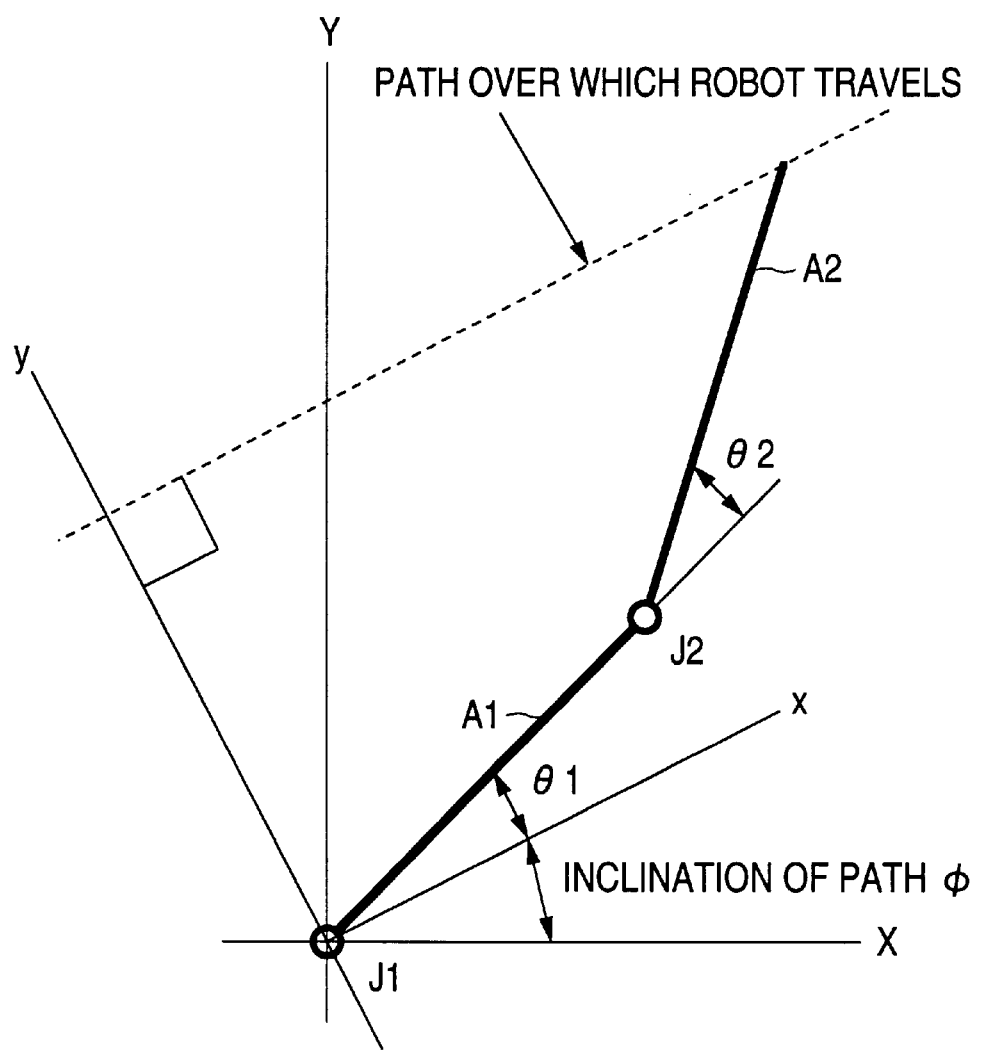
FIG. 5 is a plot showing the path over which the robot travels.

Subsequently, an angle $\phi$ (hereinafter referred to as the inclination of a path) defined between the path and the X axis is calculated in step 117, as shown in FIG. 5.

The processing carried out in steps 103 to 106 is the same as that of the conventional basic control method shown in FIG. 19.

In step 118, the axes of a coordinate system are rotated in the direction parallel to the path of the robot arm on the basis of the inclination of the path calculated in step 117, as shown in FIG. 5. In short, the inclination of the path is subtracted from the angle of the first joint shaft by use of the following expression (13).

$$\theta1 = \theta1 - \phi \quad (13)$$

Of the speeds of linear interpolation operations of the front end of the robot which can operate at the maximum angular velocity of the joint at the current position, the maximum speed (hereinafter referred to as "an allowable speed limit") is calculated in step 107 by use of the following expression (14) (The fact that this expression designates an allowable speed limit will be described in detail later.).

An angle $\theta1$ of the first joint is based on the coordinate system whose axes are rotated so as to become parallel to the path obtained as a result of subtraction of the inclination of the path from the angle of the first joint in step 118.

$$V\text{limit} = \frac{\sin(\theta2) \times L_1}{\cos(\theta1 + \theta2)} \times J_1\max \quad (14)$$

In step 108, the minimum speed is selected as an instruction speed from among the four speeds calculated in steps 104, 105, 106, and 107.

Figure 3:
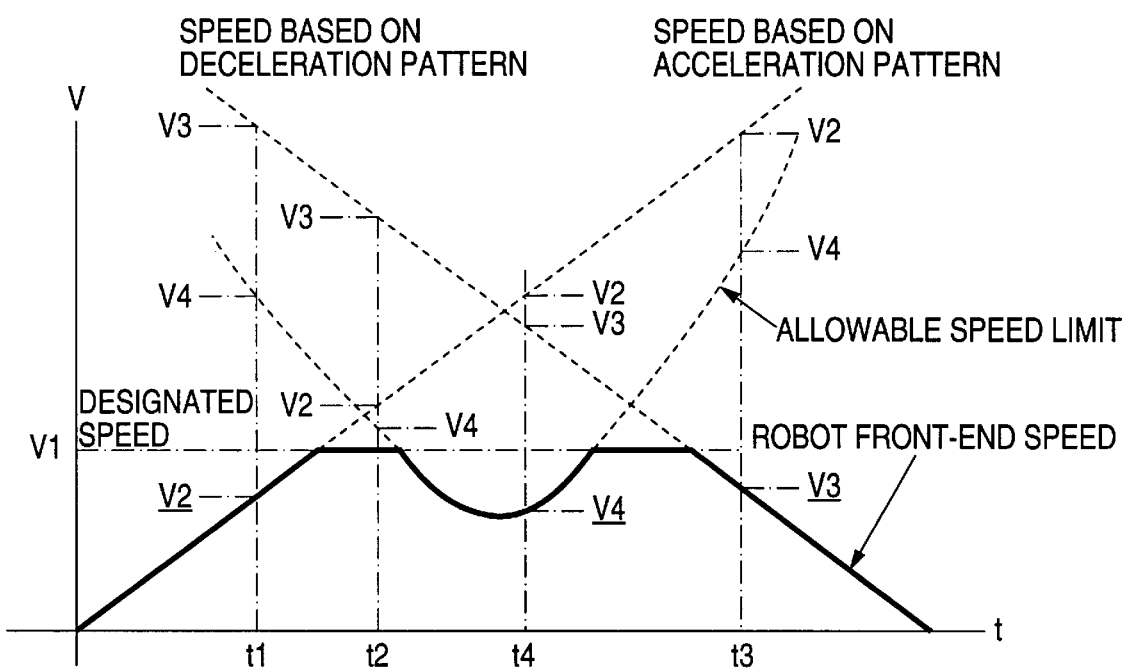
FIG. 3 is a plot showing the state of speed of the robot of the present invention.

In FIG. 3 which shows the state of speed and has the speed of the front end of the robot as the vertical axis and the time as the horizontal axis, if time t=t1, speed v2 associated with the operation of an acceleration pattern calculated in step 105 is the minimum speed. Therefore, this speed is adopted.

Similarly, if time t=t2, speed v1 associated with a constant-speed operation calculated in step 104 is the minimum speed. Therefore, this speed is adopted.

Similarly, if time t=t3, speed v3 associated with the operation of a deceleration pattern calculated in step 106 is the minimum speed. Therefore, this speed is adopted.

Similarly, if time t=t4, the front end of the robot is situated in the singular area. In this state, the allowable speed limit Vlimit calculated in step 107 is the minimum speed. Therefore, this speed is adopted.

Steps 109 through 114 are the same as those of the conventional basic control method shown in FIG. 19. In short, interpolation positions along which the robot arm travels at the instruction speed adopted in step 108, is calculated from the current position in step 109. Coordinates of the positions are converted in step 110. Each shaft is actuated in step 111. The current position of the robot is updated in step 112. It is decided in step 113 whether or not the robot arm has arrived at the stop point. If the robot arm has arrived at the stop point, the processing will be terminated in step 114. In contrast, if the robot arm has not arrived at the stop point yet, a remaining distance will be updated as in the case of the method shown in FIG. 19.

The details of the expression (14) used in step 107 in order to obtain the allowable speed limit will be described with reference to the accompanying drawings.

Figure 4:
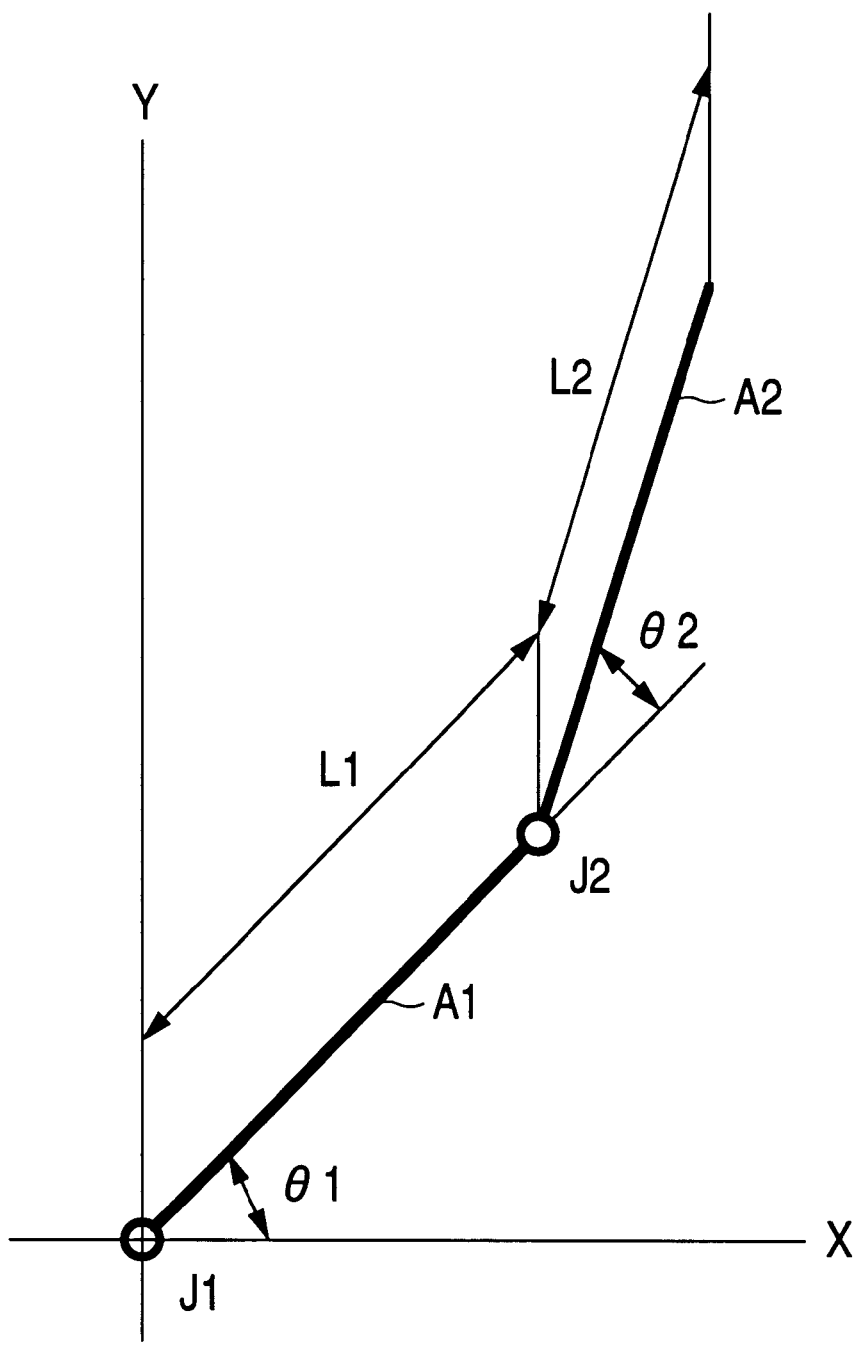
FIG. 4 is a structural chart of a scalar robot having two degrees of freedom within a horizontal plane which is to be controlled in the first embodiment.

In a scalar robot shown in FIG. 4, the relationship between the speed of the front end of the robot and the angular velocity of the joint based on the assumption that the angle of the joint is ($\theta1$, $\theta2$) can be expressed as the following expression (15) by use of a Jacobian matrix J.

$$\frac{d}{dt}\begin{vmatrix}x\\y\end{vmatrix} = J\frac{d}{dt}\begin{vmatrix}\theta1\\\theta2\end{vmatrix} \quad (15)$$

In the above-described expression, J designates a Jacobian matrix defined as the following expression 16.

$$J = \begin{vmatrix} -L1\sin(\theta1) - L2\sin(\theta1+\theta2) & -L2\sin(\theta1+\theta2) \\ -L1\cos(\theta1) - L2\cos(\theta1+\theta2) & -L2\cos(\theta1+\theta2) \end{vmatrix} \quad (16)$$

From the speed of the front end of the robot arm, the following expression (17) is established with respect to the speed of the angular velocity of the joint by means of an inverse Jacobian matrix Jr.

$$\frac{d}{dt}\begin{vmatrix}\theta1\\\theta2\end{vmatrix} = Jr\frac{d}{dt}\begin{vmatrix}x\\y\end{vmatrix} \quad (17)$$

In the above-described expression, Jr designates an inverse Jacobian matrix as defined in the following expression (18).

$$Jr = \frac{1}{L2\sin(\theta 2)} \begin{vmatrix} \cos(\theta 1 + \theta 2) & \sin(\theta 1 + \theta 2) \\ -\cos(\theta 1) - \cos(\theta 1 + \theta 2) & -\sin(\theta 1) - \sin(\theta 1 + \theta 2) \end{vmatrix} \quad (18)$$

The above expression (18) is a simultaneous equation with two unknowns. The first expression of this simultaneous equation designates the relationship between the angular velocity of the joint of the first shaft and the speed of the front end of the robot arm. For brevity, the axes of the coordinate system are previously rotated so as to come into line with the direction of the travel path of the robot arm, as shown in FIG. 5. The resultant vector has only the component of speed in the X direction, and the component of speed in the Y direction of the vector becomes zero. As a result, the angular velocity J1 of the joint of the first shaft is defined as the following expression (19).

$$J1 = \frac{\cos(\theta 1 + \theta 2)}{\sin(\theta 2) \times L1} \frac{dx}{dt} \quad (19)$$

The maximum rotational angular velocity serving as a rated value which prevents excessive speed errors from arising in the first shaft, is defined as J1max. The speed of the front end of the robot arm; i.e., an allowable speed limit of the front end of the robot arm, is defined as Vlimit.

The relationship between J1max and Vlimit can be expressed as the following expression (20).

$$J1\max = \frac{\cos(\theta 1 + \theta 2)}{\sin(\theta 2) \times L1} V\text{limit} \quad (20)$$

The above expression can be rearranged into the following expression (21) with regard to Vlimit.

$$V\text{limit} = \frac{\sin(\theta 2) \times L1}{\cos(\theta 1 + \theta 2)} J1\max \quad (21)$$

According to the previously-described first embodiment, an allowable speed limit is calculated in step 107. The thus-calculated allowable speed limit is compared with the speed determined by the conventional method in step 108. In a case where a speed instruction, which is related to the linear interpolation operation of the front end of the robot arm and exceeds the maximum rated angular velocity of the joint, is formed by the conventional method, the speed of the linear interpolation operation of the front end of the robot capable of operating at the maximum rated angular velocity of the joint; i.e., at an allowable speed limit, is adopted instead of the speed instruction determined by the conventional method. Therefore, in a case where the front end of the robot arm passes the vicinity of the point of origin during the course of its linear interpolation operations, it is possible to prevent the joint from receiving a speed instruction which exceeds the maximum rated angular velocity, and it is also possible for the robot arm to travel at the maximum speed while preventing excessive speed errors from arising in the joint.

Figure 6:
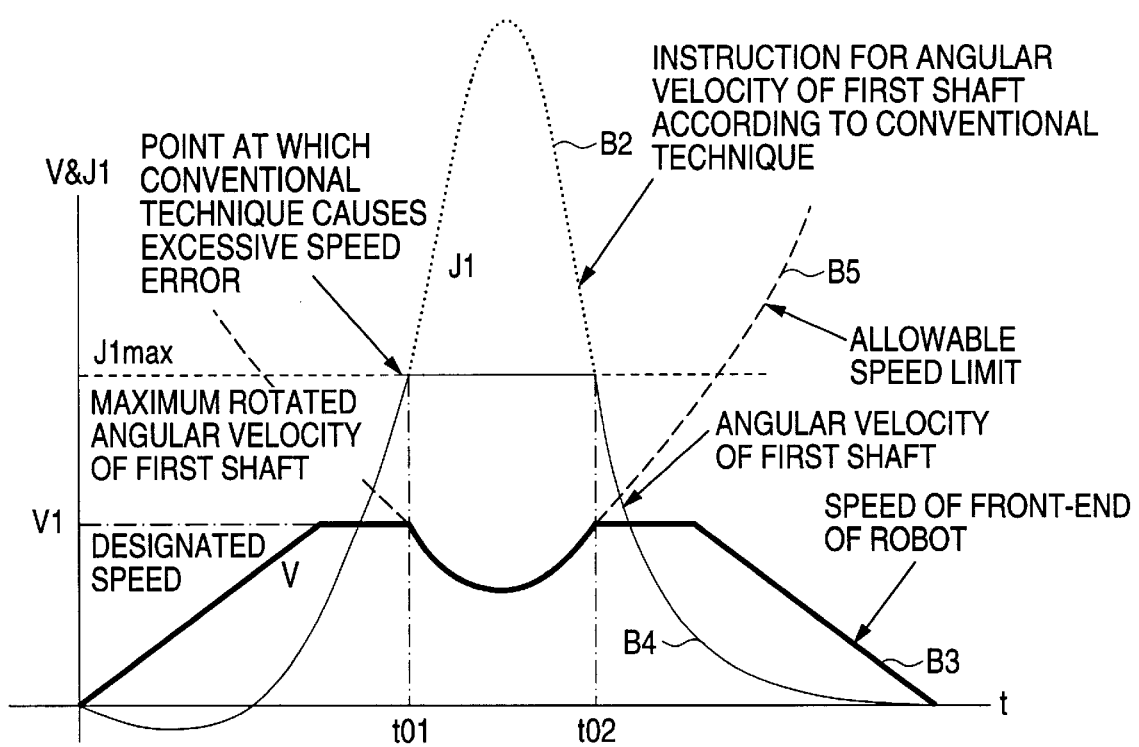
FIG. 6 is a graph showing the state of speed, wherein the vertical axis is the speed of the front end of the robot and the rotational angular velocity of a first joint shaft and the horizontal axis is time.

The state of speed of the robot arm shown in FIG. 6 will be described, wherein the vertical axis represents the speed of the front end of the robot arm and the rotational angular velocity of the first joint shaft, and the horizontal axis represents time. In the drawing, trapezoidal diagram B3 has an indented plateau. This trapezoidal diagram B3 represents the speed of the front end of the robot arm. In contrast, a concave function diagram B4 represents a rotational angular velocity of the first joint. Further, diagram B5 designates the allowable speed limit calculated in step 107 shown in FIG. 2. Diagram B2 designates the angular velocity of the first shaft calculated by the conventional technique.

More specifically, the first joint is actuated as the front end of the robot arm travels. As a result, the rotational angular velocity gradually increases. The rotational angular velocity of the first shaft reaches its maximum rated angular velocity at time t=t01 shown in FIG. 6. At this time, the allowable speed limit calculated in step 107 is reduced so as to become less than a designated speed V1. This allowable speed limit is adopted in step 108. Hence, the diagram B4 related to the angular velocity of the first shaft assumes a concave function curve having a plateau at level J1max. As the front end approaches the point of origin, the speed of the front end of the robot arm is reduced. The speed of the front end of the robot arm becomes minimum when the front end approaches closest to the point of origin. Then, as the front end of the robot arm departs from the point of origin, the speed of the front end of the robot becomes greater. The locus control method is switched from the method of the present invention to the conventional method at t=t02 where the allowable speed limit and the designated speed V1 become equal to each other as designated by the diagram B5. For this reason, the diagram B3 related to the speed of the front end of the robot arm becomes to have an indented plateau. As described above, the instruction angular velocity output to the first joint is prevented from exceeding the maximum rated angular velocity J1max. The robot can continue performing operations while preventing excessive speed errors from occurring.

According to the first embodiment, the allowable speed limit is calculated in step 107. The thus-calculated allowable speed limit is compared with the speed determined by the conventional method in step 108. In a case where a speed instruction, which is related to the linear interpolation operation of the front end of the robot arm and exceeds the maximum rated angular velocity of the joint, is formed by the conventional method, the speed of the linear interpolation operation of the front end of the robot capable of operating at the maximum rated angular velocity of the joint; i.e., at an allowable speed limit, is adopted instead of the speed instruction determined by the conventional method. As a result, it is possible to obtain the maximum speed of the front end of the robot arm which does not exceed the maximum rated angular velocity of the joint shaft, without use of the feedback technique that requires discarding of the computational result of transformation of the coordinate system which is carried out in step 110 and imposes a great computational load on the computer, in a case where the robot arm passes the vicinity of the point of origin during its course of linear interpolation operations.

Further, according to the first embodiment, the allowable speed limit is calculated in step 107. The thus-calculated allowable speed limit is compared with the speed determined by the conventional method in step 108. In a case where a speed instruction, which is related to the linear interpolation operation of the front end of the robot arm and exceeds the maximum rated angular velocity of the joint, is formed by the conventional method, the speed of the linear interpolation operation of the front end of the robot capable of operating at the maximum rated angular velocity of the joint; i.e., at an allowable speed limit, is adopted instead of the speed instruction determined by the conventional method. As a result, it is possible to obtain the maximum speed of the front end of the robot arm which does not exceed the maximum rated angular velocity of the joint shaft, without use of the feed-forward technique that may result in unstable control, in a case where the robot arm passes the vicinity of the point of origin during its course of linear interpolation operations.

(SECOND EMBODIMENT)

In the previously-described first embodiment, the scalar robot having two degrees of freedom within a horizontal plane is to be controlled. In contrast, of the scalar robots having two degrees of freedom within a horizontal plane, a three-degree-of-freedom scalar robot having a front end attitude shaft is to be controlled in a second embodiment.

Figure 7:
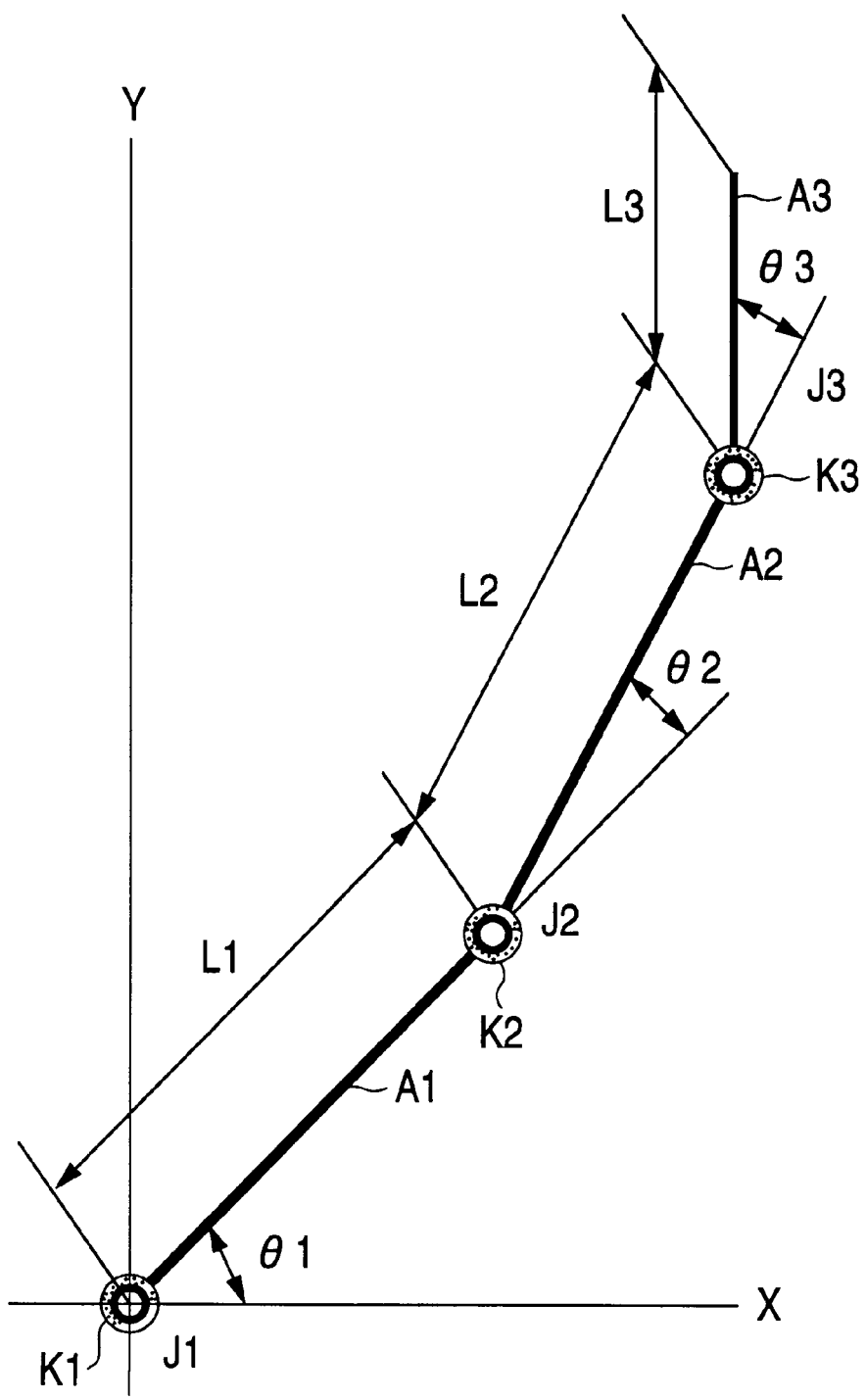
FIG. 7 is a structural chart of a scalar robot which has three degrees of freedom within a horizontal plane and a front end attitude shaft to be controlled in a second embodiment.

FIG. 7 shows the mechanism of the three-degree-of-freedom scalar robot having a front end attitude shaft to be controlled in the second embodiment. In the drawing, reference symbol A1 designates a first shaft; A2 designates a second shaft; A3 designates a third shaft which acts as the front end attitude shaft; K1 designates a first joint; K2 designates a second joint; and K3 designates a third joint.

The operation of the three-degree-of-freedom scalar robot of the second embodiment will be described with reference to a flowchart shown in FIG. 8.

Figure 8:
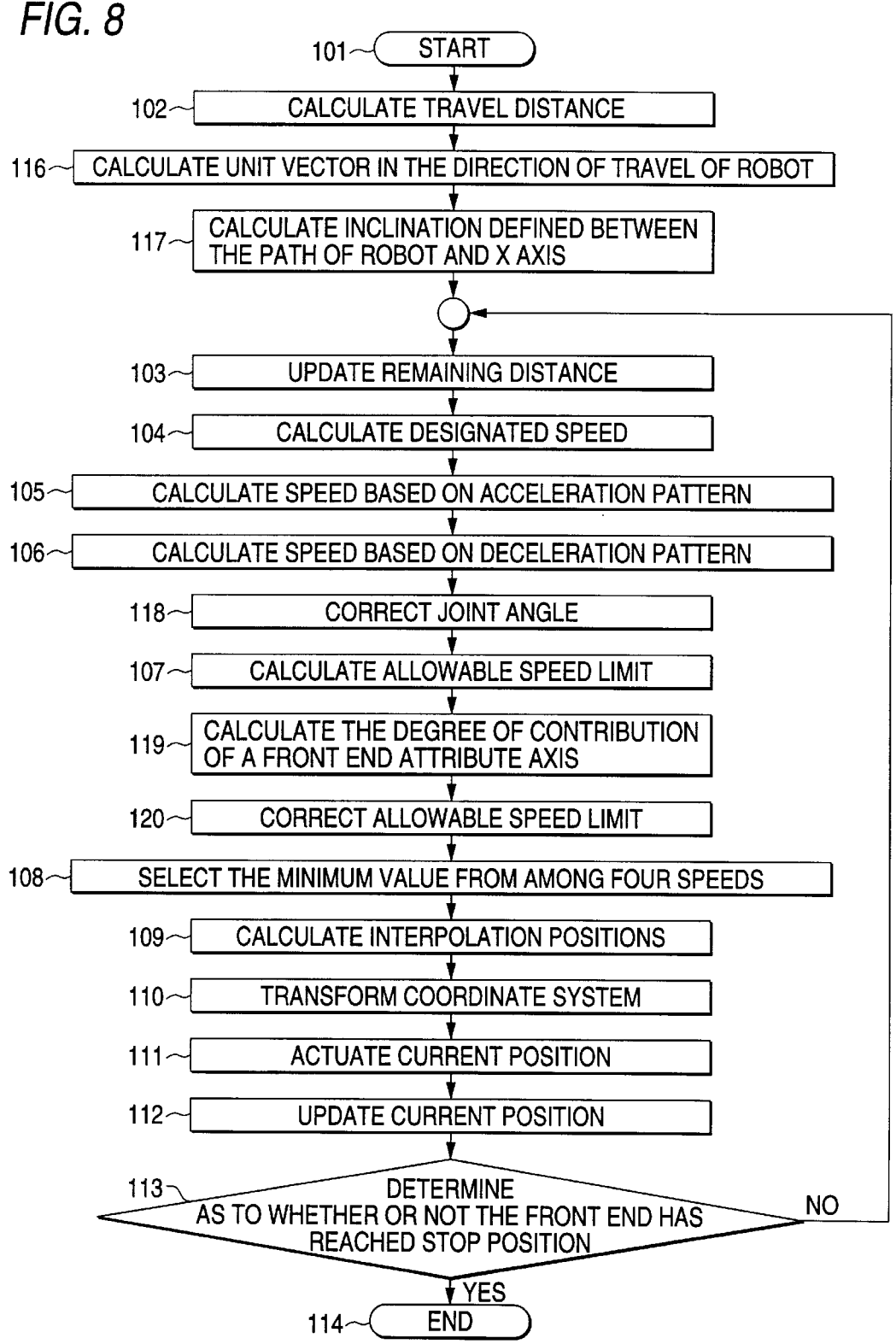
FIG. 8 is a flowchart showing the operation of the robot according to the second embodiment.

FIG. 8 is a flowchart showing a robot speed computing method to be executed according to a control program of the second embodiment. The steps which are the same as those of the conventional basis control method shown in FIG. 19 will be assigned the same reference numerals, and their explanations will be omitted here.

To begin with, the processing carried out between steps 101 to 107 is the same as the processing of the first embodiment shown in FIG. 2.

A contribution of the front end attitude shaft is calculated in step 119 using the following mathematical expression (22) in the second embodiment. Details of the expression (22) used in calculating the contribution of the front end attitude shaft will be described later.

$$M = \frac{D \cdot \cos(\theta 1 + \theta 2)}{D \cdot \cos(\theta 1 + \theta 2) + L3 \cdot Prca \cdot \sin(\theta 3)} \quad (22)$$

where D is a remaining travel distance from the current position to a target position, and Prca is a remaining angle through which the robot travels from the angle of the current attitude to the angle of a target attitude.

In step 120, the allowable speed limit calculated in step 107 is multiplied by the contribution of the front end attitude shaft calculated in step 119 using the following expression (23), whereby the allowable speed limit is corrected.

$$Vlimit = Vlimit \times M \quad (23)$$

Subsequently, the processing related to steps 108 to 114 is the same as that of the first embodiment shown in FIG. 2.

The details of the expression (22) used in step 119 when calculating the contribution of the front end attitude shaft will be described.

In the case of a scalar robot shown in FIG. 4, provided that the position of the front end of the robot is (X, Y, A) [A will be referred to hereinafter as the "angle of attitude of the front end attitude shaft"], and that a joint angle (θ1, θ2, θ3), the relationship between the speed of the front end and the angular speed of the joint can be expressed as the following equation (24) by use of a Jacobian matrix J.

$$\frac{d}{dt}\begin{vmatrix} x \\ y \\ A \end{vmatrix} = J\frac{d}{dt}\begin{vmatrix} \theta 1 \\ \theta 2 \\ \theta 3 \end{vmatrix} \quad (24)$$

where j designates a Jacobian matrix as defined in the following expression (25).

$$J = \begin{bmatrix} l1\sin(\theta 1) - l2\sin(\theta 1 + \theta 2) - l3\sin(\theta 1 + \theta 2 + \theta 3) & -l2\sin(\theta 1 + \theta 2) - l3\sin(\theta 1 + \theta 2 + \theta 3) & -l3\sin(\theta 1 + \theta 2 + \theta 3) \\ l1\cos(\theta 1) + l2\cos(\theta 1 + \theta 2) + l3\cos(\theta 1 + \theta 2 + \theta 3) & l2\cos(\theta 1 + \theta 2) + l3\cos(\theta 1 + \theta 2 + \theta 3) & l3\cos(\theta 1 + \theta 2 + \theta 3) \\ 1 & 1 & 1 \end{bmatrix} \quad (25)$$

Accordingly, from the speed of the front end of the robot arm, the following expression (26) is established with regard to the angular velocity of the joint by means of an inverse Jacobian matrix Jr.

$$\frac{d}{dt}\begin{vmatrix} \theta 1 \\ \theta 2 \\ \theta 3 \end{vmatrix} = Jr\frac{d}{dt}\begin{vmatrix} x \\ y \\ A \end{vmatrix} \quad (26)$$

In the above-described expression, Jr is an inverse Jacobian matrix as defined by the following expression (27).

$$Jr := \begin{bmatrix} \frac{\cos(\theta 1 + \theta 2)}{l1\sin(\theta 2)} & \frac{\sin(\theta 1 + \theta 2)}{l1\sin(\theta 2)} & \frac{l3\sin(\theta 3)}{l1\sin(\theta 2)} \\ -\frac{\cos(\theta 1)}{l2\sin(\theta 2)} - \frac{\cos(\theta 1 + \theta 2)}{l1\sin(\theta 2)} & -\frac{\sin(\theta 1)}{l2\sin(\theta 2)} - \frac{\sin(\theta 1 + \theta 2)}{l1\sin(\theta 2)} & -\frac{l3\sin(\theta 2 + \theta 3)}{l2\sin(\theta 2)} - \frac{l3\sin(\theta 3)}{l1\sin(\theta 2)} \\ \frac{\cos(\theta 1)}{l2\sin(\theta 2)} & \frac{\sin(\theta 1)}{l2\sin(\theta 2)} & 1 + \frac{l3\sin(\theta 2 + \theta 3)}{l2\sin(\theta 2)} \end{bmatrix}$$

The above-described expression (27) is a simultaneous equation with three unknowns. The first expression of this simultaneous equation designates the relationship between the angular velocity of the joint of the first shaft and the speed of the front end of the robot. For brevity, the axes of the coordinate system have previously been rotated so as come in line with the direction of the path of the robot arm, as shown in FIG. 5. A resultant vector has only the component of speed in the X direction, and the component of speed in the Y direction of the vector becomes zero. The angular velocity J1 of the joint of the first shaft is expressed as the following expression (28).

$$J1 = \frac{\cos(\theta 1 + \theta 2)}{\sin(\theta 2) \times L1} \frac{dx}{dt} + \frac{\cos(\theta 3) \times L3}{\sin(\theta 2) \times L1} \frac{dA}{dt} \quad (28)$$

The maximum rotational angular velocity serving as a rated value which prevents excessive speed errors from arising in the first shaft, is defined as J1max. The speed of the front end of the robot arm; i.e., an allowable speed limit of the front end of the robot arm, is defined as Vlimit.

From the expression (28), the relationship between J1max and the allowable speed limit can be expressed as the following expression (29).

$$V\text{limit} = \frac{\sin(\theta 2) \times L1}{\cos(\theta 1 + \theta 2)} J1\max - \frac{\cos(\theta 3) \times L3}{\cos(\theta 1 + \theta 2)} \frac{dA}{dt}$$

where Vlimit is an allowable speed limit, J1max is the maximum angular velocity of a first shaft, dA/dt is an angular velocity of the front end attitude shaft, L1 is the length of the first shaft A1, and L3 is the length of a tool (i.e., the length of a third shaft A3).

The first term of the expression (29) designates the allowable speed limit of the front end of the second shaft A2 calculated in the first embodiment. The second term of the same expression is a correction term based on the operation of the front end attitude shaft of the third shaft A3; i.e., the operation of a tool shaft.

The angular velocity dA/dt of the front end attitude shaft is not defined independently of the translation speed of the front end of the robot. In short, the completion of the translation of the front end of the robot and the completion of operation of the attitude shaft must agree with each other. A ratio of the translation speed to the angular velocity of the attitude shaft becomes equal to a ratio of a remaining translation distance and a remaining angle through which the attitude shaft moves.

The angular velocity dA/dt of the front end attitude shaft is obtained by multiplying the translation speed Vlimit by a ratio of the remaining translation distance to the remaining angle through which the attitude shaft travels, as expressed by expression (30).

$$\frac{dA}{dt} = Z \times V\text{limit} \quad (30)$$

where Z is defined as the following expression (31). More specifically, Z designates a ratio of a remaining translation distance D to a remaining angle Prca through which the attitude shaft travels. If the ratio exceeds one, the translation of the robot dominates the overall motion of the attitude shaft. In contrast, if the ratio is less than one, the motion of the tool dominates the overall motion of the robot.

$$Z = \frac{Prca}{D} \quad (31)$$

A determining expression of the angular velocity dA/dt of the front end attitude shaft is substituted into the expression of Vlimit, and the angular velocity dA/dt of the front end attitude shaft is eliminated, thereby leading to the following expression (32).

$$V\text{limit} = \frac{\sin(\theta 2) \times L1}{\cos(\theta 1 + \theta 2) + \sin(\theta 3) \times L3 \times \left(\frac{Prca}{D}\right)} \times J1\max \quad (32)$$

A numerator of the expression (32) designates the allowable speed limit of the robot without the attitude shaft calculated in the first embodiment. The denominator designates the inverse of the contribution of the attitude shaft. Provided that the contribution of the attitude shaft is M, the contribution M can be expressed as the following expression (33).

$$M = \frac{\cos(\theta 1 + \theta 2)}{\cos(\theta 1 + \theta 2) + \sin(\theta 3) \times L3 \times \frac{Prca}{D}} \quad (33)$$
$$= \frac{D \times \cos(\theta 1 + \theta 2)}{D\cos(\theta 1 + \theta 2) + L3 \times Prca \times \sin(\theta 3)}$$

If the allowable speed limit of the robot without the attitude shaft calculated in the first embodiment is multiplied by the inverse M of the contribution of the attitude shaft, it is possible to obtain the allowable speed limit in consideration of the influence of the attitude shaft.

According to the second embodiment, the contribution M of the attitude shaft is calculated instep 119, and the thus-calculated contribution M is multiplied by the allowable speed limit of the robot without the attitude shaft, whereby the allowable speed limit can be obtained in consideration of the contribution of the attitude shaft.

(THIRD EMBODIMENT)

In a third embodiment, a cylindrical robot which has two degrees of freedom within a horizontal plane and a front end attitude shaft, is to be controlled.

Figure 9:
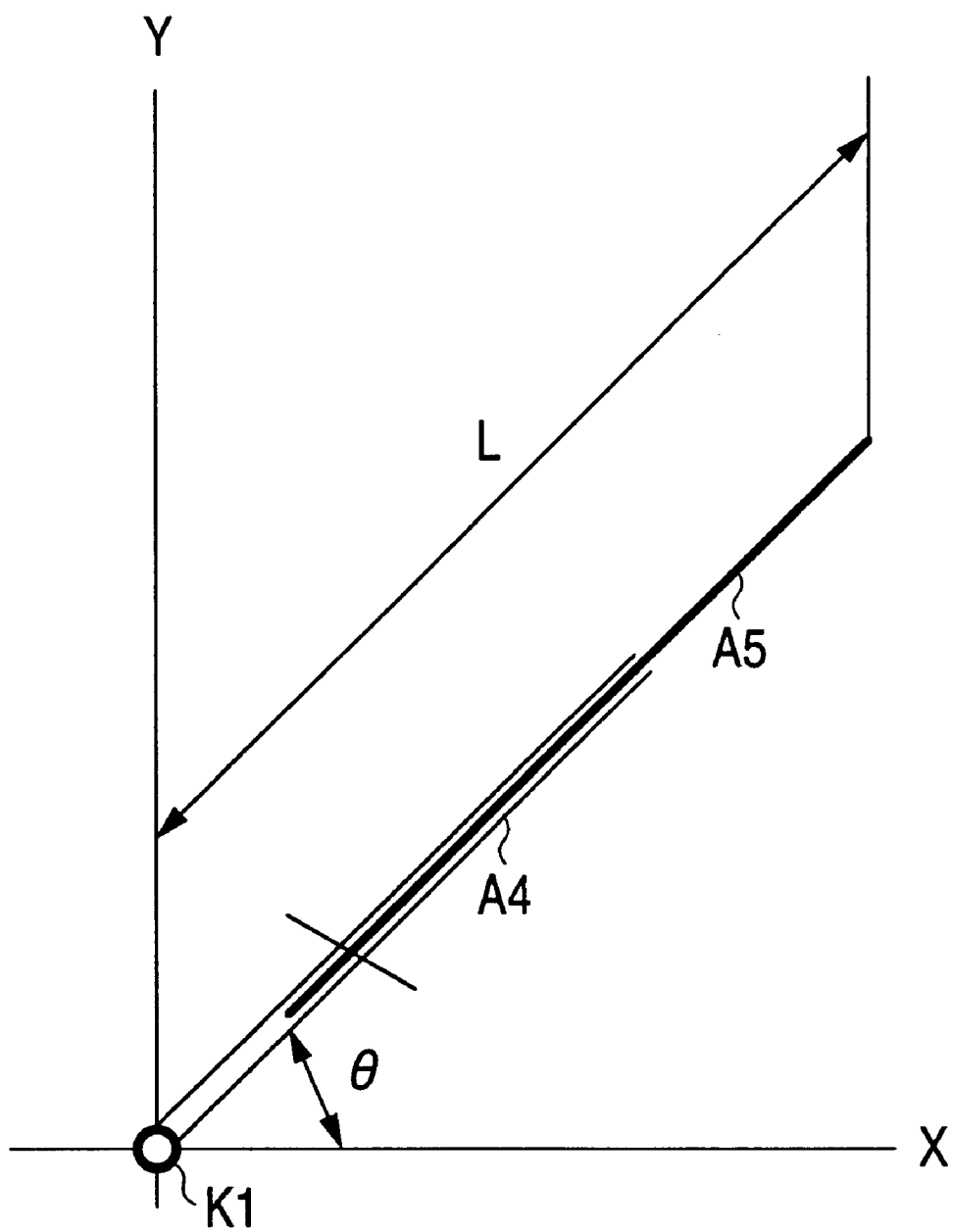
FIG. 9 is a structural chart of a cylindrical robot to be controlled in a third embodiment.

FIG. 9 shows a cylindrical robot to be controlled in the third embodiment that has two degrees of freedom within a horizontal plane and a front end attitude shaft. In the drawing, reference symbol A4 designates a cylindrical shaft; A5 designates the front end attitude shaft which extends and contracts from the cylindrical shaft A4; and K1 designates a first joint.

The operation of the cylindrical robot to be controlled in the third embodiment that has two degrees of freedom within a horizontal plane and a front end attitude shaft will be described. The operation of the robot of the third embodiment is the same as the operation of the robot of the first embodiment shown in FIG. 2. They are different from each other only with regard to the expression used in calculating an allowable speed limit. Therefore, the operation of the third embodiment will be described with reference to the flowchart shown in FIG. 2 which represents the operation of the robot of the first embodiment.

To begin with, the processing carried out in steps 101 through 118 of the third embodiment is also the same as that of the first embodiment.

The allowable speed limit of the cylindrical robot that has the front end attitude shaft and two degrees of freedom within a horizontal plane, is calculated in step 107 using the following expression (34).

$$V\text{limit} = L \times J\text{max}/\sin(\theta) \quad (34)$$

Details on the expression (34) used in calculating the allowable speed limit will be described. In the cylindrical robot shown in FIG. 4 which has the front end attitude shaft and two degrees of freedom within a horizontal plane, the relationship between the speed of the front end of the robot and the angular velocity of the joint can be expressed as the following expression (35) using a Jacobian matrix J, provided that the position of the front end of the robot is (X, Y) and the coordinates of the joint shaft is ($\theta$2).

$$\frac{d}{dt}\begin{vmatrix} x \\ x \end{vmatrix} = J \frac{d}{dt}\begin{vmatrix} L \\ \theta \end{vmatrix} \quad (35)$$

In the above-described expression, J designates a Jacobian matrix defined as the following expression 36.

$$J = \begin{vmatrix} \cos(\theta) & -L\sin(\theta) \\ \sin(\theta) & L\cos(\theta) \end{vmatrix}$$

From the speed of the front end of the robot arm, the following expression (37) is established with respect to the speed of the angular velocity of the joint by means of an inverse Jacobian matrix Jr.

$$\frac{d}{dt}\begin{vmatrix} L \\ \theta \end{vmatrix} = \begin{vmatrix} \cos(\theta) & \sin(\theta) \\ -\sin(\theta)L & \cos(\theta)/L \end{vmatrix} \begin{vmatrix} d \\ dt \end{vmatrix} \begin{vmatrix} x \\ y \end{vmatrix} \quad (37)$$

The above expression (37) is a simultaneous equation with two unknowns. The first expression of this simultaneous equation designates the relationship between the angular velocity of the joint of the first shaft and the speed of the front end of the robot arm. For brevity, the axes of the coordinate system are previously rotated so as to come into line with the direction of the travel path of the robot arm, as shown in FIG. 5. A resultant vector has only the component of speed in the X direction, and the component of speed in the Y direction of the vector becomes zero. As a result, the angular velocity J1 of the joint of the first shaft is defined as the following expression (38).

$$J1 = \frac{\sin(\theta)}{L} dx/dt \quad (38)$$

The maximum rotational angular velocity serving as a rated value which prevents excessive speed errors from arising in the first shaft, is defined as J1max. The speed of the front end of the robot arm; i.e., an allowable speed limit of the front end of the robot arm, is defined as Vlimit.

From the expression (38), the relationship between J1max and Vlimit can be expressed as the following expression (39).

$$J1\text{max} = \frac{\sin(\theta)}{L} V\text{limit} \quad (39)$$

The above expression can be rearranged into the following expression (40) with regard to Vlimit.

$$V\text{limit} = \frac{L}{\sin(\theta)} J1\text{max} \quad (40)$$

According to the previously-described third embodiment, an allowable speed limit is calculated in step 107. The thus-calculated allowable speed limit is compared with the speed determined by the conventional method in step 108. In a case where a speed instruction, which is related to the linear interpolation operation of the front end of the robot arm and exceeds the maximum rated angular velocity of the joint, is formed by the conventional method, the speed of the linear interpolation operation of the front end of the robot capable of operating at the maximum rated angular velocity of the joint; i.e., at an allowable speed limit, is adopted instead of the speed instruction determined by the conventional method. Therefore, in a case where the front end of the robot arm passes the vicinity of the point of origin during the course of its linear interpolation operations, it is possible to prevent the joint from receiving a speed instruction which exceeds the maximum rated angular velocity, and it is also possible for the robot arm to travel at the maximum speed while preventing excessive speed errors from arising in the joint.

According to the third embodiment, the allowable speed limit is calculated in step 107. The thus-calculated allowable speed limit is compared with the speed determined by the conventional method in step 108. In a case where a speed instruction, which is related to the linear interpolation operation of the front end of the robot arm and exceeds the maximum rated angular velocity of the joint, is formed by the conventional method, the speed of the linear interpolation operation of the front end of the robot capable of operating at the maximum rated angular velocity of the joint; i.e., at an allowable speed limit, is adopted instead of the speed instruction determined by the conventional method. As a result, it is possible to obtain the maximum speed of the front end of the robot arm which does not exceed the maximum rated angular velocity of the joint shaft, without use of the feedback technique that requires discarding of the computational result of transformation of the coordinate system which is carried out in step 110 and imposes a great computational load on the computer, in a case where the robot arm passes the vicinity of the point of origin during its course of linear interpolation operations.

Further, according to the third embodiment, the allowable speed limit is calculated in step 107. The thus-calculated allowable speed limit is compared with the speed determined by the conventional method in step 108. In a case where a speed instruction, which is related to the linear interpolation operation of the front end of the robot arm and exceeds the maximum rated angular velocity of the joint, is formed by the conventional method, the speed of the linear interpolation operation of the front end of the robot capable of operating at the maximum rated angular velocity of the joint; i.e., at an allowable speed limit, is adopted instead of the speed instruction determined by the conventional method. As a result, it is possible to obtain the maximum speed of the front end of the robot arm which does not exceed the maximum rated angular velocity of the joint shaft, without use of the feed-forward technique that may result in unstable control, in a case where the robot arm passes the vicinity of the point of origin during its course of linear interpolation operations.

(FOURTH EMBODIMENT)

A fourth embodiment of the present invention will be described hereinbelow.

In the fourth embodiment, a vertically articulated robot is to be controlled.

Figure 10A:
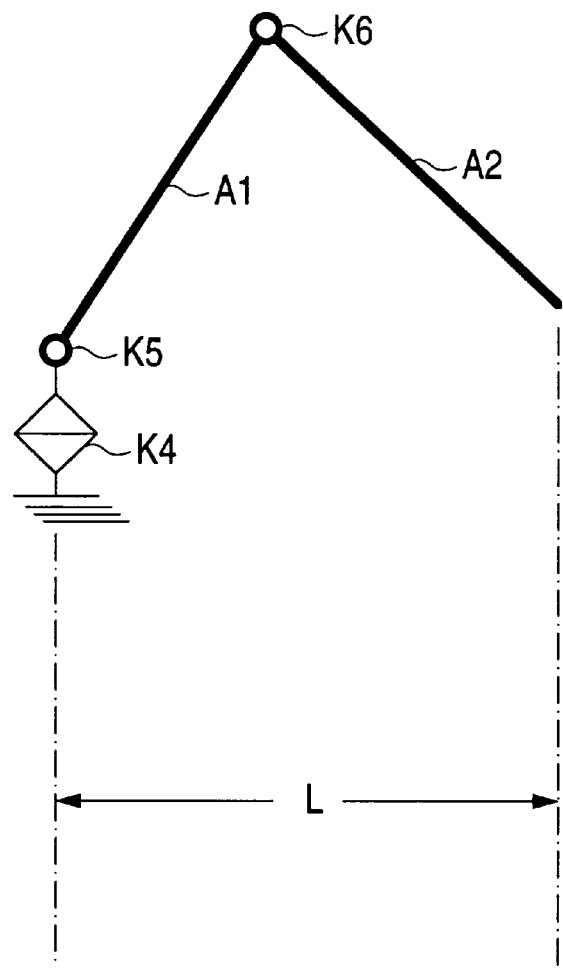
FIGS. 10A and 10B are structural charts of a vertically articulated robot to be controlled in a fourth embodiment.

FIG. 10A shows the mechanism of a vertically articulated robot of the fourth embodiment. In the drawing, reference symbol A1 designates a first arm; A2 designates a second arm; K4 designates a first joint (a pivot); K5 designates a second joint (a shoulder shaft); and K6 designates a third joint (an elbow shaft).

The operation of the vertically articulated robot of the fourth embodiment having the previously-described construction will be described.

Figure 10B:
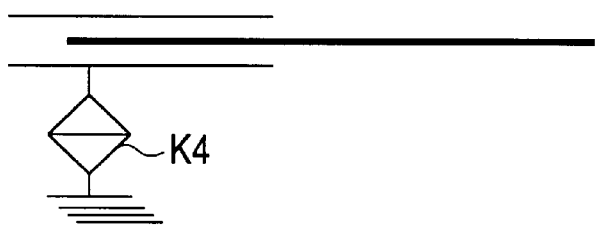
Figure 11:
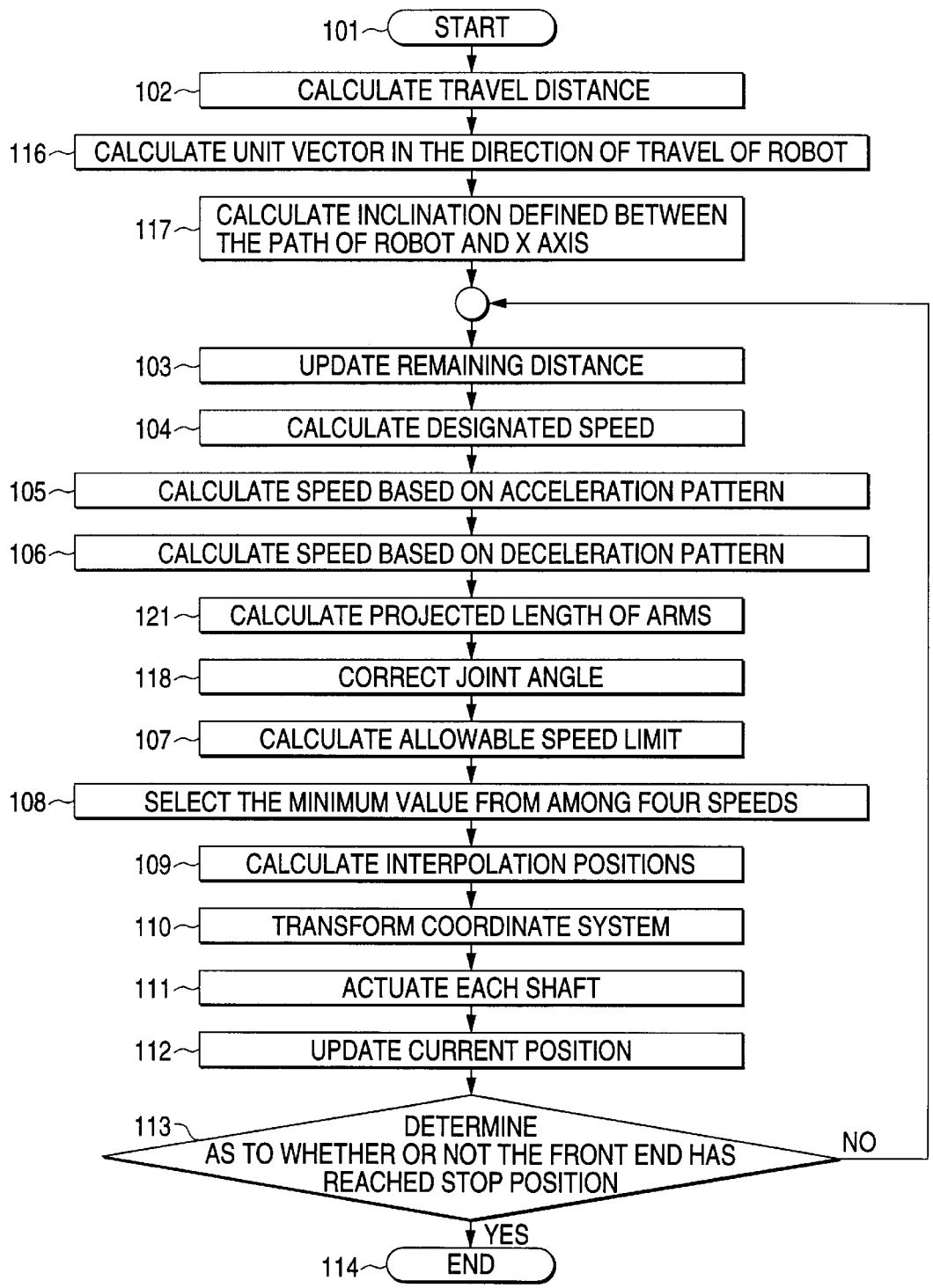
FIG. 11 is a flowchart showing the operation of the robot of the fourth embodiment.

FIG. 11 is a flowchart showing the operation of the vertically articulated robot of the fourth embodiment shown in FIGS. 10A and 10B.

To begin with, the processing carried out between steps 101 to 106 is the same as the processing of the third embodiment shown in FIG. 8.

In the fourth embodiment, the length L of the first and second arms A1 and A2 projected on the horizontal plane is calculated in step 121 using the following expression (41).

$$L = L1 \times \cos(\theta 2) + L2 \times \cos(\theta 2 + \theta 3) \qquad (41)$$

where L1 designates the length of the first arm A1, L2 designates the length of the second arm A2, θ2 designates the angle of the second joint (i.e., the shoulder shaft) K5, and θ3 designates the angle of the third joint (i.e., the elbow shaft) K6.

As a result of projection of the vertically articulated robot shown in FIG. 10A onto the horizontal plane, it becomes equal to the cylindrical robot of the third embodiment that is defined by the projected arm length L shown in FIG. 10B and the angle θ1 of the first joint (i.e., the pivot) K4.

The processing carried out between steps 118 to steps 114 is the same as that of the third embodiment shown in FIG. 8.

According to the fourth embodiment, the vertically articulated robot shown in FIG. 10A is projected on the horizontal plane, and it is considered to be equivalent to the cylindrical robot of the third embodiment shown in FIG. 9, as shown in FIG. 10B. As a result, it is possible to easily execute an arithmetic operation by reducing the degree of freedom of contraction.

(FIFTH EMBODIMENT)

The previously-described first through fourth embodiments are directed to the speed computing apparatus or the speed computing method, wherein the current position of the front end of the robot is managed by the overall coordinate system of the robot, and the angle of a joint is also controlled. In the embodiments, the locus control method that permits passage of the robot in the vicinity of the point of origin during the course of its linear interpolation operation, is practiced.

In the case of an expensive robot possessing limited functions, storage capacity is cut down on, or a CPU having small computing power is used. In such a case, the robot employs a speed computing apparatus or a speed computing method which does not hold information regarding a joint at the current position of the robot. There will be described an embodiment of a locus control method for use with a scalar robot having two degrees of freedom within a horizontal plane which permits passage of the robot in the vicinity of the point of origin during the course of its linear interpolation operation.

Figure 12:
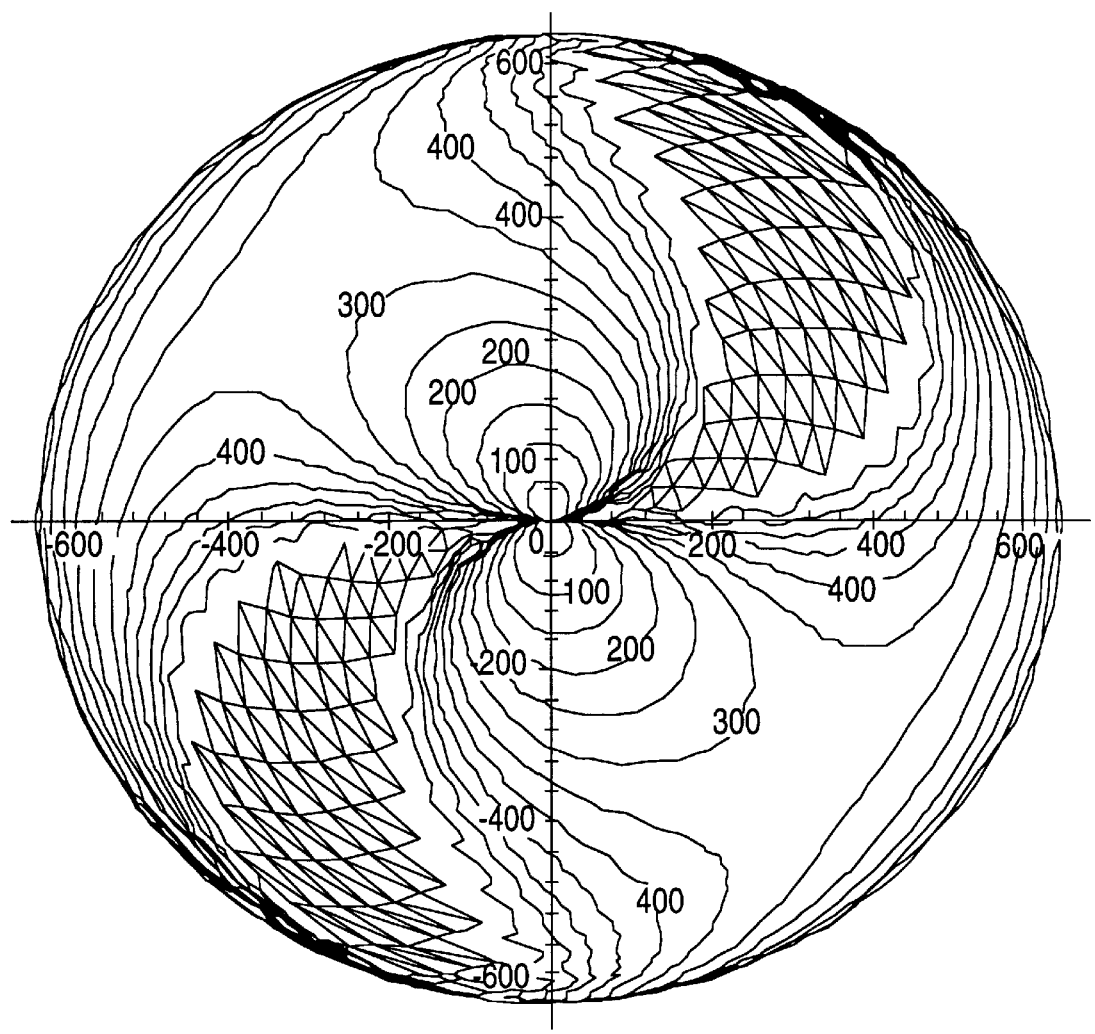
FIG. 12 is a contour line diagram of an allowable speed limit of a scalar robot having two degrees of freedom within a horizontal plane.
Figure 13:
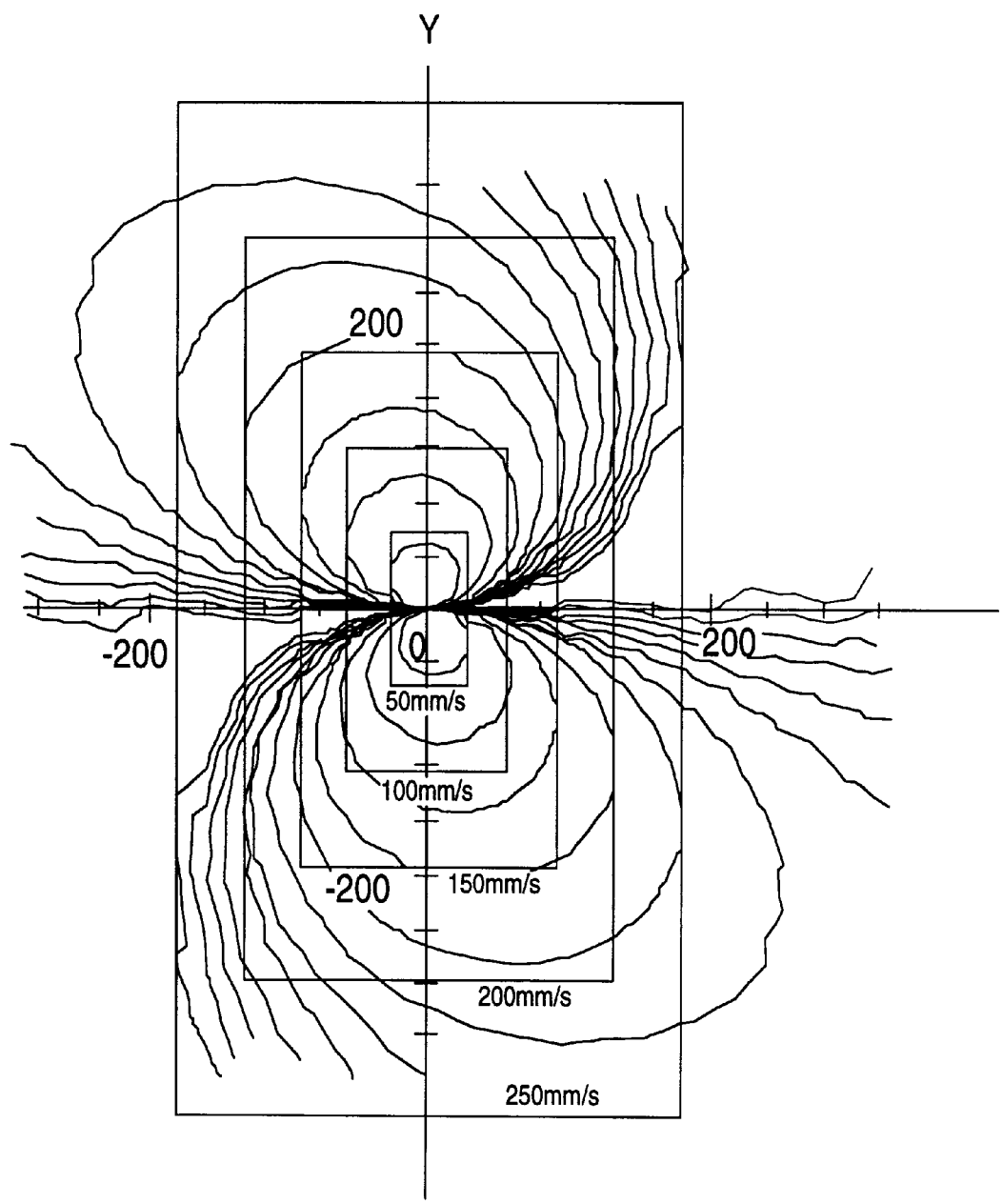
FIG. 13 is a rectangularly-approximated contour line diagram of an allowable speed limit of a scalar robot having two degrees of freedom within a horizontal plane.

In the scalar robot having two degrees of freedom within a horizontal plane shown in FIG. 4, a contour line of the allowable speed limit consists of distorted twin ellipses, as shown in FIG. 12. The contour line is approximated to twin squares circumscribed about the distorted twin ellipses; namely, a rectangle having a side ratio of one to two, as shown in FIG. 13. In this case, these two squares are symmetrical about the coordinate axis parallel to the direction of the path of the robot. The allowable speed limit of the front end of the robot can be easily determined by retrieving the approximated contour line on the basis of values of the coordinate having its axes rotated so as to come into line with the direction of the path.

The contour line of the allowable speed limit which assumes the distorted ellipse is approximated to the square circumscribed about the distorted ellipse. As a result, the contour line of the allowable speed limit is approximated to the square having side length which is equivalent to a smaller absolute value of the X and Y coordinates of the position of the front end of the robot in the rotated coordinate system (X, Y).

A one-dimensional corresponding table of the side length of the square and the allowable speed limit is previously prepared. This table is retrieved using a smaller absolute value of the X and Y coordinates of the position of the front end of the robot in the rotated coordinate system (X, Y) as an index, whereby the allowable speed limit can be calculated. Contrasted with trigonometric functions such as a sine operation or a cosine operation, the retrieval calculation can be effected by use of only the comparison between a large value and a small value. Therefore, a computational load imposed on the computer becomes smaller, which in turn makes it possible to realize facilitated high-speed computation.

Figure 14:
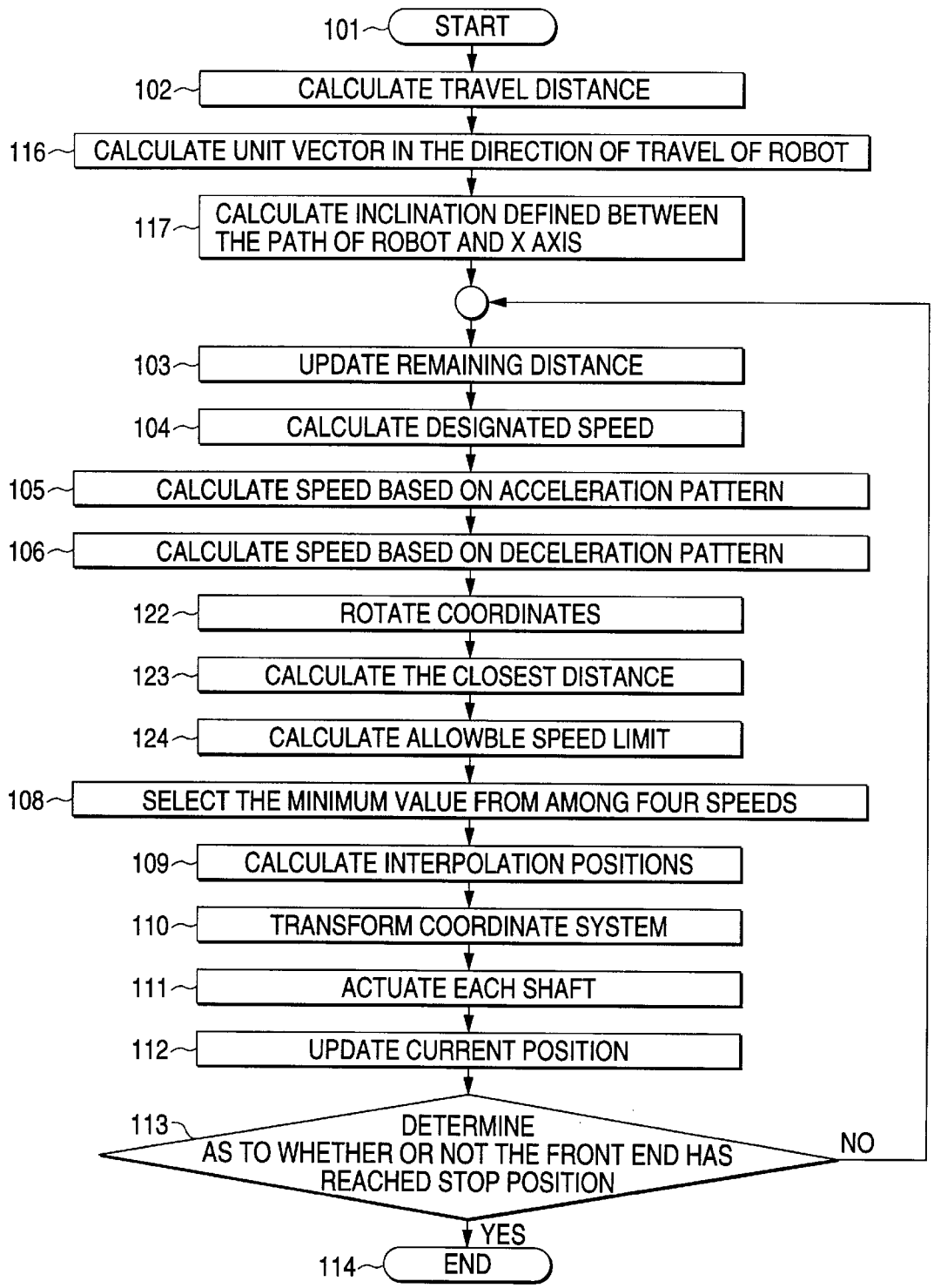
FIG. 14 is a flowchart showing the operation of the robot of a fifth embodiment.

More specifically, the aforementioned operation will be described with reference to a flowchart shown in FIG. 14.

The processing carried out in steps 101 through 106 is the same as that of the first embodiment shown in FIG. 2.

Figure 15:
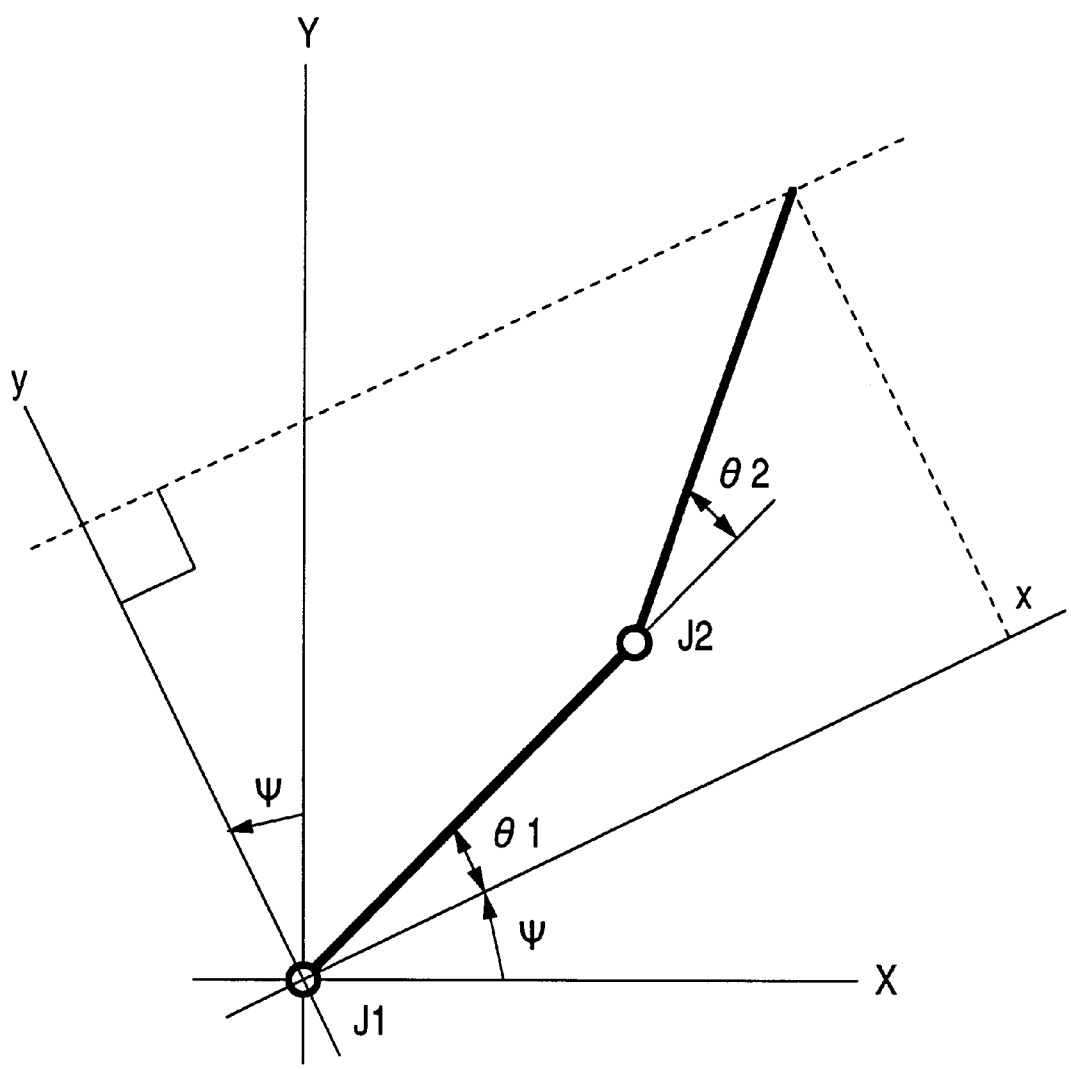
FIG. 15 is a schematic diagram showing the rotation of coordinates of the robot.

The axes of the coordinate system are rotated only through an angle φ in step 122 such that the X axis of the coordinate system becomes parallel to the direction of the path of the robot, as shown in FIG. 15.

A smaller absolute value of the X and Y coordinates in the rotated coordinate system is selected in step 123.

The allowable speed limit is retrieved and calculated in step 124 from previously-prepared table 1 (details on table 1 will be described later) which provides the side length of the square of the contour line of the approximated allowable speed limit=the allowable speed limit, using the value selected in step 123 as an index.

Steps 108 through 114 are the same as those of the aforementioned first embodiment.

The details of table 1 used in step 124, which provides the side length of the square of the contour line of the approximated allowable speed limit=the allowable speed limit, will be described.

According to table 1, the allowable limit table is uniquely decided as a result of determination of the length of the robot arm and the maximum rated angular velocity of the joint shaft. Therefore, the table does not need to be prepared every time the locus of the robot is generated. Therefore, it is not necessary for the CPU of the speed computing apparatus of the robot to perform arithmetic operations. The table is computed by another computer, and the thus-prepared table is previously written into nonvolatile memory before the robot is shipped.

For the contour line of the allowable speed limit which assumes the distorted ellipse shown in FIG. 13, the joint angles θ1 and θ2 are expressed as parameters of the following expressions 42 to 44.

$$Vlimit = (\sin(\theta 2)/\cos(\theta 1+\theta 2)) \times L1 \times J1\max \quad (42)$$

$$x = L1^* \cos(\theta 1) + L2^* \cos(\theta 1+\theta 2) \quad (43)$$

$$y = L1^* \sin(\theta 1) + L2^* \sin(\theta 1+\theta 2) \quad (44)$$

With regard to the allowable speed limit Vlimit of interest, the maximum absolute value "x" and the maximum absolute value "y" are calculated. In practice, it is difficult to solve the above expressions in a positive manner with regard to "x" and "y." A retrieving operation is carried out in the Y direction while the value of "x" is sequentially changed. Then, the retrieving operation is carried out in the X direction while the value of "y" is sequentially changed. The maximum value of "x" and the maximum value of "y" are adopted as the side length of the square of the contour line of the approximated allowable speed limit corresponding to the applicable allowable speed limit. The above-described operations are sequentially carried out while the allowable speed limit Vlimit is sequentially changed.

For instance, the table that provides the side length of the square of the contour line of the approximated allowable speed limit=the allowable speed limit, is expressed as table 1 shown below, provided that the length of the arm L1=L2= 320 mm, and that the maximum rated angular velocity of each joint shaft is 4.6 rad/s.

| Vlimit (mm/s) | Ln (mm) |
| --- | --- |
| 650 | 140 |
| 607 | 130 |
| 564 | 121 |
| 521 | 112 |
| 479 | 102 |
| 436 | 93 |
| 393 | 84 |
| 350 | 75 |
| 308 | 65 |
| 265 | 56 |
| 222 | 47 |
| 193 | 41 |
| 168 | 36 |
| 145 | 31 |
| 124 | 26 |
| 105 | 22 |
| 89 | 19 |
| 75 | 16 |
| 63 | 13 |
| 53 | 11 |
| 42 | 9 |
| 32 | 6 |
| 24 | 5 |
| 18 | 4 |
| 13 | 3 |
| 10 | 2 |
| 7 | 1.5 |
| 5 | 1 |
| 4 | 0.8 |
| 3 | 0.5 |
| 0 | 0 |

Figure 16:
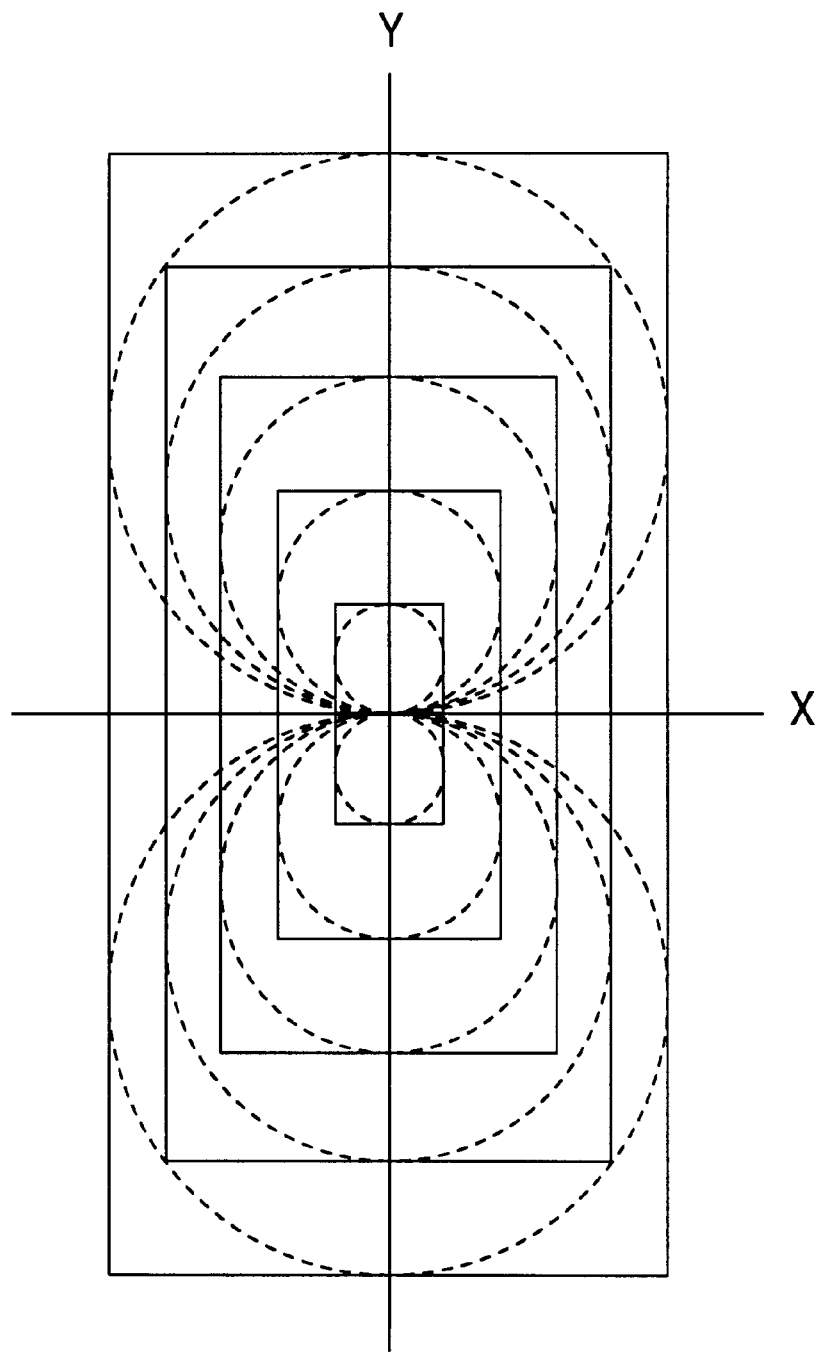
FIG. 16 is a contour line diagram of an allowable speed limit of a cylindrical robot.

In the foregoing fifth embodiment, the scalar robot having two degrees of freedom within a horizontal plane has been described. With regard to the cylindrical robot having two degrees of freedom within a horizontal plane, the following expressions (45) to (47) are used instead of the expressions used in step 124 when preparing the allowable speed limit table. As a result, a table for use in obtaining the allowable speed limit of the front end of the robot can be prepared in the same manner as in the case of the scalar robot having two degrees of freedom within a horizontal plane. In this case, the contour line of the allowable speed limit of the front end of the robot is centered on the Y axis, as shown in FIG. 16. The contour line includes twin circles, and these circles are symmetrical about the X axis that crosses the Y axis at the point of origin. The allowable speed limit is obtained as a rectangle which has a side ratio of one to two and is circumscribed about the contour line; namely, the contour line of the allowable speed limit approximated to the square circumscribed about the circles.

$$Vlimit = L \times J\max / \sin(\theta) \quad (45)$$

$$x = L^* \cos(\theta) \quad (46)$$

$$y = L^* \sin(\theta) \quad (47)$$

These expressions are combined into the following expression (48).

$$Vlimit = y \times \sqrt{(x \times x + y \times y)} \times J\max = y \times J\max \times \sqrt{x^2+y^2} \quad (48)$$

where Vlimit is an allowable speed limit, Jmax is the maximum rated angular velocity of the pivot, L is the length of an expandable shaft, and θ is an angle of the pivot.

With regard to the vertically articulated robot, the allowable speed limit table used in step 124 can be similarly prepared by handling the length of the arm projected onto a horizontal plane as the length of an expandable shaft of the cylindrical robot having two degrees of freedom within a horizontal plane.

(SIXTH EMBODIMENT)

The first through fifth embodiments have been described by employing the robot speed computing apparatus of the present invention as the robot locus controller that actually controls the robot main body.

However, the robot speed computing apparatus of the present invention is applicable not only to the robot locus controller that actually controls the robot main body but also to a robot simulator which performs a simulation of operations of the robot on the screen. The sixth embodiment will be described while the robot speed computing apparatus of the present invention is applied to the robot simulator.

Figure 17:
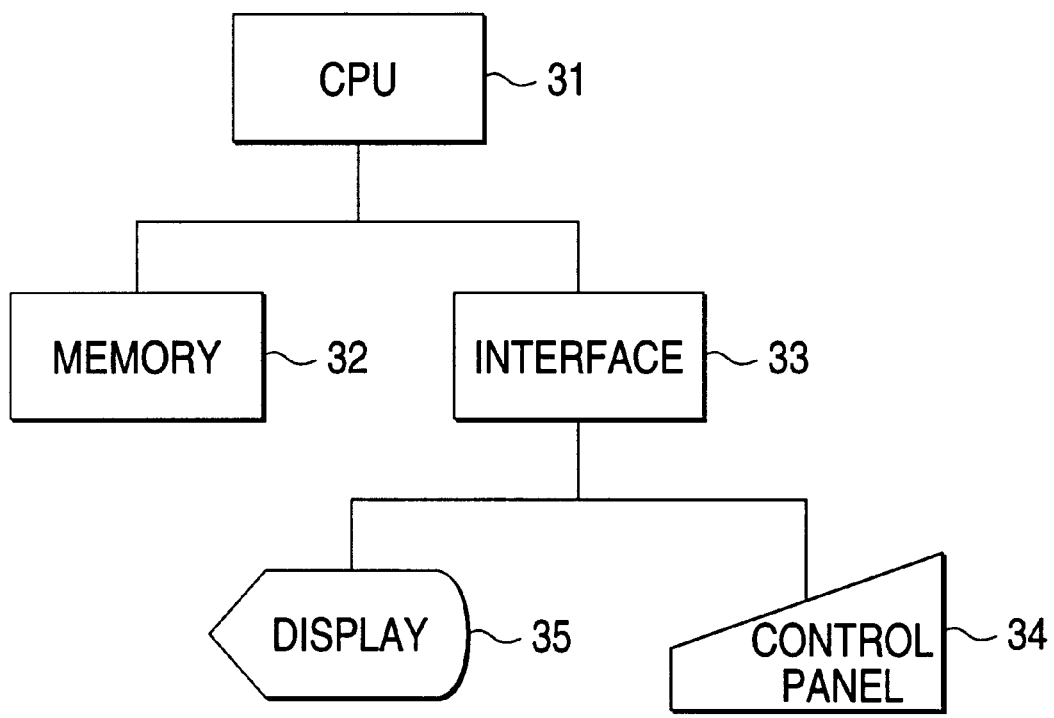
FIG. 17 is a schematic diagram showing electrical connections of a robot simulator according to a sixth embodiment.

FIG. 17 shows electrical connections of the robot simulator which adopts the robot speed computing apparatus of the present invention. In the drawing, reference numeral 31 designates a CPU which performs a simulation of the robot; 32 designates memory which holds a program for use in causing the CPU 31 to perform the simulation; and 33 designates an interface provided between the CPU 31 and the memory 32, a display 35, and a control panel 34.

The operation of the robot locus controller of the sixth embodiment will be described with reference to the accompanying drawings.

Figure 18:
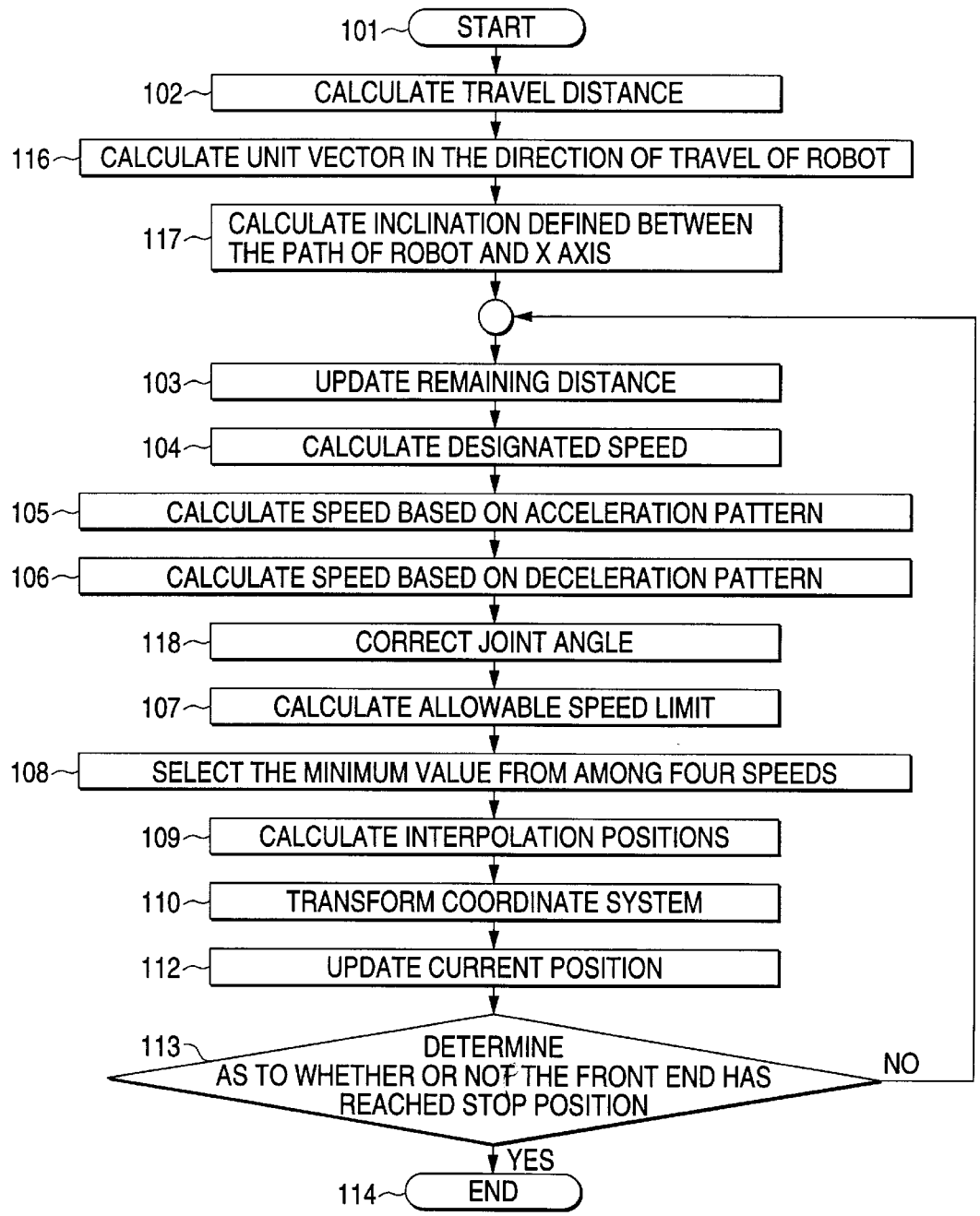
FIG. 18 is a flowchart showing the operation of the robot simulator according to the sixth embodiment.

FIG. 18 shows a robot speed computing method which is executed by the program stored in the memory 32.

In the drawing, the processing carried out in steps 101 to 110 is the same as that of the first embodiment shown in FIG. 2.

The current position of the robot is updated in step 112, and a simulated current position of the robot (which includes the attitude of the robot) is displayed on the display 35.

Subsequently, the processing carried out in steps 113 to 114 is the same as that of the first embodiment shown in FIG. 4.

As a result of the sixth embodiment, it is possible to simulate the locus of the robot such that it can pass the vicinity of the point of origin during the course of its linear interpolation operations, without use of a feed-forward technique which may cause unstable control and a feedback technique which requires discarding of the result of transformation of a coordinate system, as well as without causing the joint shaft to exceed its maximum rated angular velocity.

As has been described above, the present invention provides a robot speed computing apparatus with means for acquiring information on the current position of the robot; means for acquiring information on the maximum rated speed of a joint of the robot; and means for computing an allowable speed limit which is possible during the linear interpolation operations of the front end of the robot on the basis of the current robot position information and the maximum rated speed of the joint. As a result, it is possible to obtain the maximum speed of the front end of the robot that does not exceed the maximum rated angular velocity of the joint shaft, without use of a feed-forward technique which may cause unstable control as well as a feedback technique which requires discarding of the result of transformation of a coordinate system, in a case where the robot travels the vicinity of the point of origin during the course of its linear interpolation operations.

The present invention also provides a robot speed computing apparatus with means for acquiring information on the current state of a joint of the robot; means for acquiring information on the maximum rated speed of the joint of the robot; and means for computing an allowable speed limit which is possible during the linear interpolation operations of the front end of the robot on the basis of the current robot position information and the maximum rated speed of the joint. As a result, it is possible to obtain the maximum speed of the front end of the robot that does not exceed the maximum rated angular velocity of the joint shaft, without use of a feed-forward technique which may cause unstable control as well as a feedback technique which requires discarding of the result of transformation of a coordinate system, in a case where the robot travels the vicinity of the point of origin during the course of its linear interpolation operations.

According to the present invention, the robot is a scalar robot. In this scalar robot, information on the current angle of a joint of the scalar robot is acquired as current joint angle information of the scalar robot. Information related to the maximum rated angular velocity of the joint of the scalar robot is acquired as rated maximum angular velocity information of the joint of the robot. As a result, it is possible to obtain the maximum speed of the front end of the scalar robot that does not exceed the maximum rated angular velocity of the joint shaft, without use of a feed-forward technique which may cause unstable control as well as of a feedback technique which requires discarding of the result of transformation of a coordinate system, in a case where the robot travels the vicinity of the point of origin during the course of its linear interpolation operations.

According to the present invention, the scalar robot is a scalar robot which has two degrees of freedom within a horizontal plane. In this scalar robot, information related to the current angle of a joint of the robot having two degrees of freedom within a horizontal plane, is acquired as current joint angle information of the scalar robot. Further, the maximum rated angular velocity of a first joint of the scalar robot having two degrees of freedom within a horizontal plane, is acquired as maximum rated angular velocity information of the joint of the scalar robot. As a result, it is possible to obtain the maximum speed of the front end of the scalar robot having two degrees of freedom within a horizontal plane that does not exceed the maximum rated angular velocity of the joint shaft, without use of a feedforward technique which may cause unstable control as well as of a feedback technique which requires discarding of the result of transformation of a coordinate system, in a case where the robot travels the vicinity of the point of origin during the course of its linear interpolation operations.

According to the present invention, the scalar robot having two degrees of freedom within a horizontal plane is a three-degree-of-freedom scalar robot having a front end attitude shaft. The three-degree-of-freedom scalar robot having the front end attitude shaft comprises means for acquiring information related to a remaining linear travel distance from the current position of the three-degree-of-freedom scalar robot; means for acquiring information related to a remaining angle through which the front end attitude shaft of the three-degree-of-freedom scalar robot moves from the current position thereof; means for computing a speed contribution correction coefficient for use with the front end attitude shaft by entering the information related to the remaining linear travel distance, the information related to the remaining angle through which the front end attitude shaft travels, and the information related to the current joint angle of the three-degree-of-freedom scalar robot having the front end attitude shaft; and means for multiplying together the speed contribution correction coefficient and an allowable speed limit which is possible during the linear interpolation operations of the front end of the three-degree-of-freedom scalar robot with the front end attitude shaft calculated on the basis of the current joint angle information of the scalar robot and the maximum rated angular velocity of a first joint of the scalar robot. As a result, it is possible to obtain the maximum speed of the front end of the three-degree-of-freedom scalar robot that does not exceed the maximum rated angular velocity of the joint shaft, without use of a feed-forward technique which may cause unstable control as well as of a feedback technique which requires discarding of the result of transformation of a coordinate system, in consideration of the contribution of the front end attitude shaft, in a case where the robot travels the vicinity of the point of origin during the course of linear interpolation operations.

According to the present invention, the robot is a cylindrical robot having two degrees of freedom within a horizontal plane. In the cylindrical robot, information related to the current joint of the cylindrical robot having two degrees of freedom within a horizontal plane is acquired as current joint information of the robot. A rated maximum angular velocity of the pivot of the cylindrical robot having two degrees of freedom within a horizontal plane is acquired as maximum rated speed information of the robot. An allowable speed limit is calculated which is possible during the linear interpolation operations of the front end of the cylindrical robot on the basis of the current joint information and the maximum rated angular velocity of the pivot with regard to the cylindrical robot having two degrees of freedom within a horizontal plane. As a result, it is possible to obtain the maximum speed of the front end of the cylindrical robot having two degrees of freedom within a horizontal plane that does not exceed the maximum rated angular velocity of the joint shaft, without use of a feed-forward technique which may cause unstable control as well as of a feedback technique which requires discarding of the result of transformation of a coordinate system, in a case where the robot travels the vicinity of the point of origin during the course of linear interpolation operations.

According to the present invention, the cylindrical robot having two degrees of freedom within a horizontal plane is a three-degree-of-freedom cylindrical robot having a front end attitude shaft. The three-degree-of-freedom cylindrical robot having the front end attitude shaft comprises means for acquiring information related to a remaining linear travel distance from the current position of the three-degree-of-freedom cylindrical robot; means for acquiring information related to a remaining angle through which the front end attitude shaft of the three-degree-of-freedom cylindrical robot moves from the current position thereof; means for computing a speed contribution correction coefficient for use with the front end attitude shaft on the basis of the information related to the remaining linear travel distance, the information related to the remaining angle through which the front end attitude shaft travels, and the information related to the current joint angle of the three-degree-of-freedom cylindrical robot having the front end attitude shaft; and means for multiplying together the speed contribution correction coefficient and an allowable speed limit which is possible during the linear interpolation operations of the front end of the three-degree-of-freedom cylindrical robot with the front end attitude shaft calculated on the basis of the current joint angle information of the cylindrical robot and the maximum rated angular velocity of a pivot. As a result, it is possible to obtain the maximum speed of the front end of the three-degree-of-freedom scalar robot having a front end attitude shaft that does not exceed the maximum rated angular velocity of the joint shaft, without use of a feed-forward technique which may cause unstable control as well as of a feedback technique which requires discarding of the result of transformation of a coordinate system, in consideration of the contribution of a front end attitude shaft, in a case where the robot travels the vicinity of the point of origin during the course of its linear interpolation operations.

According to the present invention, the cylindrical robot having two degrees of freedom within a horizontal plane is a vertically articulated robot. The vertically articulated robot is projected on a horizontal plane. The resultantly projected length of first and second arms of the vertically articulated robot is defined as the length of the arms of the vertically articulated robot. An allowable speed limit is calculated which is possible during the linear interpolation operations of the front end of the vertically articulated robot on the basis of information related to the current joint of the robot and the maximum rated angular velocity of a pivot. As a result, it is possible to obtain the maximum speed of the front end of the vertically articulated robot that does not exceed the maximum rated angular velocity of the joint shaft, without use of a feed-forward technique which may cause unstable control as well as of a feedback technique which requires discarding of the result of transformation of a coordinate system, in a case where the robot travels the vicinity of the point of origin during the course of its linear interpolation operations.

According to the present invention, the robot further comprises means for storing a contour line of the allowable speed limit which is possible during the calculated linear interpolation operations of the front end of the robot; means for acquiring information related to the current position of the robot; and means for retrieving an allowable speed limit which is possible during the linear interpolation operations at the current position of the robot, from the contour line of the previously-stored allowable speed limit on the basis of information related to the current position of the robot. With this arrangement, the relationship between the position of the front end of the robot and a speed which is possible during the linear interpolation operation of the robot, is calculated and stored before the linear interpolation operation is carried out. As a result, arithmetic operations comprising such as a trigonometric function are not carried out during the course of sampling operations associated with the linear interpolation operation. It is possible to obtain the maximum speed of the front end of the robot that does not exceed the maximum rated angular velocity of the joint shaft in a case where the robot travels the vicinity of point of origin during the course of its linear interpolation operations, by means of a retrieving operation chiefly consisting of comparison operations which puts a relatively small computational load on the computer.

According to the present invention, the robot further comprises means for storing a contour line of the allowable speed limit which is possible during the calculated linear interpolation operations of the front end of the robot, in the form analogous to a polygon, a circle or an ellipse; means for acquiring information related to the current position of the robot; and means for retrieving an allowable speed limit which is possible during the linear interpolation operations at the current position of the robot, from the contour line of the previously-stored allowable speed limit on the basis of information related to the current position of the robot. As a result of the above-described arrangement, the amount of information related to the contour line generated before initiation of the linear interpolation operation can be reduced. At the same time, it is possible to retrieve the maximum speed of the front end of the robot by means of a small amount of comparison operations during the course of sampling operations associated with the linear interpolation operations. Even in the case of a robot having small computing power, it is possible to obtain the maximum speed of the front end of the scalar robot which does not exceed the maximum rated angular velocity of the joint shaft, in a case where the robot travels the vicinity of the point of origin during the course of its linear interpolation operations.

According to the present invention, the robot further comprises means for storing a contour line of the allowable speed limit which is possible during the calculated linear interpolation operations of the front end of the scalar robot, in the form the length of a side of a square by approximating the contour line to a square; means for acquiring information related to the current position of the scalar robot; and means for retrieving an allowable speed limit which is possible during the linear interpolation operations at the current position of the robot, from the previously-stored side length on the basis of information related to the current position of the scalar robot. As a result of the above-described arrangement, the amount of information related to the contour line generated before initiation of the linear interpolation operation can be reduced. At the same time, it is possible to retrieve the maximum speed of the front end of the robot by means of a small amount of comparison operations during the course of sampling operations associated with the linear interpolation operations. Even in the case of a robot having small computing power, it is possible to obtain the maximum speed of the front end of the scalar robot that does not exceed the maximum rated angular velocity of the joint shaft in a case where the robot travels the vicinity of the point of origin during the course of its linear interpolation operations.

According to the present invention, the robot further comprises means for storing a contour line of the allowable speed limit which is possible during the calculated linear interpolation operations of the front end of the scalar robot, in the form the distance from the point of origin to each side of a rectangle by approximating the contour line to a rectangle; means for acquiring information related to the current position of the scalar robot; and means for retrieving an allowable speed limit which is possible during the linear interpolation operations at the current position of the robot, from the previously-stored distances on the basis of information related to the current position of the scalar robot. As a result of the above-described arrangement, the amount of information related to the contour line generated before initiation of the linear interpolation operation can be reduced. At the same time, it is possible to retrieve the maximum speed of the front end of the robot by means of a small amount of comparison operations during the course of sampling operations associated with the linear interpolation operations. Even in the case of a robot having small computing power, it is possible to obtain the maximum speed of the front end of the scalar robot that does not exceed the maximum rated angular velocity of the joint shaft in a case where the robot travels the vicinity of the point of origin during the course of its linear interpolation operations.

According to the present invention, the scalar robot is a three-degree-of-freedom scalar robot having the front end attitude shaft. The three-degree-of-freedom robot comprises means for acquiring information related to a remaining linear travel distance from the current position of the three-degree-of-freedom scalar robot; means for acquiring information related to a remaining angle through which the front end attitude shaft of the three-degree-of-freedom scalar robot moves from the current position thereof; means for computing a speed contribution correction coefficient for use with the front end attitude shaft on the basis of the information related to the remaining linear travel distance, the information related to the remaining angle through which the front end attitude shaft travels, and the information related to the current joint angle of the three-degree-of-freedom scalar robot having the front end attitude shaft; and means for multiplying a retrieved allowable speed limit by the speed contribution correction coefficient. As a result of the above-described arrangement, in a case where the robot travels the vicinity of the point of origin during the course of its linear interpolation operations, it is possible to obtain the maximum speed of the front end of the scalar robot that does not exceed the maximum rated angular velocity of the joint shaft in consideration of the contribution of the front end attitude shaft.

According to the present invention, the robot further comprises means for storing the radius of a contour line of speed that consists of a plurality of circles obtained by entering the contour line of the allowable speed limit which is possible during the calculated linear interpolation operations of the front end of the cylindrical robot having two degrees of freedom within a horizontal plane; means for acquiring information related to the current position of the cylindrical robot; and means for retrieving an allowable speed limit which is possible during the linear interpolation operations at the current position of the robot, from the previously-stored radius on the basis of the information related to the current position of the cylindrical robot having two degrees of freedom within a horizontal plane. As a result of the above-described arrangement, the amount of information related to the contour line generated before initiation of the linear interpolation operation can be reduced. At the same time, it is possible to retrieve the maximum speed of the front end of the robot by means of a small amount of comparison operations during the course of sampling operations associated with the linear interpolation operations. Even in the case of a robot having small computing power, it is possible to obtain the maximum speed of the front end of the cylindrical robot having two degrees of freedom within a horizontal plane which does not exceed the maximum rated angular velocity of the joint shaft, in a case where the robot travels the vicinity of the point of origin during the course of its linear interpolation operations.

According to the present invention, the cylindrical robot having two degrees of freedom within a horizontal plane is a three-degree-of-freedom scalar robot having the front end attitude shaft. The three-degree-of-freedom robot comprises means for acquiring information related to a remaining linear travel distance from the current position of the three-degree-of-freedom cylindrical robot; means for acquiring information related to a remaining angle through which the front end attitude shaft of the three-degree-of-freedom cylindrical robot having the front end attitude shaft moves from the current position thereof; means for computing a speed contribution correction coefficient for use with the front end attitude shaft on the basis of the information related to the remaining linear travel distance, the information related to the remaining angle through which the front end attitude shaft travels, and the information related to the current joint angle of the three-degree-of-freedom circular robot having the front end attitude shaft; and means for multiplying a retrieved allowable speed limit by the speed contribution correction coefficient. As a result of the above-described arrangement, in a case where the robot travels the vicinity of the point of origin during the course of its linear interpolation operations, it is possible to obtain the maximum speed of the front end of the three-degree-of-freedom cylindrical robot that does not exceed the maximum rated angular velocity of the joint shaft in consideration of the contribution of the front end attitude shaft.

According to the present invention, the cylindrical robot having two degrees of freedom within a horizontal plane is a vertically articulated robot. An allowable speed limit which is possible during the linear interpolation operations of the front end of the vertically articulated robot, is calculated by projecting the vertically articulated robot on a horizontal plane, and by defining the resultantly projected length of first and second arms of the vertically articulated robot as the length of the arms of the vertically articulated robot. As a result of the above-described arrangement, in a case where the robot travels the vicinity of the point of origin during the course of its linear interpolation operations, it is possible to obtain the maximum speed of the front end of the vertically articulated robot that does not exceed the maximum rated angular velocity of the joint shaft.

According to the present invention, the robot further comprises means for acquiring the direction of course of the robot from the current position thereof; and means for converting coordinates of the current position of the robot into coordinates of a position in the direction parallel to the direction of the course of the robot on the basis of the direction of the course of the robot from the current position thereof. The means for calculating an allowable speed limit which is possible during the linear interpolation operations of the front end of the robot, calculates the allowable speed limit on the basis of the thus-converted coordinates of the current position of the robot. As a result of the above-described arrangement, arithmetic operations of the maximum speed of the front end of the robot which does not exceed the maximum rated angular velocity of the joint shaft can be facilitated.

According to the present invention, the robot further comprises means for calculating a designated speed in a case where the robot travels at a speed designated when performing linear interpolation operations; means for obtaining the speed of the robot in a case where the robot travels according to an acceleration pattern designated when performing linear interpolation operations; means for obtaining the speed of the robot in a case where the robot travels according to a deceleration pattern designated when performing linear interpolation operations; and means for selecting the minimum speed from among the designated speed, the speed based on the acceleration pattern, the speed based on the deceleration pattern, and the allowable speed limit. As a result, it is possible to simulate the locus of the robot as well as to actually control the locus of the robot so that the robot can pass the vicinity of the point of origin during the course of its linear interpolation operations, without use of a feed-forward technique which may cause unstable control and a feedback technique which requires discarding of the result of transformation of a coordinate system, and without causing the robot to exceed the maximum rated angular velocity of the joint shaft.

According to the present invention, the robot further comprises means for calculating a designated speed in a case where the robot travels at a speed designated when performing linear interpolation operations; means for obtaining the speed of the robot in a case where the robot travels according to an acceleration pattern designated when performing linear interpolation operations; means for obtaining the speed of the robot in a case where the robot travels according to a deceleration pattern designated when performing linear interpolation operations; and means for selecting the minimum speed from among the designated speed, the speed based on the acceleration pattern, the speed based on the deceleration pattern, and the allowable speed limit multiplied by the speed contribution correction coefficient. As a result, it is possible to simulate the locus of the robot as well as to actually control the locus of the robot so that the robot can pass the vicinity of the point of origin during the course of its linear interpolation operations by correcting the contribution of the speed of the front end attitude shaft, without use of a feed-forward technique which may cause unstable control and a feedback technique which requires discarding of the result of transformation of a coordinate system, and without causing the robot to exceed the maximum rated angular velocity of the joint shaft.

Further, the present invention provides a robot speed computing method with the steps of acquiring information on the current position of the robot; acquiring information on the maximum rated speed of a joint of the robot; and computing an allowable speed limit which is possible during the linear interpolation operations of the front end of the robot on the basis of the current robot position information and the maximum rated speed of the joint. As a result, it is possible to obtain the maximum speed of the front end of the robot that does not exceed the maximum rated angular velocity of the joint shaft, without use of a feed-forward technique which may cause unstable control as well as a feedback technique which requires discarding of the result of transformation of a coordinate system, in a case where the robot travels the vicinity of the point of origin during the course of its linear interpolation operations.

The present invention also provides a robot speed computing method with the steps of acquiring information on the current state of a joint of the robot; acquiring information on the maximum rated speed of the joint of the robot; and computing an allowable speed limit which is possible during the linear interpolation operations of the front end of the robot on the basis of the current robot position information and the maximum rated speed of the joint. As a result, it is possible to obtain the maximum speed of the front end of the robot that does not exceed the maximum rated angular velocity of the joint shaft, without use of a feed-forward technique which may cause unstable control as well as a feedback technique which requires discarding of the result of transformation of a coordinate system, in a case where the robot travels the vicinity of the point of origin during the course of its linear interpolation operations.

According to the present invention, the robot is a scalar robot. In the present invention, information on the current angle of a joint of the scalar robot is acquired as current joint angle information of the scalar robot. Information related to the maximum rated angular velocity of the joint of the scalar robot is acquired as rated maximum angular velocity of the joint of the robot. As a result, it is possible to obtain the maximum speed of the front end of the scalar robot that does not exceed the maximum rated angular velocity of the joint shaft, without use of a feed-forward technique which may cause unstable control as well as of a feedback technique which requires discarding of the result of transformation of a coordinate system, in a case where the robot travels the vicinity of the point of origin during the course of its linear interpolation operations.

According to the present invention, the scalar robot is a scalar robot which has two degrees of freedom within a horizontal plane. In the present invention, information on the current angle of a joint of the robot having two degrees of freedom within a horizontal plane, is acquired as current joint angle information of the scalar robot. Further, the maximum rated angular velocity of a first joint of the scalar robot is acquired as maximum rated angular velocity information of the joint of the scalar robot. As a result, it is possible to obtain the maximum speed of the front end of the scalar robot having two degrees of freedom within a horizontal plane that does not exceed the maximum rated angular velocity of the joint shaft, without use of a feed-forward technique which may cause unstable control as well as of a feedback technique which requires discarding of the result of transformation of a coordinate system, in a case where the robot travels the vicinity of the point of origin during the course of its linear interpolation operations.

According to the present invention, the scalar robot having two degrees of freedom within a horizontal plane is a three-degree-of-freedom scalar robot having a front end attitude shaft. The robot speed computing method comprises the steps of acquiring information related to a remaining linear travel distance from the current position of the three-degree-of-freedom scalar robot having the front end attitude shaft; acquiring information related to a remaining angle through which the front end attitude shaft of the three-degree-of-freedom scalar robot moves from the current position thereof; computing a speed contribution correction coefficient for use with the front end attitude shaft by entering the information related to the remaining linear travel distance, the information related to the remaining angle through which the front end attitude shaft travels, and the information related to the current joint angle of the three-degree-of-freedom scalar robot having the front end attitude shaft; and multiplying together the speed contribution correction coefficient and an allowable speed limit which is possible during the linear interpolation operations of the front end of the three-degree-of-freedom scalar robot with the front end attitude shaft calculated on the basis of the current joint angle information of the scalar robot and the maximum rated angular velocity of a first joint of the scalar robot. As a result, it is possible to obtain the maximum speed of the front end of the three-degree-of-freedom scalar robot that does not exceed the maximum rated angular velocity of the joint shaft, without use of a feed-forward technique which may cause unstable control as well as of a feedback technique which requires discarding of the result of transformation of a coordinate system, in consideration of the contribution of the front end attitude shaft, in a case where the robot travels the vicinity of the point of origin during the course of its linear interpolation operations.

According to the present invention, the robot is a cylindrical robot having two degrees of freedom within a horizontal plane. In the present invention, information related to the current joint of the cylindrical robot having two degrees of freedom within a horizontal plane is acquired as current joint information of the robot. A rated maximum angular velocity of the pivot of the cylindrical robot is acquired as maximum rated speed information of the robot. An allowable speed limit is calculated which is possible during the linear interpolation operations of the front end of the cylindrical robot on the basis of the current joint information and the maximum rated angular velocity of the pivot. As a result, it is possible to obtain the maximum speed of the front end of the cylindrical robot having two degrees of freedom within a horizontal plane that does not exceed the maximum rated angular velocity of the joint shaft, without use of a feed-forward technique which may cause unstable control as well as of a feedback technique which requires discarding of the result of transformation of a coordinate system, in a case where the robot travels the vicinity of the point of origin during the course of its linear interpolation operations.

According to the present invention, the cylindrical robot having two degrees of freedom within a horizontal plane is a three-degree-of-freedom cylindrical robot having a front end attitude shaft.

The robot speed computing method comprises the steps of acquiring information related to a remaining linear travel distance from the current position of the three-degree-of-freedom cylindrical robot; acquiring information related to a remaining angle through which the front end attitude shaft of the three-degree-of-freedom cylindrical robot moves from the current position thereof; computing a speed contribution correction coefficient for use with the front end attitude shaft on the basis of the information related to the remaining linear travel distance, the information related to the remaining angle through which the front end attitude shaft travels, and the information related to the current joint angle of the three-degree-of-freedom cylindrical robot having the front end attitude shaft; and multiplying together the speed contribution correction coefficient and an allowable speed limit which is possible during the linear interpolation operations of the front end of the three-degree-of-freedom cylindrical robot with the front end attitude shaft calculated on the basis of the current joint angle information of the cylindrical robot and the maximum rated angular velocity of a pivot. As a result, it is possible to obtain the maximum speed of the front end of the three-degree-of-freedom scalar robot having a front end attitude shaft that does not exceed the maximum rated angular velocity of the joint shaft, without use of a feed-forward technique which may cause unstable control as well as of a feedback technique which requires discarding of the result of transformation of a coordinate system, in consideration of the contribution of a front end attitude shaft, in a case where the robot travels the vicinity of the point of origin during the course of its linear interpolation operations.

According to the present invention, the cylindrical robot having two degrees of freedom within a horizontal plane is a vertically articulated robot. The vertically articulated robot is projected on a horizontal plane. The resultantly projected length of first and second arms of the vertically articulated robot is defined as the length of the arms of the vertically articulated robot. An allowable speed limit is calculated which is possible during the linear interpolation operations of the front end of the vertically articulated robot on the basis of information related to the current joint of the robot and the maximum rated angular speed of a pivot. As a result, it is possible to obtain the maximum speed of the front end of the vertically articulated robot that does not exceed the maximum rated angular velocity of the joint shaft, without use of a feed-forward technique which may cause unstable control as well as of a feedback technique which requires discarding of the result of transformation of a coordinate system, in a case where the robot travels the vicinity of the point of origin during the course of its linear interpolation operations.

According to the present invention, the speed computing method further comprises the steps of storing a contour line of the allowable speed limit which is possible during the calculated linear interpolation operations of the front end of the robot; acquiring information related to the current position of the robot; and retrieving an allowable speed limit which is possible during the linear interpolation operations at the current position of the robot, from the contour line of the previously-stored allowable speed limit on the basis of information related to the current position of the robot. With this arrangement, the relationship between the position of the front end of the robot and a speed which is possible during the linear interpolation operation of the robot, is calculated and stored before the linear interpolation operation is carried out. As a result, arithmetic operations comprising such as a trigonometric function are not carried out during the course of sampling operations associated with the linear interpolation operation. It is possible to obtain the maximum speed of the front end of the robot that does not exceed the maximum rated angular velocity of the joint shaft in a case where the robot travels the vicinity of point of origin during the course of its linear interpolation operations, by means of a retrieving operation chiefly consisting of comparison operations which puts a relatively small computational load on the computer.

According to the present invention, the robot speed computing method further comprises the steps of storing a contour line of the allowable speed limit which is possible during the calculated linear interpolation operations of the front end of the robot, in the form analogous to a polygon, a circle or an ellipse; acquiring information related to the current position of the robot; and retrieving an allowable speed limit which is possible during the linear interpolation operations at the current position of the robot, from the contour line of the previously-stored allowable speed limit on the basis of information related to the current position of the robot. As a result of the above-described arrangement, the amount of information related to the contour line generated before initiation of the linear interpolation operation can be reduced. At the same time, it is possible to retrieve the maximum speed of the front end of the robot by means of a small amount of comparison operations during the course of sampling operations associated with the linear interpolation operations. Even in the case of a robot having small computing power, it is possible to obtain the maximum speed of the front end of the scalar robot which does not exceed the maximum rated angular velocity of the joint shaft, in a case where the robot travels the vicinity of the point of origin during the course of its linear interpolation operations.

According to the present invention, the robot speed computing method further comprises the steps of storing a contour line of the allowable speed limit which is possible during the calculated linear interpolation operations of the front end of the scalar robot, in the form the length of a side of a square by approximating the contour line to a square; acquiring information related to the current position of the scalar robot; and retrieving an allowable speed limit which is possible during the linear interpolation operations at the current position of the robot, from the previously-stored side length on the basis of information related to the current position of the scalar robot. As a result of the above-described arrangement, the amount of information related to the contour line generated before initiation of the linear interpolation operation can be reduced. At the same time, it is possible to retrieve the maximum speed of the front end of the robot by means of a small amount of comparison operations during the course of sampling operations associated with the linear interpolation operations. Even in the case of a robot having small computing power, it is possible to obtain the maximum speed of the front end of the scalar robot that does not exceed the maximum rated angular velocity of the joint shaft in a case where the robot travels the vicinity of the point of origin during the course of its linear interpolation operations.

According to the present invention, the robot speed computing method further comprises the steps of storing a contour line of the allowable speed limit which is possible during the calculated linear interpolation operations of the front end of the scalar robot, in the form the distance from the point of origin to each side of a rectangle by approximating the contour line to a rectangle; acquiring information related to the current position of the scalar robot; and retrieving an allowable speed limit which is possible during the linear interpolation operations at the current position of the robot, from the previously-stored distances on the basis of information related to the current position of the scalar robot. As a result of the above-described arrangement, the amount of information related to the contour line generated before initiation of the linear interpolation operation can be reduced. At the same time, it is possible to retrieve the maximum speed of the front end of the robot by means of a small amount of comparison operations during the course of sampling operations associated with the linear interpolation operations. Even in the case of a robot having small computing power, it is possible to obtain the maximum speed of the front end of the scalar robot that does not exceed the maximum rated angular velocity of the joint shaft in a case where the robot travels the vicinity of the point of origin during the course of its linear interpolation operations.

According to the present invention, the scalar robot is a three-degree-of-freedom scalar robot having the front end attitude shaft. The robot speed computing method further comprises the steps of acquiring information related to a remaining linear travel distance from the current position of the three-degree-of-freedom scalar robot; acquiring information related to a remaining angle through which the front end attitude shaft of the three-degree-of-freedom scalar robot moves from the current position thereof; computing a speed contribution correction coefficient for use with the front end attitude shaft on the basis of the information related to the remaining linear travel distance, the information related to the remaining angle through which the front end attitude shaft travels, and the information related to the current joint angle of the three-degree-of-freedom scalar robot having the front end attitude shaft; and multiplying a retrieved allowable speed limit by the speed contribution correction coefficient. As a result of the above-described arrangement, in a case where the robot travels the vicinity of the point of origin during the course of its linear interpolation operations, it is possible to obtain the maximum speed of the front end of the scalar robot that does not exceed the maximum rated angular velocity of the joint shaft in consideration of the contribution of the front end attitude shaft.

According to the present invention, the robot speed computing method further comprises the steps of storing the radius of a contour line of speed that consists of a plurality of circles obtained by entering the contour line of the allowable speed limit which is possible during the calculated linear interpolation operations of the front end of the cylindrical robot having two degrees of freedom within a horizontal plane; acquiring information related to the current position of the cylindrical robot; and retrieving an allowable speed limit which is possible during the linear interpolation operations at the current position of the robot, from the previously-stored radius on the basis of the information related to the current position of the cylindrical robot having two degrees of freedom within a horizontal plane. As a result of the above-described arrangement, the amount of information related to the contour line generated before initiation of the linear interpolation operation can be reduced. At the same time, it is possible to retrieve the maximum speed of the front end of the robot by means of a small amount of comparison operations during the course of sampling operations associated with the linear interpolation operations. Even in the case of a robot having small computing power, it is possible to obtain the maximum speed of the front end of the cylindrical robot having two degrees of freedom within a horizontal plane which does not exceed the maximum rated angular velocity of the joint shaft, in a case where the robot travels the vicinity of the point of origin during the course of its linear interpolation operations.

According to the present invention, the cylindrical robot having two degrees of freedom within a horizontal plane is a three-degree-of-freedom scalar robot having the front end attitude shaft. The robot speed computing method further comprises the steps of acquiring information related to a remaining linear travel distance from the current position of the three-degree-of-freedom cylindrical robot; acquiring information related to a remaining angle through which the front end attitude shaft of the three-degree-of-freedom cylindrical robot having the front end attitude shaft moves from the current position thereof; computing a speed contribution correction coefficient for use with the front end attitude shaft on the basis of the information related to the remaining linear travel distance, the information related to the remaining angle through which the front end attitude shaft travels, and the information related to the current joint angle of the three-degree-of-freedom circular robot having the front end attitude shaft; and multiplying a retrieved allowable speed limit by the speed contribution correction coefficient. As a result of the above-described arrangement, in a case where the robot travels the vicinity of the point of origin during the course of its linear interpolation operations, it is possible to obtain the maximum speed of the front end of the three-degree-of-freedom cylindrical robot that does not exceed the maximum rated angular velocity of the joint shaft in consideration of the contribution of the front end attitude shaft.

According to the present invention, the cylindrical robot having two degrees of freedom within a horizontal plane is a vertically articulated robot. An allowable speed limit which is possible during the linear interpolation operations of the front end of the vertically articulated robot, is calculated by projecting the vertically articulated robot on a horizontal plane, and by defining the resultantly projected length of first and second arms of the vertically articulated robot as the length of the arms of the vertically articulated robot. As a result of the above-described arrangement, in a case where the robot travels the vicinity of the point of origin during the course of its linear interpolation operations, it is possible to obtain the maximum speed of the front end of the vertically articulated robot that does not exceed the maximum rated angular velocity of the joint shaft.

According to the present invention, the robot speed computing method further comprises the steps of acquiring the direction of course of the robot from the current position thereof; and converting coordinates of the current position of the robot into coordinates of a position in the direction parallel to the direction of the course of the robot on the basis of the direction of the course of the robot from the current position thereof. In the step for calculating an allowable speed limit which is possible during the linear interpolation operations of the front end of the robot, the allowable speed limit is calculated on the basis of the thus-converted coordinates of the current position of the robot. As a result of the above-described arrangement, arithmetic operations of the maximum speed of the front end of the robot which does not exceed the maximum rated angular velocity of the joint shaft can be facilitated.

According to the present invention, the robot speed computing method further comprises the steps of calculating a designated speed in a case where the robot travels at a speed designated when performing linear interpolation operations; obtaining the speed of the robot in a case where the robot travels according to an acceleration pattern designated when performing linear interpolation operations; obtaining the speed of the robot in a case where the robot travels according to a deceleration pattern designated when performing linear interpolation operations; and selecting the minimum speed from among the designated speed, the speed based on the acceleration pattern, the speed based on the deceleration pattern, and the allowable speed limit. As a result, it is possible to simulate the locus of the robot as well as to actually control the locus of the robot so that the robot can pass the vicinity of the point of origin during the course of its linear interpolation operations, without use of a feed-forward technique which may cause unstable control and a feedback technique which requires discarding of the result of transformation of a coordinate system, and without causing the robot to exceed the maximum rated angular velocity of the joint shaft.

According to the present invention, the robot speed computing method further comprises the steps of calculating a designated speed in a case where the robot travels at a speed designated when performing linear interpolation operations; obtaining the speed of the robot in a case where the robot travels according to an acceleration pattern designated when performing linear interpolation operations; obtaining the speed of the robot in a case where the robot travels according to a deceleration pattern designated when performing linear interpolation operations; and selecting the minimum speed from among the designated speed, the speed based on the acceleration pattern, the speed based on the deceleration pattern, and the allowable speed limit multiplied by the speed contribution correction coefficient. As a result, it is possible to simulate the locus of the robot as well as to actually control the locus of the robot so that the robot can pass the vicinity of the point of origin during the course of its linear interpolation operations by correcting the contribution of the speed of the front end attitude shaft, without use of a feed-forward technique which may cause unstable control and a feedback technique which requires discarding of the result of transformation of a coordinate system, and without causing the robot to exceed the maximum rated angular velocity of the joint shaft.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A speed computing apparatus for a robot having articulated elements connected by joints comprising:

means for acquiring location, said location being information on a current position of said robot and said joints;

means for computing a unit vector in a direction of travel of the robot;

means for acquiring information on the maximum rated speed of at least one of said joints;

means for correcting at least one joint angle; and means for computing an allowable speed limit for the linear interpolation operations of the robot based only on said maximum rated speed and said location using said unit vector and said at least one joint angle wherein said computing is performed using the equation:

$$V_{limit} = \frac{\sin\theta_2 \times L_1}{\cos(\theta_1 + \theta_2)} \times J_{1max}$$

wherein $\theta_1$ and $\theta_2$ are angles of a first and second joint respectively, $L_1$ is a length of a first shaft and $J_{1max}$ is a maximum rated angular velocity of a first joint.

2. The robot speed computing apparatus as defined in claim 1, wherein the robot is a scalar robot, and wherein said information on the joints comprises information on the joint angles, and wherein said maximum rated speed comprised is the maximum rated angular velocity of the joint.

3. The speed computing apparatus as defined in claim 2, wherein the scalar robot has two degrees of freedom within a horizontal plane, and wherein said maximum rated angular velocity is the maximum rated angular velocity of a first joint of the scalar robot.

4. The speed computing apparatus as defined in claim 1, further comprising:

means for acquiring the direction of course of the robot from the current position thereof; and means for converting coordinates of the current position of the robot into coordinates of a position in the direction parallel to the direction of the course using the direction of course, and wherein the means for calculating the allowable speed limit, calculates the allowable speed limit on the basis of the converted coordinates.

5. The speed computing apparatus as defined in claim 1, further comprising:

means for calculating a designated speed in a case where the robot travels at a designated speed;

means for obtaining an accelerating speed where the robot travels according to a designated acceleration pattern;

means for obtaining a decelerating speed where the robot travels according to a designated deceleration pattern; and means for selecting the minimum speed from among the designated speed, the accelerating, the decelerating, and the allowable speed limit.

6. A speed computing apparatus for a robot having articulated elements connected by joints comprising:

means for acquiring location, said location being information on a current position of said robot and said joints;

means for acquiring information on the maximum rated speed of at least one of joints;

means for computing an allowable speed limit for the linear interpolation operations of the robot based only on said maximum rated speed and said location, wherein the robot is a scalar robot, and wherein said information on the joints comprises information on the joint angles, and wherein said maximum rated speed is the maximum rated angular velocity of the joint, wherein the scalar robot has two degrees of freedom within a horizontal plane, wherein said maximum rated angular velocity is the maximum rated angular velocity of a first joint of the scalar robot, wherein the scalar robot having two degrees of freedom within a horizontal plane is a three-degree-of-freedom scalar robot having a front end attitude shaft, and the three-degree-of-freedom scalar robot having the front end attitude shaft further comprises:

means for acquiring information related to a remaining linear travel distance from the current position of the three-degree-of-freedom scalar robot;

means for acquiring information ralated to a remaining angle through which the front end attitude shaft of the three-degree-of-freedom scalar robot nust move from the current position thereof;

means for computing a speed contribution correction coefficient for use with the front end attitude shaft using the information related to the remaining linear travel distance, the information related to the remaining angle, and the information related to the current joint angle; and means for multiplying the speed contribution correction coefficient and the allowable speed limit to obtain the allowable speed limit in consideration of the influence of the front end attitude shaft.

7. The speed computing apparatus as defined in claim 6, further comprising:

means for calculating a designated speed in a case where the robot travels at a speed designated;

means for obtaining an accelerating speed where the robot travels according to a designated acceleration pattern;

means for obtaining a decelerating speed where the robot travels according to a designated deceleration pattern; and means for selecting the minimum speed from among the designated speed, the accelerating speed, the decelerating speed, and the allowable speed limit multiplied by the speed contribution correction coefficient.

8. A speed computing apparatus for a robot having articulated elements connected by joints comprising:

means for acquiring location, said location being information on a current position of said robot and a current one of said joints;

means for computing a unit vector in a direction of travel of the robot;

means for acquiring information on the maximum rated speed of at least one of joints;

means for correcting at least one joint angle; and means for computing an allowable speed limit for the linear interpolation operations of the robot based only on said maximum rated speed and said location using said unit vector and said at least one joint angle, wherein the robot is a cylindrical robot having two degrees of freedom within a horizontal plane; and wherein said maximum rated speed is the rated maximum angular velocity of the pivot of the cylindrical robot, wherein said computing is performed using the equation:

$$V_{\lim it} = \frac{L}{\sin\theta} \times J_{1\max}$$

wherein θ is an angle of a first joint, $L_1$ is a length of an extended first shaft and $J_{1max}$ is a maximum rated angular velocity of the pivot.

9. The speed computing apparatus as defined in claim 8, wherein the cylindrical robot is a vertically articulated robot; wherein the vertically articulated robot is projected on a horizontal plane, and the projected length of first and second arms of the vertically articulated robot is defined as the length of the arms of the vertically articulated robot.

10. A speed computing apparatus for a robot having articulated elements connected by joints comprising:

means for acquiring location, said location being information on a current position of said robot and a current one of said joints;

means for acquiring information on the maximum rated speed of at least one of joints;

means for computing an allowable speed limit for the linear interpolation operations of the robot based only on said maximum rated speed and said location, wherein the robot is a cylindrical robot having two degrees of freedom within a horizontal plane, and wherein said maximum rated speed is the rated maximum angular velocity of the pivot of the cylindrical robot, wherein the cylindrical robot is a three-degree-of-freedom cylindrical robot having a front end attitude shaft, and the three-degree-of-freedom cylindrical robot having the front end attitude shaft further comprises:

means for acquiring information related to a remaining linear travel distance from the current position of the three-degree-of-freedom cylindrical robot;

means for acquiring information related to a remaining angle through which the front end attitude shaft of the three-degree-of-freedom cylindrical robot must move from the current position thereof;

means for computing a speed contribution correction coefficient for use with the front end attitude shaft using the information related to the remaining linear travel distance, the information related to the remaining angle, and the information related to the current joint angle; and means for multiplying the speed contribution correction coefficient and said allowable speed limit to obtain the allowable speed limit in consideration of the influence of the front end attitude shaft.

11. A speed computing apparatus for a robot having articulated elements connected by joints comprising:

means for acquiring location, said location being information on a current position of said robot and a current one of said joints;

means for acquiring information on the maximum rated speed of at least one of said joints;

means for computing an allowable speed limit for the linear interpolation operations of the robot based only on said maximum rated speed and said location, means for storing a contour line of the allowable speed limit;

means for acquiring information related to the current position of the robot; and means for retrieving an allowable speed limit at the current position of the robot, from the contour line using said information related to the current position of the robot.

12. A speed computing apparatus for a robot having articulated elements connected by joints comprising:

means for acquiring location, said location being information on a current position of said robot and a current one of said joints;

means for acquiring information on the maximum rated speed of at least one of joints;

means for computing an allowable speed limit for the linear interpolation operations of the robot based only on said maximum rated speed and said location, means for storing a contour line of the allowable speed limit, in a form analogous to one of a polygon, a circle and an ellipse;

means for acquiring information related to the current position of the robot; and means for retrieving an allowable speed limit at the current position of the robot, from the contour line using information related to the current position of the robot.

13. A speed computing apparatus for a robot having articulated elements connected by joints comprising:

means for acquiring location, said location being information on a current position of said robot and said joints;

means for acquiring information on the maximum rated speed of at least one of said joints;

means for computing an allowable speed limit for the linear interpolation operations of the robot based only on said maximum rated speed and said location, wherein the robot is a scalar robot;

means for storing a contour line of the allowable speed limit, in the form of the length of a side of a square by approximating the contour line to a square;

means for acquiring information related to the current position of the scalar robot; and means for retrieving an allowable speed at the current position of the robot, from the contour line using information related to the current position of the scalar robot.

14. The speed computing apparatus as defined in claim 13, wherein the scalar robot is a three-degree-of-freedom scalar robot having a front end attitude shaft, and the robot further comprises:

means for acquiring information related to a remaining linear travel distance from the current position of the robot;

means for acquiring information related to a remaining angle through which the front end attitude shaft of the robot moves from the current position thereof;

means for computing a speed contribution correction coefficient for use with the front end attitude shaft using the information related to the remaining linear travel distance, the information related to the remaining angle, and the information related to the current joint angle of the robot; and means for multiplying the retrieved allowable speed limit by the speed contribution correction coefficient.

15. A speed computing apparatus for a robot having articulated elements connected by joints comprising:

means for acquiring location, said location being information on a current position of said robot and said joints;

means for acquiring information on the maximum rated speed of at least one of said joints;

means for computing an allowable speed limit for the linear interpolation operations of the robot based only on said maximum rated speed and said location, means for storing a contour line of the allowable speed limit, in the form of the distance from the point of origin to each side of a rectangle by approximating the contour line to a rectangle;

means for acquiring information related to the current position of the scalar robot; and means for retrieving an allowable speed limit at the current position of the robot, from the contour line using information related to the current position of the scalar robot, wherein the robot is a scalar robot, and wherein said information on the current joint comprises information on the current joint angle, and wherein said maximum rated speed is the maximum rated angular velocity of the joint.

16. A speed computing apparatus for a robot having articulated elements connected by joints comprising:

means for acquiring location, said location being information on a current position of said robot and a current one of said joints;

means for acquiring information on the maximum rated speed of at least one of joints;

means for computing an allowable speed limit for the linear interpolation operations of the robot based only on said maximum rated speed and said location;

means for approximating a contour line of the allowable speed as a plurality of circles;

means for storing the radius of said plurality of circles;

means for acquiring information related to the current position of the cylindrical robot; and means for retrieving an allowable speed limit at the current position of the robot, from the previously-stored radius using information related to the current position of the cylindrical robot having two degrees of freedom within a horizontal plane, wherein the robot is a cylindrical robot having two degrees of freedom within a horizontal plane, and wherein said maximum rated speed is the rated maximum angular velocity of the pivot of the cylindrical robot.

17. The speed computing apparatus as defined in claim 16, wherein the cylindrical robot having two degrees of freedom within a horizontal plane is a three-degree-of-freedom scalar robot having a front end attitude shaft, and the robot comprises:

means for acquiring information related to a remaining linear travel distance from the current position of the robot;

means for acquiring information related to a remaining angle through which the front end attitude shaft from the current position thereof;

means for computing a speed contribution correction coefficient for use with the front end attitude shaft using the information related to the remaining linear travel distance, the information related to the remaining angle, and the information related to the current joint angle; and means for multiplying a retrieved allowable speed limit by the speed contribution correction coefficient.

18. The speed computing apparatus as defined in claim 16, wherein the cylindrical robot having two degrees of freedom within a horizontal plane is a vertically articulated robot, and the allowable speed limit is calculated by projecting the vertically articulated robot on a horizontal plane, and by defining the projected length of first and second arms of the vertically articulated robot as the length of the arms of the vertically articulated robot.

19. A speed computing method for a robot having articulated elements connected by joints comprising:

acquiring location, said location being information on a current position of said robot and said joints;

acquiring information of the maximum rated speed of at least one of said joints;

computing a unit vector in the direction of travel of the robot;

correcting at least one joint angle; and computing an allowable speed limit for the linear interpolation operations of the robot based only on said maximum rated speed and location using said unit vector and aid at least one joint angle, wherein said computing is performed using the equation:

$$V_{limit} = \frac{\sin\theta_2 \times L_1}{\cos(\theta_1 + \theta_2)} \times J_{1\max}$$

wherein $\theta_1$ and $\theta_2$ are angles of a first and second joint respectively, $L_1$ is a length of a first shaft and $J_{1max}$ is a maximum rated angular velocity of a first joint.

20. The speed computing method as defined in claim 19, wherein the robot is a scalar robot, and wherein said information on the joints comprises information on the joint angles, and wherein said maximum rated speed comprised the maximum rated angular velocity of the joint.

21. The speed computing method as defined in claim 20, wherein the scalar robot having two degrees of freedom within a horizontal plane, and wherein said maximum rated angular velocity is the maximum rated angular velocity of a first joint.

22. The speed computing method as defined in claim 19, further comprising:

acquiring the direction of course of the robot from the current position thereof; and converting coordinates of the current position of the robot into coordinates of a position in the direction parallel to the direction of the course using the direction of course, and wherein the the allowable speed limit is calculated on the basis of the converted coordinates.

23. The speed computing method as defined in claim 19, further comprising:

calculating a designated speed in a case where the robot travels at a designated speed;

obtaining an accelerating speed where the robot travels according to a designated acceleration pattern;

obtaining a decelerating speed where the robot travels according to a designated deceleration pattern; and selecting the minimum speed from among the designated speed, the accelerating, the decelerating, and the allowable speed limit.

24. A speed computing method for a robot having articulated elements connected by joints comprising:

acquiring location, said location being information on a current position of said robot and said joints;

acquiring information on the maximum rated speed of at least one of said joints;

computing an allowable speed limit for the linear interpolation operations of the robot based only on said maximum rated speed and location, wherein the robot is a scalar robot, and wherein said information on the current joint comprises information on the current joint angle, and wherein said maximum rated speed comprised the maximum rated angular velocity of the joint;

wherein the scalar robot has two degrees of freedom within a horizontal plane, and wherein said maximum rated angular velocity is the maximum rated angular velocity of a first joint, wherein the scalar robot having two degrees of freedom within a horizontal plane is a three-degree-of-freedom scalar robot having a front end attitude shaft, and said method further comprises:

acquiring information related to a remaining linear travel distance from the current position of the three-degree-of-freedom scalar robot;

acquiring information related to a remaining angle through which the front end attitude shaft of the three-degree-of-freedom scalar robot must move from the current position thereof;

computing a speed contribution correction coefficient for use with the front end attitude shaft using the information related to the remaining linear travel distance, the information related to the remaining angle, and the information related to the current joint angle; and multiplying the speed contribution correction coefficient and the allowable speed limit to obtain the allowable speed limit in consideration of the influence of the front end attitude shaft.

25. The speed computing method as defined in claim 24, further comprising:

calculating a designated speed in a case where the robot travels at a speed designated;

obtaining an accelerating speed where the robot travels according to a designated acceleration pattern;

obtaining a decelerating speed where the robot travels according to a designated deceleration pattern; and selecting the minimum speed from among the designated speed, the accelerating speed, the decelerating speed, and the allowable speed limit multiplied by the speed contribution correction coefficient.

26. A speed computing method for a robot having articulated elements connected by joints comprising:

acquiring location, said location being information on a current position of said robot and a current one of said joints;

acquiring information of the maximum rated speed of at least one of said joints;

computing a unit vector in the direction of travel of the robot;

correcting at least one joint angle; and computing an allowable speed limit for the linear interpolation operations of the robot based only on said maximum rated speed and location using said unit vector and said at least one joint angle, wherein the robot is a cylindrical robot having two degrees of freedom within a horizontal plane; and wherein said maximum rated speed is the rated maximum angular velocity of the pivot of the cylindrical robot wherein said computing is performed using the equation:

$$V_{limit} = \frac{L}{\sin\theta} \times J_{1\max}$$

wherein θ is an angle of a first joint, $L_1$ is a length of an extended first shaft and $J_{1max}$ is a maximum rated angular velocity of the pivot.

27. A speed computing method for a robot having articulated elements connected by joints comprising:

acquiring location, said location being information on a current position of said robot and a current one of said joints;

acquiring information on the maximum rated speed of at least one of said joints;

computing a unit vector in the direction of travel of the robot;

correcting at least one joint angle; and computing an allowable speed limit for the linear interpolation operations of the robot based only on said maximum rated speed and location using said unit vector and said at least one joint angle, wherein said computing is performed without using a Jacobian matrix, wherein the robot is a cylindrical robot having two degrees of freedom within a horizontal plane; and wherein said maximum rated speed is the rated maximum angular velocity of the pivot of the cylindrical robot, wherein the cylindrical robot is a three-degree-of-freedom cylindrical robot having a front end attitude shaft, and said method further comprises:

acquiring information related to a remaining linear travel distance from the current position of the three-degree-of-freedom cylindrical robot;

acquiring information related to a remaining angle through which the front end attitude shaft of the three-degree-of-freedom cylindrical robot must move from the current position thereof;

computing a speed contribution correction coefficient for use with the front end attitude shaft using the information related to the remaining linear travel distance, the information related to the remaining angle, and the information related to the current joint angle; and multiplying the speed contribution correction coefficient and said allowable speed limit to obtain the allowable speed limit in consideration of the influence of the front end attitude shaft.

28. The speed computing method as defined in claim 27, wherein the cylindrical robot is a vertically articulated robot; wherein the vertically articulated robot is projected on a horizontal plane, and the projected length of first and second arms of the vertically articulated robot is defined as the length of the arms of the vertically articulated robot.

29. A speed computing method for a robot having articulated elements connected by joints comprising:

acquiring location, said location being information on a current position of said robot and a current one of said joints;

acquiring information on the maximum rated speed of at least one of said joints;

computing a unit vector in the direction of travel of the robot;

correcting at least one joint angle;

computing an allowable speed limit for the linear interpolation operations of the robot based only on said maximum rated speed and location using said unit vector and said at least one joint angle;

storing a contour line of the allowable speed limit;

acquiring information related to the current position of the robot; and retrieving an allowable speed limit at the current position of the robot, from the contour line using said information related to the current position of the robot.

30. A speed computing method for a robot having articulated elements connected by joints comprising:

acquiring location, said location being information on a current position of said robot and a current one of said joints;

acquiring information on the maximum rated speed of at least one of said joints;

computing a unit vector in the direction of travel of the robot;

correcting at least one joint angle;

computing an allowable speed limit for the linear interpolation operations of the robot based only on said maximum rated speed and location using said unit vector and said at least one joint angle;

storing a contour line of the allowable speed limit in a form analogous to one of a polygon, a circle and an ellipse;

acquiring information related to the current position of the robot; and retrieving an allowable speed limit at the current position of the robot, from the contour line using information related to the current position of the robot.

31. A speed computing method for a robot having articulated elements connected by joints comprising:

acquiring location, said location being information on a current position of said robot and said joints;

acquiring information on the maximum rated speed of at least one of said joints;

computing a unit vector in the direction of travel of the robot;

correcting at least one joint angle; and computing an allowable speed limit for the linear interpolation operations of the robot based only on said maximum rated speed and location, wherein the robot is a scalar robot, and wherein said information on the current joint comprises information on the current joint angle, and wherein said maximum rated speed comprises the maximum rated angular velocity of the joint, said method further comprising:
  storing a contour line of the allowable speed limit, in the form of the length of a side of a square by approximating the contour line to a square;
  acquiring information related to the current position of the scalar robot; and
  retrieving an allowable speed limit at the current position of the robot, from the contour line using information related to the current position of the scalar robot.

32. The speed computing method as defined in claim 31, wherein the scalar robot is a three-degree-of-freedom scalar robot having a front end attitude shaft, and the robot further comprises:
  acquiring information related to a remaining linear travel distance from the current position of the robot;
  acquiring information related to a remaining angle through which the front end attitude shaft of the robot moves from the current position thereof;
  computing a speed contribution correction coefficient for use with the front end attitude shaft using the information related to the remaining linear travel distance, the information related to the remaining angle, and the information related to the current joint angle of the robot; and
  multiplying the retrieved allowable speed limit by the speed contribution correction coefficient.

33. A speed computing method for a robot having articulated elements connected by joints comprising:
  acquiring location, said location being information on a current position of said robot and said joints;
  acquiring information on the maximum rated speed of at least one of said joints;
  computing a unit vector in the direction of travel of the robot;
  correcting at least one joint angle; and
  computing an allowable speed limit for the linear interpolation operations of the robot based only on said maximum rated speed and location,
  wherein the robot is a scalar robot, and wherein said information on the current joint comprises information on the current joint angle, and wherein said maximum rated speed comprises the maximum rated angular velocity of the joint,
  said method further comprising:
    storing a contour line of the allowable speed limit, in the form of the distance from the point of origin to each side of a rectangle by approximating the contour line to a rectangle;
    acquiring information related to the current position of the scalar robot; and
    retrieving an allowable speed limit at the current position of the robot, from the contour line using information related to the current position of the scalar robot.

34. A speed computing method for a robot having articulated elements connected by joints comprising:
  acquiring location, said location being information on a current position of said robot and a current one of said joints;
  acquiring information on the maximum rated speed of at least one of said joints;
  computing a unit vector in the direction of travel of the robot;
  correcting at least one joint angle; and
  computing an allowable speed limit for the linear interpolation operations of the robot based only on said maximum rated speed and location,
  wherein the robot is a cylindrical robot having two degrees of freedom within a horizontal plane; and
  wherein said maximum rated speed is the rated maximum angular velocity of the pivot of the cylindrical robot;
  said method further comprising:
    approximating a contour line of the allowable speed as a plurality of circles;
    storing the radius of said plurality of circles;
    acquiring information related to the current position of the cylindrical robot; and
    retrieving an allowable speed limit at the current position of the robot, from the previously-stored radius using information related to the current position of the cylindrical robot having two degrees of freedom within a horizontal plane.

35. The speed computing method as defined in claim 34, wherein the cylindrical robot having two degrees of freedom within a horizontal plane is a three-degree-of-freedom scalar robot having a front end attitude shaft, and the robot comprises:
  acquiring information related to a remaining linear travel distance from the current position of the robot;
  acquiring information related to a remaining angle through which the front end attitude shaft from the current position thereof;
  computing a speed contribution correction coefficient for use with the front end attitude shaft using basis of the information related to the remaining linear travel distance, the information related to the remaining angle, and the information related to the current joint angle; and
  multiplying a retrieved allowable speed limit by the speed contribution correction coefficient.

36. The speed computing method as defined in claim 34, wherein the cylindrical robot having two degrees of freedom within a horizontal plane is a vertically articulated robot, and the allowable speed limit is calculated by projecting the vertically articulated robot on a horizontal plane, and by defining the projected length of first and second arms of the vertically articulated robot as the length of the arms of the vertically articulated robot.

* * * * *